(12) United States Patent
Goudy et al.

(10) Patent No.: US 11,099,579 B2
(45) Date of Patent: Aug. 24, 2021

(54) SYSTEM FOR DETERMINING THE NUMBER OF REMOTE VEHICLES FOLLOWING A HOST VEHICLE

(71) Applicant: Nissan North America, Inc., Franklin, TN (US)

(72) Inventors: Roy Goudy, Farmington Hills, MI (US); Jeremy Chambers, Casco, MI (US); Neal Probert, Farmington Hills, MI (US)

(73) Assignees: NISSAN NORTH AMERICA, INC., Franklin, TN (US); RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 15/994,657

(22) Filed: May 31, 2018

(65) Prior Publication Data

US 2019/0369644 A1    Dec. 5, 2019

(51) Int. Cl.
   G05D 1/02 (2020.01)
   G08G 1/16 (2006.01)
   (Continued)

(52) U.S. Cl.
   CPC ............ G05D 1/0295 (2013.01); B60Q 9/00 (2013.01); G05D 1/0022 (2013.01);
   (Continued)

(58) Field of Classification Search
   CPC .................................................. G05D 1/0295
   (Continued)

(56) References Cited

U.S. PATENT DOCUMENTS 5,375,059 A * 12/1994 Kyrtsos ................. G01S 19/47
                                                          701/470
5,555,503 A *  9/1996 Kyrtsos ................. G01S 19/47
                                                          701/518
(Continued)

FOREIGN PATENT DOCUMENTS

CN          105313891 A  *  2/2016
WO     WO2018/035145 A1  *  8/2016

OTHER PUBLICATIONS

Google Patens Machine Translation of CN105313891A (Downloaded on Jan. 27, 2020).*

*Primary Examiner* — Jean Paul Cass
(74) *Attorney, Agent, or Firm* — Global IP Counselors, LLP

(57) ABSTRACT

A system for determining the number of remote vehicles following a host vehicle includes a receiver and an electronic controller. The receiver receives information related to a plurality of remote vehicles, including, for each remote vehicle, a vehicle location and a vehicle travel path. The electronic controller determines a location and a travel path of the host vehicle, compares the location of the host vehicle with the vehicle location of each of the remote vehicles, compares the travel path of the host vehicle with the vehicle travel path of each of the remote vehicles, and causes the host vehicle to perform a mitigation operation when the electronic controller determines that a predetermined number of the remote vehicles are disposed behind the host vehicle, and the travel path of the host vehicle and the vehicle travel path of each of the predetermined number of the remote vehicles is the same.

20 Claims, 34 Drawing Sheets

(51) Int. Cl.
*G08G 1/01* (2006.01)
*B60Q 9/00* (2006.01)
*G05D 1/00* (2006.01)

(52) U.S. Cl.
CPC ......... *G05D 1/0027* (2013.01); *G05D 1/0289* (2013.01); *G08G 1/0137* (2013.01); *G08G 1/166* (2013.01)

(58) Field of Classification Search
USPC .......................................................... 701/24
See application file for complete search history.

(56) References Cited

U.S. PATENT DOCUMENTS

| | | | | |
|---|---|---|---|---|
| 6,107,941 | A * | 8/2000 | Jones | G08G 1/0955 116/63 R |
| 6,151,539 | A * | 11/2000 | Bergholz | G01S 17/931 701/25 |
| 6,737,963 | B2 | 5/2004 | Gutta | B60Q 9/008 180/271 |
| 7,941,261 | B2 * | 5/2011 | Johnsen | B64C 25/426 701/70 |
| 8,996,224 | B1 * | 3/2015 | Herbach | G05D 1/0044 701/23 |
| 9,767,366 | B1 * | 9/2017 | Fairfield | G05D 1/0253 |
| 9,934,440 | B1 * | 4/2018 | Kim | G06K 9/4628 |
| 2001/0054970 | A1 * | 12/2001 | Jones | G08G 1/0955 340/915 |
| 2005/0088318 | A1 | 4/2005 | Liu et al. | |
| 2007/0213911 | A1 * | 9/2007 | Trombley | B60T 8/17558 701/70 |
| 2009/0295601 | A1 * | 12/2009 | Villaume | G08G 1/22 340/961 |
| 2010/0256852 | A1 * | 10/2010 | Mudalige | G08G 1/22 701/24 |
| 2011/0190972 | A1 * | 8/2011 | Timmons | G08G 1/166 701/31.4 |
| 2012/0173069 | A1 * | 7/2012 | Tsimhoni | G01C 21/365 701/25 |
| 2013/0110368 | A1 * | 5/2013 | Zagorski | B60T 7/22 701/70 |
| 2014/0032023 | A1 * | 1/2014 | Kumar | B60T 7/12 701/20 |
| 2015/0158495 | A1 * | 6/2015 | Duncan | G08G 1/096716 701/1 |
| 2015/0161893 | A1 * | 6/2015 | Duncan | G07C 5/0816 701/1 |
| 2015/0161894 | A1 * | 6/2015 | Duncan | G06K 9/00845 701/1 |
| 2015/0234045 | A1 * | 8/2015 | Rosenblum | G01S 13/86 342/71 |
| 2016/0016566 | A1 * | 1/2016 | Kumar | B60T 8/1705 701/70 |
| 2016/0082885 | A1 * | 3/2016 | Rashid | G08G 1/166 340/435 |
| 2016/0170021 | A1 * | 6/2016 | Rashid | G01S 13/931 342/70 |
| 2016/0171894 | A1 * | 6/2016 | Harvey | G05D 1/0293 701/23 |
| 2016/0172842 | A1 * | 6/2016 | Panosyan | H02P 9/006 307/103 |
| 2016/0375766 | A1 * | 12/2016 | Konet | G06T 7/70 348/148 |
| 2016/0375767 | A1 * | 12/2016 | Konet | B60K 35/00 701/23 |
| 2016/0375768 | A1 * | 12/2016 | Konet | G08G 1/166 348/148 |
| 2017/0220876 | A1 * | 8/2017 | Gao | G06K 9/3241 |
| 2017/0341647 | A1 * | 11/2017 | Rajvanshi | B60W 30/12 |
| 2018/0074513 | A9 * | 3/2018 | Harvey | B60Q 1/50 |
| 2018/0186381 | A1 * | 7/2018 | Erlien | B60W 10/20 |
| 2018/0297567 | A1 * | 10/2018 | Gonidec | B60T 8/171 |
| 2018/0307925 | A1 * | 10/2018 | Wisniowski | G06K 9/6271 |
| 2018/0321686 | A1 * | 11/2018 | Kanzawa | G08G 1/166 |
| 2018/0329035 | A1 * | 11/2018 | Pacala | H01L 31/02327 |
| 2019/0011556 | A1 * | 1/2019 | Pacala | G01S 17/08 |
| 2019/0092318 | A1 * | 3/2019 | Mei | G06K 9/00825 |
| 2019/0156485 | A1 * | 5/2019 | Pfeiffer | G05D 1/0253 |
| 2019/0179028 | A1 * | 6/2019 | Pacala | G01S 7/4816 |

* cited by examiner

SYSTEM FOR DETERMINING THE NUMBER OF REMOTE VEHICLES FOLLOWING A HOST VEHICLE

BACKGROUND

Field of the Invention

The present invention generally relates to a system for determining the number of remote vehicles following a host vehicle. More specifically, the present invention relates to a system for determining the number of remote vehicles following a host vehicle, and causing the host vehicle to perform a mitigation operation when a predetermined number of the plurality of remote vehicles are disposed behind the host vehicle.

Background Information

Many states have statutes that require vehicles traveling along two-lanes to pull over, when safe to do so, if a specific number of vehicles are following behind. These statutes require slower moving vehicles to pull over to reduce the likelihood of head-on crashes due to following vehicles attempting to pass the slower moving host vehicle.

SUMMARY

It has been found that it is difficult to discern the number of vehicles following behind a vehicle, since drivers are limited to the field of view of the vehicle's rearview mirrors. Moreover, states have different requirements, which can cause confusion and uncertainty regarding the legal obligation to pull over.

In view of the state of the known technology, one aspect of the present disclosure is to provide a system for determining the number of remote vehicles following a host vehicle. The system comprises a receiver and an electronic controller. The receiver is configured to receive information related to a plurality of remote vehicles, the information for the plurality of remote vehicles including, for each vehicle, a vehicle location and a vehicle travel path. The electronic controller is configured to determine a location and a travel path of the host vehicle, compare the location of the host vehicle with the vehicle location of each of the plurality of remote vehicles, compare the travel path of the host vehicle with the vehicle travel path of each of the remote vehicles, and cause the host vehicle to perform a mitigation operation when the electronic controller determines that a predetermined number of the plurality of remote vehicles are disposed behind the host vehicle, and the travel path of the host vehicle and the vehicle travel path of each of the predetermined number of the plurality of remote vehicles is the same.

Another aspect of the present disclosure is to provide a method for determining the number of remote vehicles following a host vehicle. The method comprises receiving information, via a receiver, related to a plurality of remote vehicles, the information for the plurality of remote vehicles including, for each remote vehicle, a vehicle location and a vehicle travel path, determining, via an electronic controller, a location and a travel path of the host vehicle, comparing, via the electronic controller, the location of the host vehicle with the vehicle location of each of the plurality of remote vehicles, comparing, via the electronic controller, the travel path of the host vehicle with the vehicle travel path of each of the remote vehicles, and performing a mitigation operation when the electronic controller determines that a predetermined number of the plurality of remote vehicles are disposed behind the host vehicle, and the travel path of the host vehicle and the vehicle travel path of each of the predetermined number of the plurality of remote vehicles is the same.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
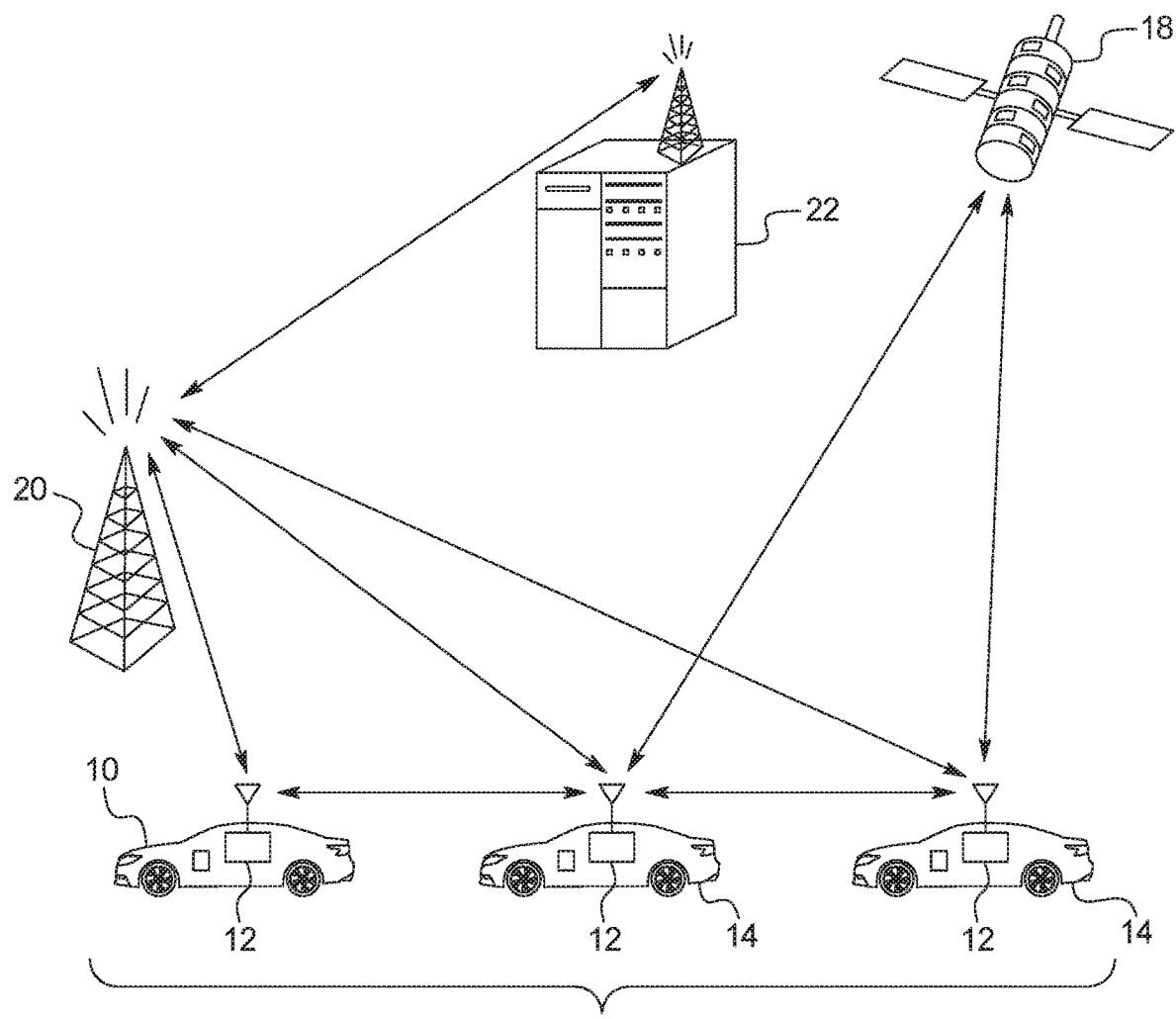
FIG. 1 illustrates the communication methods for a system for determining the number of remote vehicles following a host vehicle in accordance with an embodiment of the present invention.

Referring initially to FIG. 1, a two-way wireless communications network is illustrated that includes vehicle to vehicle communication and vehicle to base station communication. In FIG. 1, a host vehicle 10 is illustrated that is equipped with a system 12 for determining the number of remote vehicles following a host vehicle according to a disclosed embodiment, and the two remote vehicles 14 that can also include the system 12 for determining the number of remote vehicles following a host vehicle. While the host vehicle 10 and the remote vehicle 14 are illustrated as having the same system 12 for determining the number of remote vehicles following the host vehicle, it will be apparent from this disclosure that each of the remote vehicles 14 can include another type of system for determining the number of remote vehicles following a host vehicle (or any other system) that is capable of communicating information about at least the location, direction and speed of the remote vehicle 14 to the host vehicle 10.

As can be understood, in many jurisdictions, a vehicle traveling along two-lanes must pull over, when safe to do so, if a predetermined number of vehicles are following. For example, some jurisdictions require the host vehicle 10 to pull over if five or more remote vehicles 14 are following behind. Other jurisdictions may require the host vehicle 10 to pull over if four or more vehicles are following behind or any other number of remote vehicles 14 are following behind. This requirement can reduce the likelihood of head-on crashes due to following remote vehicles 14 attempting to pass the host vehicle 10.

However, as one of ordinary skill can understand drivers currently have limited field of view to discern whether the predetermined number of remote vehicles 14 has accumulated behind the host vehicle 10. Add to this the fact that differing jurisdictions have differing requirements compounds the vehicle operator's uncertainty of whether or not the host vehicle 10 is required to pull over.

The system 12 for determining the number of remote vehicles following a host vehicle improves the host vehicle's 10 determination of following remote vehicles 14. The system 10 for determining the number of remote vehicles following a host vehicle enables the host vehicle 10 or the operator of the host vehicle 10 to understand the jurisdictional requirements and perform a mitigation operation when required or desired.

The system 12 for determining the number of remote vehicles following a host vehicle of the host vehicle 10 and the remote vehicle 14 communicate with the two-way wireless communications network. As seen in FIG. 1, for example, the two-way wireless communications network can include one or more global positioning satellites 18 (only one shown), and one or more roadside (terrestrial) units 20 (only one shown), and a base station or external server 22. The global positioning satellites 18 and the roadside units 20 send and receive signals to and from the system 12 for determining the number of remote vehicles following a host vehicle of the host vehicle 10 and the remote vehicles 14. The base station 22 sends and receives signals to and from the system 12 for determining the number of remote vehicles following a host vehicle of the host vehicle 10 and the remote vehicles 14 via a network of the roadside units 20, or any other suitable two-way wireless communications network.

Figure 2:
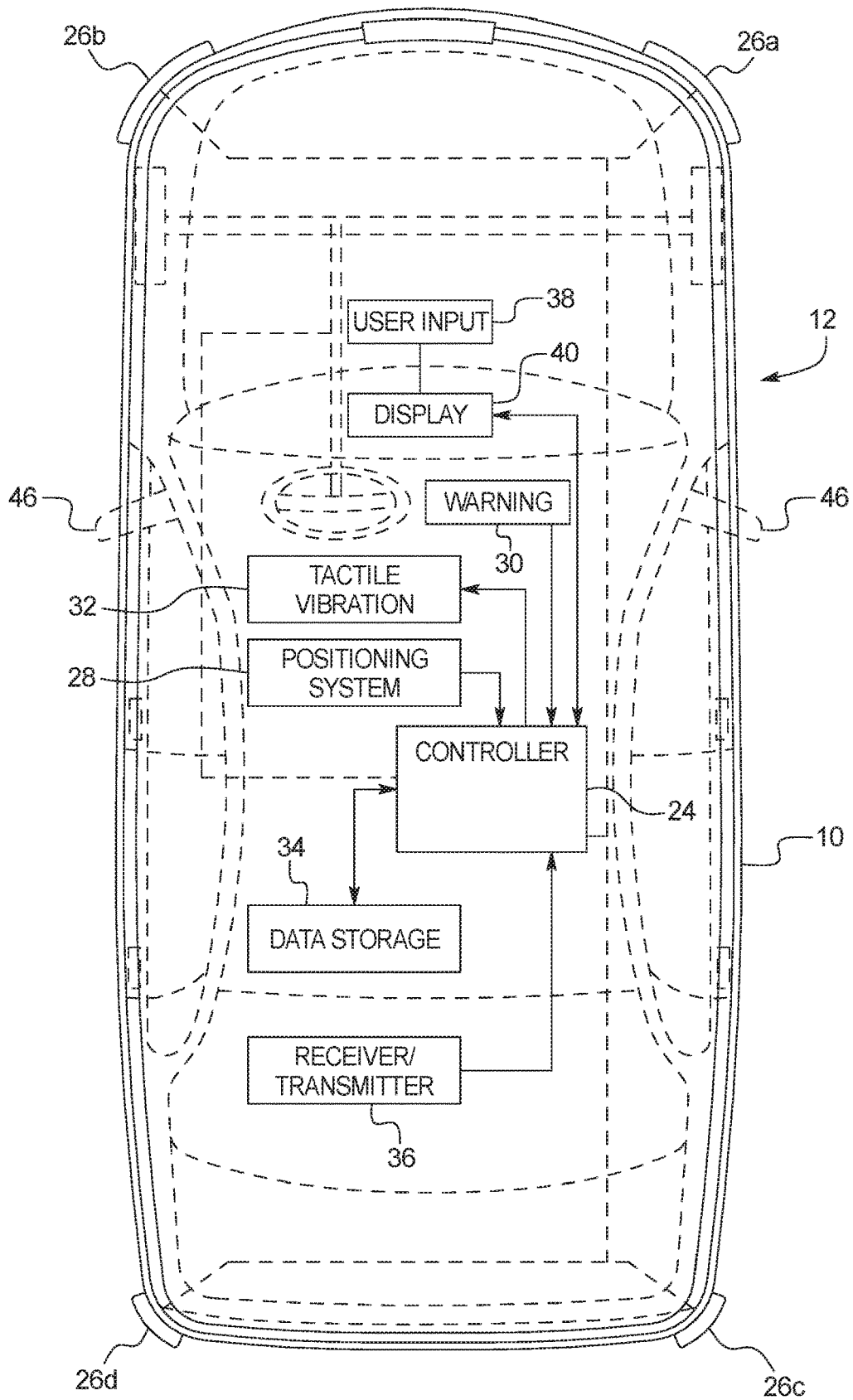
FIG. 2 illustrates a host vehicle including the system for determining the number of remote vehicles following the host vehicle of FIG. 1.

Referring to FIG. 2, a system 12 for a host vehicle 10 is illustrated in accordance with one embodiment. The system 12 includes a controller 24, sensor system (sensors 26a-26d), a positioning system 28, a warning indicator 30 or system, a tactile vibration system 32, data storage 34 and receiver/transmitter system 36.

The controller 24 is preferably and electronic controller and includes a microcomputer with a control program that controls the system 12 as discussed below. The controller 24 can also include other conventional components such as an input interface circuit, an output interface circuit, and storage device(s) (data storage 34) such as a ROM (Read Only Memory) device and a RAM (Random Access Memory) device. The microcomputer of the controller 24 is programmed to control one or more of the sensor system (sensors 26a-26d), a positioning system 28, a warning indicator 30 or system, a tactile vibration system 32, data storage 34 and receiver/transmitter system 36, and to make determinations or decisions, as discussed herein. The memory circuit stores processing results and control programs, such as ones for the sensor system (sensors 26a-26d), a positioning system 28, a warning indicator 30 or system, a tactile vibration system 32, data storage 34 and receiver/transmitter system 36 operation that are run by the processor circuit. The controller 24 is operatively coupled to the sensor system (sensors 26a-26d), a positioning system 28, a warning indicator 30 or system, a tactile vibration system 32, data storage 34 and receiver/transmitter system 36 in a conventional manner, as well as other electrical systems in the vehicle 10, such the turn signals, windshield wipers, lights and any other suitable systems. Such a connection enables the controller 24 to monitor and control any of these systems as desired. The internal RAM of the controller 24 stores statuses of operational flags and various control data. The internal ROM of the controller 24 stores the information for various operations. The controller 24 is capable of selectively controlling any of the components of the sensor system (sensors 26a-26d) in accordance with the control program. It will be apparent to those skilled in the art from this disclosure that the precise structure and algorithms for the controller 24 can be any combination of hardware and software that will carry out the functions of the present invention.

As shown in FIG. 2, the controller 24 can include or be in communication with user input devices 38 and display 40. The user input devices 38 can include, for example, a human-machine interface (HMI) which enables a user (e.g., the driver and/or passenger) to interact with the system 12 as understood in the art and discussed herein. The controller 24 can further include or be in communication with one or more data storage(s) 34 which can store information as discussed herein. The display 40 enables the controller 24 to provide information and/or feedback concerning the system 12 or any other suitable information. For example, in one embodiment, in addition to or in replacement of the warning indicator 30, the display 40 can display information regarding the remote vehicles 14, the number of remote vehicles 14 and the position of the remote vehicles 14. The display 40 can provide instructions to the operator of the host vehicle 10 to enable the driver of the host vehicle 10 to perform the appropriate mitigation operation.

In one embodiment, the sensor system (sensors 26a-26d) can include proximity sensors and optical sensors. In one embodiment, the proximity sensors include a plurality of sensors (sensors 26a-26d), and are configured to detect the boundary 42 of the road 44 or other stationary or moving objects (e.g., remote vehicles 14) in proximity to the sensor system (sensors 26a-26d). For example, as illustrated in FIG. 2, front sensors 24a and 24b in the sensor system are preferably mounted externally on the front bumper and rear sensors 24c and 24d are mounted externally on the rear bumper of host vehicle 10. However, the sensors 26a-26d in the sensor system may be mounted on any suitable external portion of the host vehicle 10, including the front and rear quarter panels, the external mirrors or any combination of suitable areas.

The sensor system (sensors 26a-26d) is preferably configured to be capable of detecting a boundary 42 of a lane or a road 44 or other stationary or moving objects (e.g., remote vehicles 14). However, the sensor system (sensors 26a-26d) can be any type of system desirable. For example, the front sensors 26a and 26b in the sensor system (sensors 26a-26d) can include a long-range radar device for detection in front of the host vehicle 10. The front radar sensor may be configured to detect objects at a predetermined distance (e.g., distances up to 200 m), and thus may have a narrow field of view angle (e.g., around 15°). Due to the narrow field of view angle, the long-range radar may not detect all objects in the front of the host vehicle 10. Thus, if desired, the front sensors 26a and 26b can include short-range radar devices to assist in monitoring the region in front of the host vehicle 10. The rear sensors 26c and 26d may include short-range radar devices to assist in monitoring objects behind the host vehicle 10. However, the sensors in the sensor system (sensors 26a-26d) can be disposed in any position of the host vehicle 10 and may include any type and/or combination of sensors to enable detection of a remote vehicle 14. In addition, the sensor system (sensors 26a-26d) may include cameras (e.g., mounted on the mirrors 46 or any other suitable place), radar sensors, photo sensors or any combination thereof. Although FIG. 2 illustrates four sensor sensors 26a-26d, there can be as few or as many sensors desirable or suitable.

Although the sensor system (sensors 26a-26d) can be electronic detection devices that transmit either electronic electromagnetic waves (e.g., radar), the sensors 26a-26d can be any suitable sensors that, for example, take computer-processed images with a digital camera and analyzes the images or emit lasers, as is known in the art. The sensor system (sensors 26a-26d) may be capable of detecting at least the speed, direction, yaw, acceleration and distance of the host vehicle 10 relative to the boundary 42 of the road 44 or other stationary or moving objects. Further, the sensor system (sensors 26a-26d) may include object-locating sensing devices including range sensors, such as FM-CW (Frequency Modulated Continuous Wave) radars, pulse and FSK (Frequency Shift Keying) radars, sonar and Lidar (Light Detection and Ranging) devices, and ultrasonic devices which rely upon effects such as Doppler-effect measurements to locate forward objects. Object-locating devices may include charged-coupled devices (CCD) or complementary metal oxide semi-conductor (CMOS) video image sensors, and other known camera/video image processors which utilize digital photographic methods to "view" forward objects including one or more remote vehicles 14. The sensor system (sensors 26a-26d) is in communication with the controller 24, and is capable of transmitting information to the controller 24.

Additionally, the sensor system (sensors 26a-26d) is capable of determining the distance from the left, right, front and rear of the vehicle 10 to a road boundary 42 or other stationary or moving objects. For example, the sensor system (sensors 26a-26d) is capable of detecting the road boundary 42, such as a curb, lane marker, etc., or other stationary or moving objects to the left and right of the vehicle 10. Additionally, the sensor system (sensors 26a-26d) can include internal sensors capable of determining the steering wheel angle, the steering wheel angular speed and the vehicle speed along the road 44. Based on this information, the controller 24 is capable of calculating the relative position, relative speed, angle of the vehicle 10 relative to the road boundary 42, and estimated future position of the host vehicle 10.

The sensor system (sensors 26a-26d) is further capable of detecting remote vehicles 14 both in front of and behind the host vehicle 10. Thus, the sensor system can transmit information relating to the speed and location of a following remote vehicle 14, a leading remote vehicle, a remote vehicle 14 that is traveling in an adjacent lane and traveling in an opposite direction of the host vehicle 10 and any other moving and or stationary remote vehicle 14.

The warning indicator 30 may include warning lights and/or a warning audio output and is in communication with the controller 24. For example, the warning indicator 30 may include a visual display or light indicator that flashes or illuminates the instrument cluster on the instrument panel IP of the host vehicle 10, activates a heads-up display is a visual readout in the display 40, is an audible noise emitted from speaker, or any other suitable visual display or audio or sound indicator or combination thereof that notifies the operator or interior occupant of the host vehicle 10 that a predetermined number of remote vehicles 14 are following the host vehicle 10.

As shown in FIG. 2, the tactile vibration system 32 may include tactile feedback generated by the tactile vibration system 32 that can be a vibration actuator in the steering wheel SW, the driver seat, or any other suitable location within the host vehicle 10. That is, the feedback operation can include providing haptic feedback to a portion of an interior of the vehicle 10 located proximate to the driver. For example, the feedback operation may be a feedback force within the steering system that notifies the operator that the steering wheel should be turned in a specific direction. Such a feedback operation does not necessarily need to alter the trajectory of the vehicle 10 but may be a minor turn of the steering wheel simply to notify the driver that a steering wheel operation is necessary. The tactile vibration system 32 can thus provide feedback to the driver based on a predetermined set of criteria. The tactile vibration system 32 is connected to the controller 24, which is programmed to operate the tactile vibration system 32 to warn the driver or control the vehicle 10.

Additionally, the system 12 may also be connected to the steering system of the vehicle 10, such that the controller 24 can control the steering system of the vehicle 10 based on a predetermined set of criteria. The controller 24 can be connected to the steering wheel or any other suitable portion of the steering system. That is, the controller 24 can apply an assist force to a portion of the steering system of the vehicle 10 to cause movement of the vehicle 10 towards the boundary 42.

The system 12 may include a positing system 26, such as a GPS. In one embodiment the vehicle 10 receives a GPS satellite signal. As is understood, the GPS processes the GPS satellite signal to determine positional information (such as location, speed, acceleration, yaw, and direction, just to name a few) of the vehicle 10. As noted herein, the positioning system 28 is in communication with the controller 24, and is capable of transmitting such positional information regarding the host vehicle 10 to the controller 24. Moreover, the controller can cause host vehicle information (e.g., location, speed, acceleration, yaw, and direction, just to name a few) to remote vehicles 14 via the receiver/transmitter system 36, and receive information (e.g., location, speed, acceleration, yaw, and direction, just to name a few) from remote vehicles 14 via the receiver/transmitter system 36.

The positioning system 28 also can also include or be in communication with the data storage 34 that stores map data. Thus, in determining the position of the host vehicle 10 using any of the herein described methods, devices or systems, the positioning host of the vehicle 10 may be compared to the known data stored in the data storage 34. Thus, the system 12 may accurately determine the location of the host vehicle 10 on an electronic map. The storage device 34 may also store any additional information including the current or predicted vehicle position and any past vehicle 10 position or any other suitable information.

The receiver/transmitter system 36 is preferably the system that communicates with the two-way wireless communication network discussed above. The receiver/transmitter system 36 is configured to send information to the external server 22, the cloud C or internet. The receiver/transmitter system 36 can send and receive information in any suitable manner, such as data packets. The receiver/transmitter system 36 can send and receive information to and from the two-way wireless communication network, directly to other vehicles (e.g., remote vehicles 14) or in a suitable manner. When communication with other vehicles, the information can be sent directly to the remote vehicle 14, when in range, or through blockchain. Blockchain communication could be encrypted information that is sent from the host vehicle 10 to the remote vehicle 14 through other remote vehicles 14 or portable devices. The electronic controllers of the other vehicles or portable devices would serve as the blocks of the chain between the host vehicle 10 and the remote vehicle 14.

The receiver/transmitter system 36 includes, for example, a receiver and a transmitter configured as individual components or as a transceiver, and any other type of equipment for wireless communication. For example, the receiver/transmitter system 36 is configured to communicate wirelessly over one or more communication paths. Examples of communication paths include a cellular telephone network, a wireless network (Wi-Fi or a WiMAX), a DSRC (Dedicated Short-Range Communications) network, a power line communication network, etc. The receiver/transmitter system 36 is configured to receive information from external sources and to transmit such information to the controller 24. For example, the receiver/transmitter system 36 can communicate with another vehicle, or any other suitable entity via a communication network, direct communication, or in any suitable manner as understood in the art.

Figure 3:
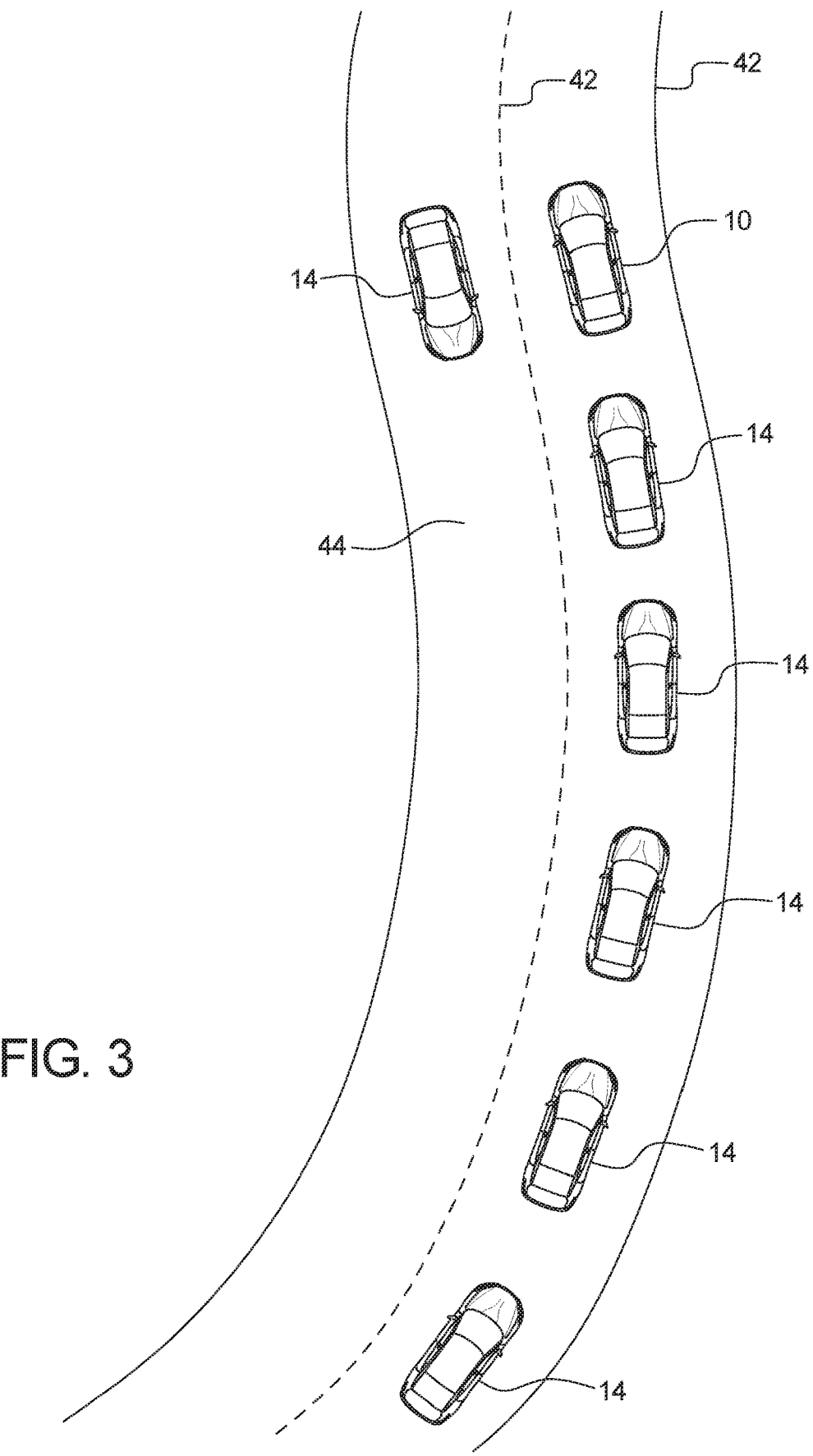
FIG. 3 illustrates a host vehicle including the system for determining the number of remote vehicles following the host vehicle of FIG. 2 traveling along a two-lane road.

FIGS. 3-6 illustrate the procedure for enabling the host vehicle 10 to allow at least one remote vehicle 14 to pass when a predetermined number of remote vehicles 14 are following the host vehicle 10. Thus, as shown in FIG. 3, the system 12 for determining the number of remote vehicles 14 following a host vehicle 10 for the host vehicle 10 determines that the host vehicle 10 is traveling along a two-way road 44. That is, the controller 24 determines the location and the travel path of the host vehicle.

Such a determination can be made by detecting the road markers or road boundaries 42, and at least the speed, direction, yaw, acceleration and distance of the host vehicle 10. As can be understood, many jurisdictions separate oncoming lanes on a two-lane road with a single dashed (yellow) line, and the shoulder or side of the road with a solid white line. Accordingly, when the sensor system (sensors 26a-26d) detects this configuration of road markers or any other appropriate configuration of road markers, the controller 24 can determine that the host vehicle 10 is traveling along a two-lane road. The sensor system (sensors 26a-26d) is configured to detect differing types of lane markers as road boundaries 42 and structures.

Alternatively, or in conjunction with the above determination, the sensor system (sensors 26a-26d) can detect a remote vehicle 14 traveling in an opposite direction from the host vehicle 10 within a predetermined distance. For example, if the host vehicle 10 determines that the remote vehicle 14 is traveling in an opposite direction and passes within 15 feet of the host vehicle 10, the controller 24 can determine that the host vehicle 10 is traveling along a two-lane road 44.

Once the system 12 has determined that the host vehicle 10 is traveling along a two-lane road 44, the host vehicle 10 can determine the jurisdictional requirements for allowing the following remote vehicles 14 to pass. In one embodiment, the jurisdiction can be determined by GPS coordinates. That is, the system 12 can use the positioning system 26 to obtain location coordinates and compare to a map stored in the data storage 34. Such information would enable the system 12 to determine the local jurisdiction, and review a stored data table for the jurisdictional requirements. That is, the system would determine the location of the host vehicle 10, determine the host vehicle is within a certain jurisdiction, and review a jurisdictional data base saved in the data storage 34 to determine the jurisdictional requirements for a vehicle when being followed by a plurality of vehicles on a two-lane road 44.

Figure 7:
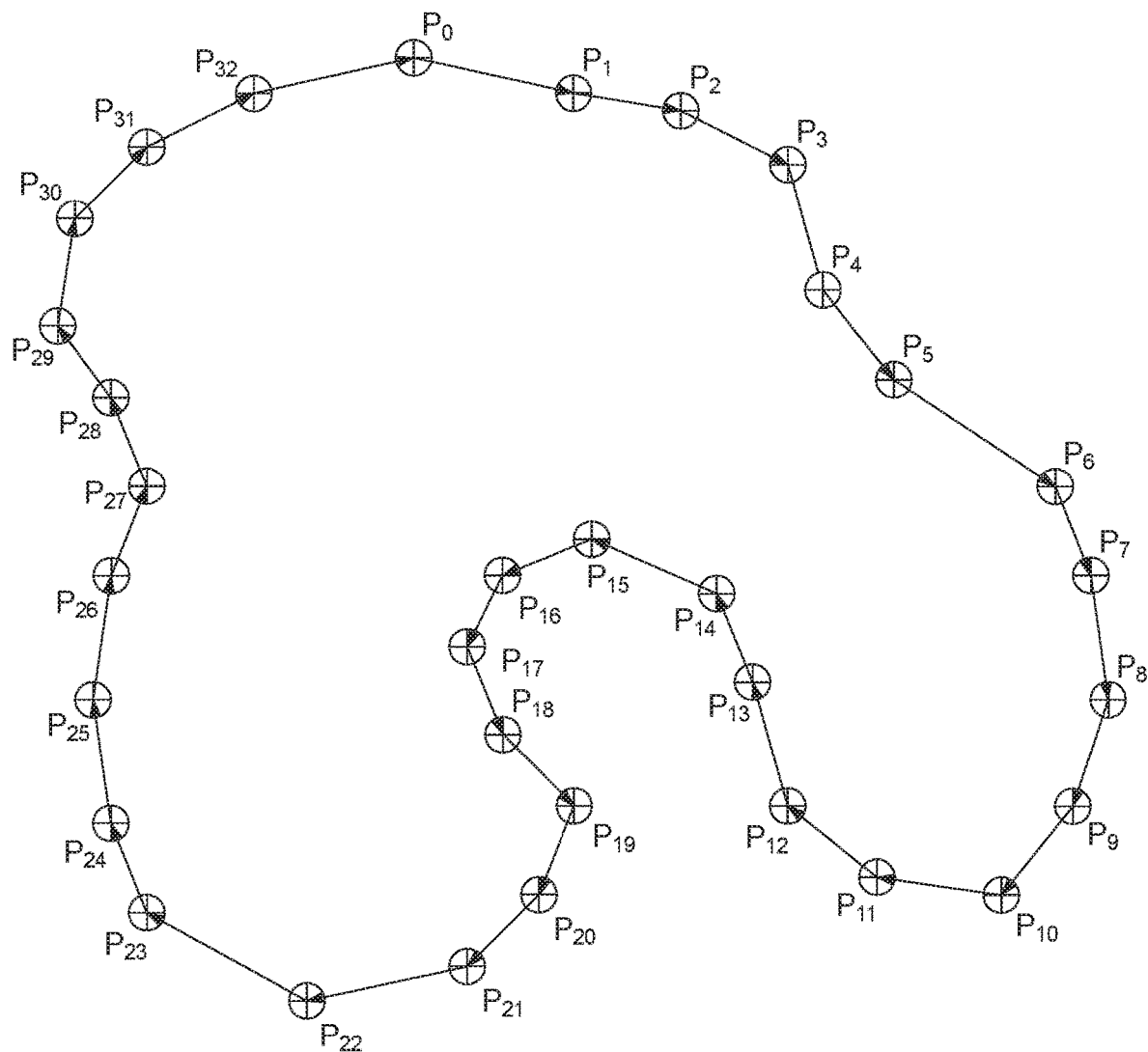
FIG. 7 illustrates one method the system for determining the number of remote vehicles following the host vehicle of FIG. 2 can use to determine the jurisdiction the position of the host vehicle falls within.

Alternatively, as shown in FIGS. 7-21, the system can determine a surrounding two-dimensional area around the vehicle. The perimeter of any two-dimensional area, regardless of shape, describes a 360-degree path where the start and end points are the same. This principle is the basis of a method described here to determine whether some point, k will fall inside the area encompassed by the path. Any path that encircles a two-dimensional area can be defined by a series of points $P_0$-$P_{32}$ along the path as shown in FIG. 7. Thus, a known jurisdictional area will have a two-dimensional area. The system can determine whether the host vehicle 10 lies within this jurisdictional area.

Figure 8:
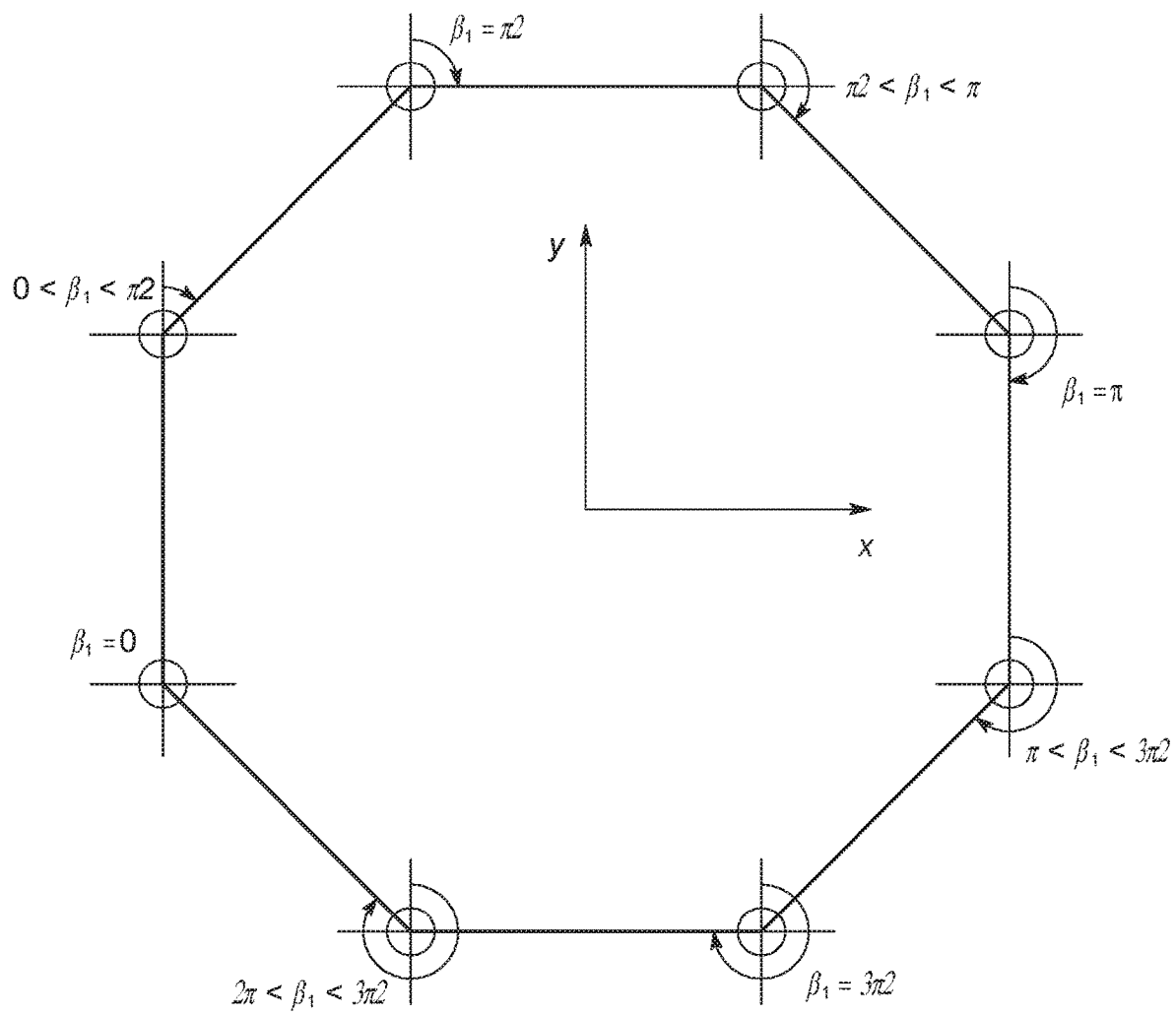
FIG. 8 illustrates the eight ways a line segment between two consecutive points can be characterized by the system for determining the number of remote vehicles following the host vehicle of FIG. 2 when determining the boundaries of a jurisdiction.

The number of points used to define the path is immaterial (as many points can be used as needed to accurately define the path). Note that the direction taken along the path is clockwise. The line segment between two consecutive points on a path can be characterized in one of eight ways as shown in FIG. 8.

Mathematically, $\beta_1$ can be expressed as follows:

$$\beta_1 = \pi\left(\frac{x_m - x_{m+1} + \sigma}{|x_m - x_{m+1}| + \sigma} + 1\right) - \cos^{-1}\left(\frac{y_{m+1} - y_m}{\sqrt{(x_{m+1} - x_m)^2 + (y_{m+1} - y_m)^2}}\right)\left(\frac{x_m - x_{m+1} + \sigma}{|x_m - x_{m+1}| + \sigma}\right)$$

The length of the line between two consecutive points is a straight line defined as follows:

$$l_k = \sqrt{(x_{m+1} - x_m)^2 + (y_{m+1} - y_m)^2}$$

Assume that the host vehicle 10 position is defined by a variable, k. It is desired to know whether k will encroach within the boundary defined by the jurisdiction defined previously. This determination can be made by using the following steps.

Determine the point, $p_m$ (with coordinates $x_m$ and $y_m$) on the path that is closest to k (with coordinates $x_k$ and $y_k$) by calculating the straight-line distance between each point on the path and k then choosing the shortest line. This distance, $l_{m+1}$ is defined as follows:

$$l_{m+1} = \sqrt{(x_k - x_m)^2 + (y_k - y_m)^2}$$

Figure 9:
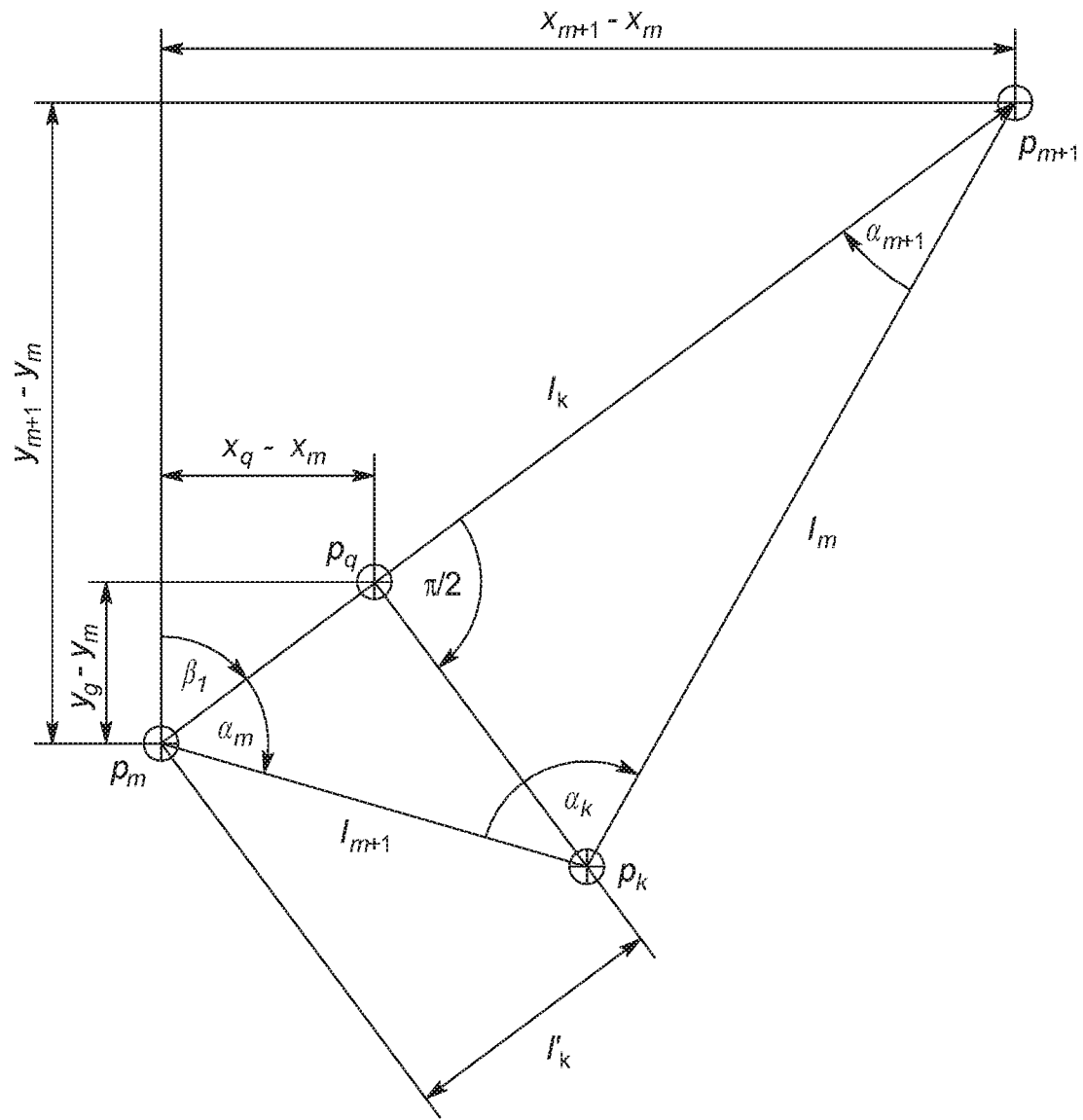
FIG. 9 illustrates a step the system for determining the number of remote vehicles following the host vehicle of FIG. 2 uses when the determining the boundaries of a jurisdiction

After the point on the path that is closest to k has been identified, the next consecutive point on the path is chosen and a triangle is defined as shown in FIG. 9.

As shown in FIG. 9:

$$l_k = \sqrt{(x_{m+1} - x_m)^2 + (y_{m+1} - y_m)^2}$$

$$l_m = \sqrt{(x_{m+1} - x_k)^2 + (y_{m+1} - y_k)^2}$$

$$l_{m+1} = \sqrt{(x_m - x_k)^2 + (y_m - y_k)^2}$$

And from the Law of Cosines:

$$\cos\alpha_k = \frac{l_m^2 + l_{m+1}^2 - l_k^2}{2 l_m l_{m+1}}$$

$$\cos\alpha_m = \frac{l_k^2 + l_{m+1}^2 - l_m^2}{2 l_k l_{m+1}}$$

$$\cos\alpha_{m+1} = \frac{l_k^2 + l_m^2 - l_{m+1}^2}{2 l_k l_m}$$

Case 1: $l_k^2 + l_{m+1}^2 - l_m^2 \geq 0$

Figure 10:
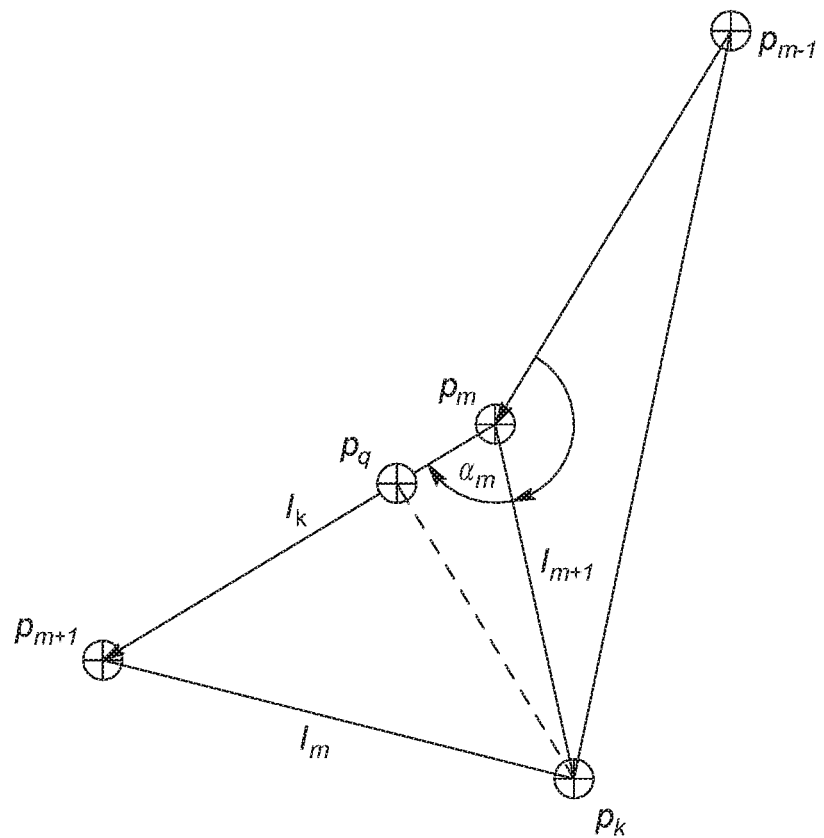
FIG. 10 illustrates a step the system for determining the number of remote vehicles following the host vehicle of FIG. 2 uses when the determining the boundaries of a jurisdiction.

Referring to FIG. 10, if $l_k^2 + l_{m+1}^2 - l_m^2 \geq 0$, $\cos\alpha_m$ is greater than 0 and the coordinates $x_q$ and $y_q$ for point $p_q$ are calculated as follows.

Determine $x_q$ as follows:

$$l_k' = l_{m+1} \cos\alpha_m = l_{m+1} \frac{l_k^2 + l_{m+1}^2 - l_m^2}{2 l_k l_{m+1}} = \frac{l_k^2 + l_{m+1}^2 - l_m^2}{2 l_k}$$

$$x_q - x_m = l_k' \sin\beta_1$$

Where $$\sin\beta_1 = \frac{x_{m+1} - x_m}{l_k}$$

Make substitutions to obtain:

$$x_q - x_m = \frac{l_k^2 + l_{m+1}^2 - l_m^2}{2 l_k} \left( \frac{x_{m+1} - x_m}{l_k} \right)$$

$$x_q - x_m = \left( 1 + \frac{l_{m+1}^2 - l_m^2}{l_k^2} \right) \left( \frac{x_{m+1} - x_m}{2} \right)$$

$$x_q - x_m = \frac{x_{m+1} - x_m}{2} + \left( \frac{l_{m+1}^2 - l_m^2}{l_k^2} \right) \left( \frac{x_{m+1} - x_m}{2} \right)$$

$$x_q = \frac{x_{m+1} + x_m}{2} + \left( \frac{l_{m+1}^2 - l_m^2}{l_k^2} \right) \left( \frac{x_{m+1} - x_m}{2} \right)$$

Finally, expand to obtain:

$$x_q = \frac{x_{m+1} + x_m}{2} + \left( \frac{(x_m - x_k)^2 + (y_m - y_k)^2 - (x_{m+1} - x_k)^2 - (y_{m+1} - y_k)^2}{(x_{m+1} - x_m)^2 + (y_{m+1} - y_m)^2} \right) \left( \frac{x_{m+1} - x_m}{2} \right)$$

Determine $y_q$ as follows:

$$y_q - y_m = l_k' \cos\beta_1$$

Where:

$$\cos\beta_1 = \frac{y_{m+1} - y_m}{l_k}$$

Make substitutions to obtain:

$$y_q - y_m = \frac{l_k^2 + l_{m+1}^2 - l_m^2}{2 l_k} \left( \frac{y_{m+1} - y_m}{l_k} \right)$$

$$y_q - y_m = \left( 1 + \frac{l_{m+1}^2 - l_m^2}{l_k^2} \right) \left( \frac{y_{m+1} - y_m}{2} \right)$$

$$y_q - y_m = \frac{y_{m+1} - y_m}{2} + \left( \frac{l_{m+1}^2 - l_m^2}{l_k^2} \right) \left( \frac{y_{m+1} - y_m}{2} \right)$$

$$y_q = \frac{y_{m+1} + y_m}{2} + \left( \frac{l_{m+1}^2 - l_m^2}{l_k^2} \right) \left( \frac{y_{m+1} - y_m}{2} \right)$$

Finally, expand to obtain:

$$y_q = \frac{y_{m+1} + y_m}{2} + \left( \frac{(x_m - x_k)^2 + (y_m - y_k)^2 - (x_{m+1} - x_k)^2 - (y_{m+1} - y_k)^2}{(x_{m+1} - x_m)^2 + (y_{m+1} - y_m)^2} \right) \left( \frac{y_{m+1} - y_m}{2} \right)$$

Case 2: $l_k^2 + l_{m+1}^2 - l_m^2 < 0$ and $l_k^2 + l_{m-1}^2 - l_m^2 \geq 0$

Figure 11:
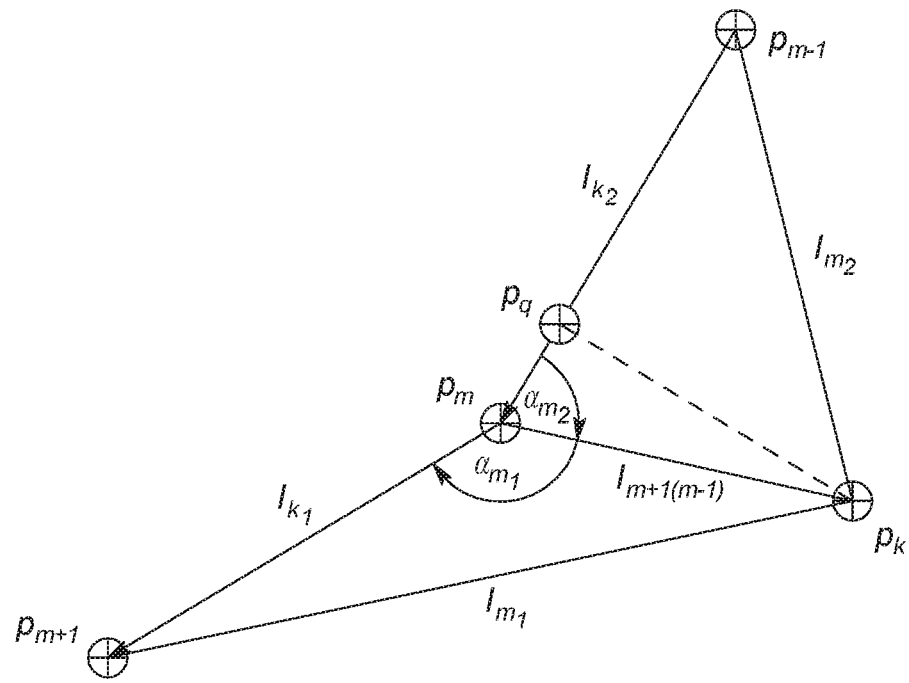
FIG. 11 illustrates a step the system for determining the number of remote vehicles following the host vehicle of FIG. 2 uses when the determining the boundaries of a jurisdiction.

Referring to FIG. 11 below, if $l_k^2 + l_{m+1}^2 - l_m^2 < 0$ (i.e. $\cos\alpha_{m1} < 0$) but $l_k^2 + l_{m-1}^2 - l_m^2 \geq 0$ (i.e. $\cos\alpha_{m2} \geq 0$), $p_m$ becomes $p_{m+1}$ and $p_{m-1}$ becomes $p_m$ and $x_q$ and $y_q$ are calculated in the same way as previously.

Thus:

$$x_q = \frac{x_{m+1} + x_m}{2} + \left( \frac{(x_m - x_k)^2 + (y_m - y_k)^2 - (x_{m+1} - x_k)^2 - (y_{m+1} - y_k)^2}{(x_{m+1} - x_m)^2 + (y_{m+1} - y_m)^2} \right) \left( \frac{x_{m+1} - x_m}{2} \right)$$

And $$y_q = \frac{y_{m+1} + y_m}{2} + \left( \frac{(x_m - x_k)^2 + (y_m - y_k)^2 - (x_{m+1} - x_k)^2 - (y_{m+1} - y_k)^2}{(x_{m+1} - x_m)^2 + (y_{m+1} - y_m)^2} \right) \left( \frac{y_{m+1} - y_m}{2} \right)$$

Case 3: $l_k^2 + l_{m+1}^2 - l_m^2 < 0$ and $l_k^2 + l_{m-1}^2 - l_m^2 < 0$

Figure 12:
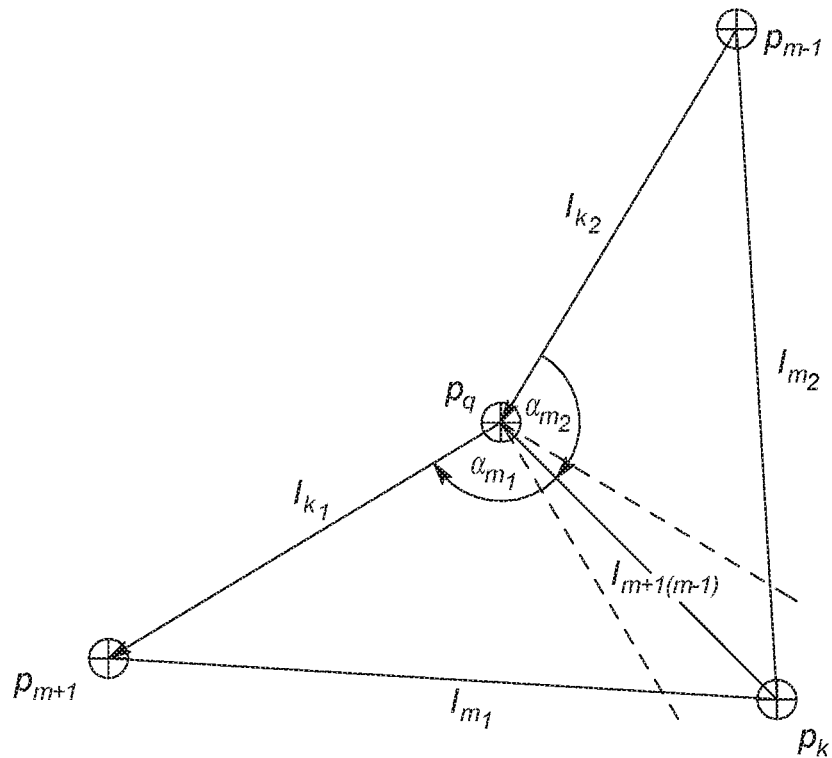
FIG. 12 illustrates a step the system for determining the number of remote vehicles following the host vehicle of FIG. 2 uses when the determining the boundaries of a jurisdiction.
Figure 13:
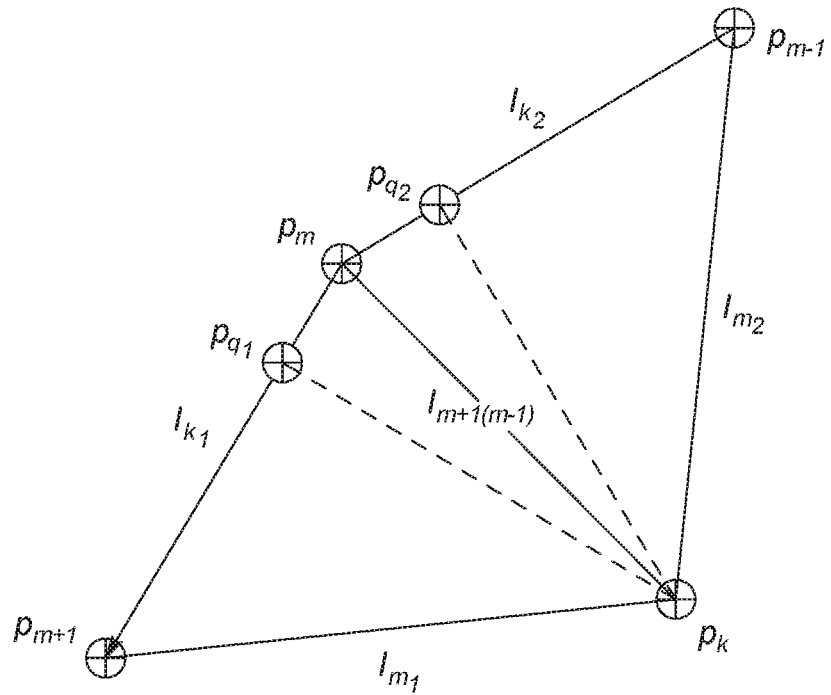
FIG. 13 illustrates a step the system for determining the number of remote vehicles following the host vehicle of FIG. 2 uses when the determining the boundaries of a jurisdiction.
Figure 14:
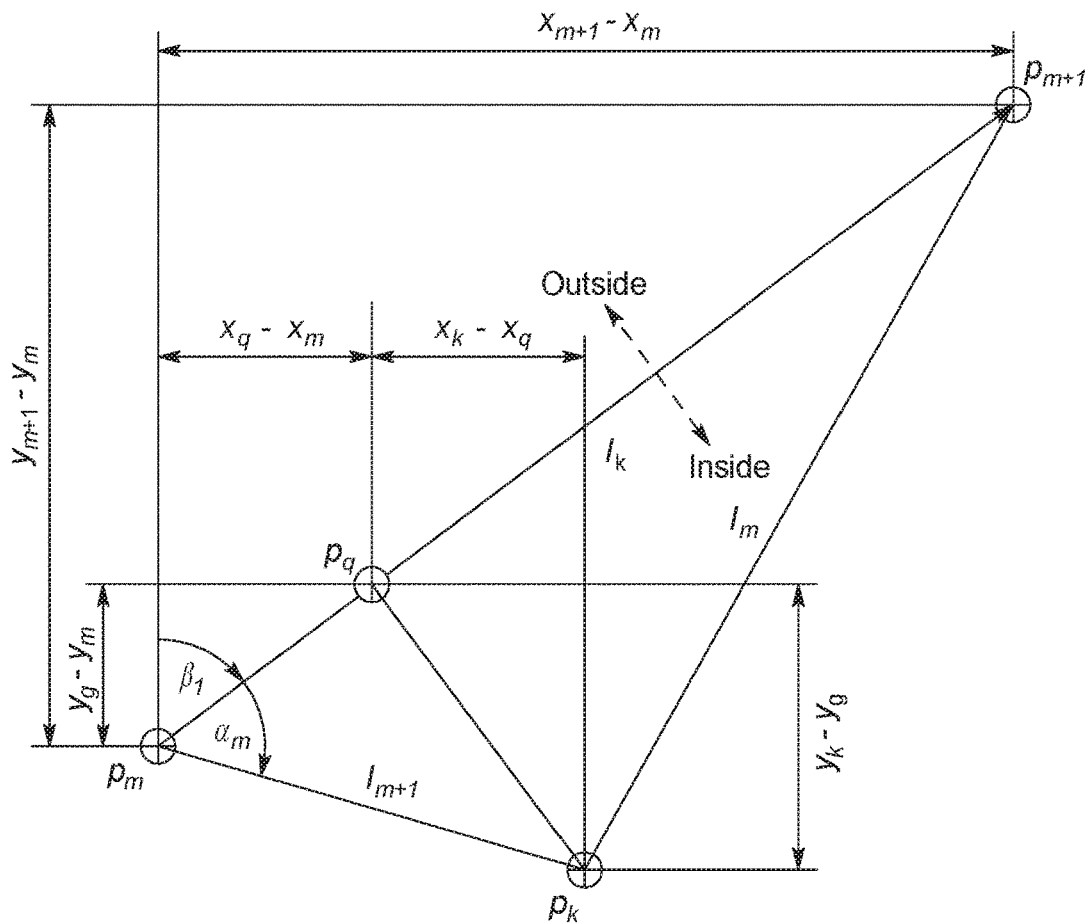
FIG. 14 illustrates a step the system for determining the number of remote vehicles following the host vehicle of FIG. 2 uses when the determining the boundaries of a jurisdiction.

Referring to FIG. 12, it is possible that $l_k^2 + l_{m+1}^2 - l_m^2 < 0$ and $l_k^2 + l_{m-1}^2 - l_m^2 < 0$ (i.e. $\cos\alpha_{m1}$ and $\cos\alpha_{m2} < 0$). In this case, $p_m$ becomes $p_q$ Thus:

$$x_q = x_m$$

And $$y_q = y_m$$

Case 4: $l_k^2 + l_{m+1}^2 - l_m^2 \geq 0$ and $l_k^2 + l_{m-1}^2 - l_m^2 \geq 0$ Referring to FIG. 13—$l_k^2 + l_{m+1}^2 - l_m^2 \geq 0$ and $l_k^2 + l_{m-1}^2 - l_m^2 \geq 0$ below, it is possible that $l_k^2 + l_{m+1}^2 - l_m^2 \geq 0$ and $l_k^2 + l_{m-1}^2 - l_m^2 \geq 0$ (i.e. $\cos\alpha_{m1}$ and $\cos\alpha_{m2} \geq 0$). In this situation, Case 1 applies.

Referring back to FIG. 8, expressions to determine if a point, k is inside or outside the area defined by the jurisdiction can be determined by the controller 24 for each of the eight characteristic configurations shown.

With the coordinates of $p_q(x_q, y_q)$ known the controller 24 can determine if point k lies within or outside the boundary defined by the jurisdiction.

Angle $\beta_1$ greater than or equal to 0 and less than $\pi/2$

For the case where $\beta_1$ is equal to or greater than zero and less than $\pi/2$ as illustrated in FIG. 1,4 it can be seen that as long as $x_k$ is greater than or equal to $x_q$ and $y_k$ is less than or equal to $y_q$, point k falls within the defined boundary. The following expressions can be used to define this case mathematically where:

$$f_1(\beta_1) = \frac{1}{4}\left(\frac{\pi/2 - \beta_1}{|\pi/2 - \beta_1| + \sigma} + 1\right) = 1 \text{ if } 0 \le \beta_1 < \frac{\pi}{2} \text{ else } f_1(\beta_1) = 0.$$

And $$f_1(x, y) = \frac{1}{4}\left(\frac{x_k - x_q + \sigma}{|x_k - x_q| + \sigma} + 1\right)\left(\frac{y_q - y_k + \sigma}{|y_q - y_k| + \sigma} + 1\right) = 1$$

if point k lies below and to the right of point q else $f_1(x, y)=0$.

Angle $\beta_1$ equal to $\pi/2$

Figure 15:
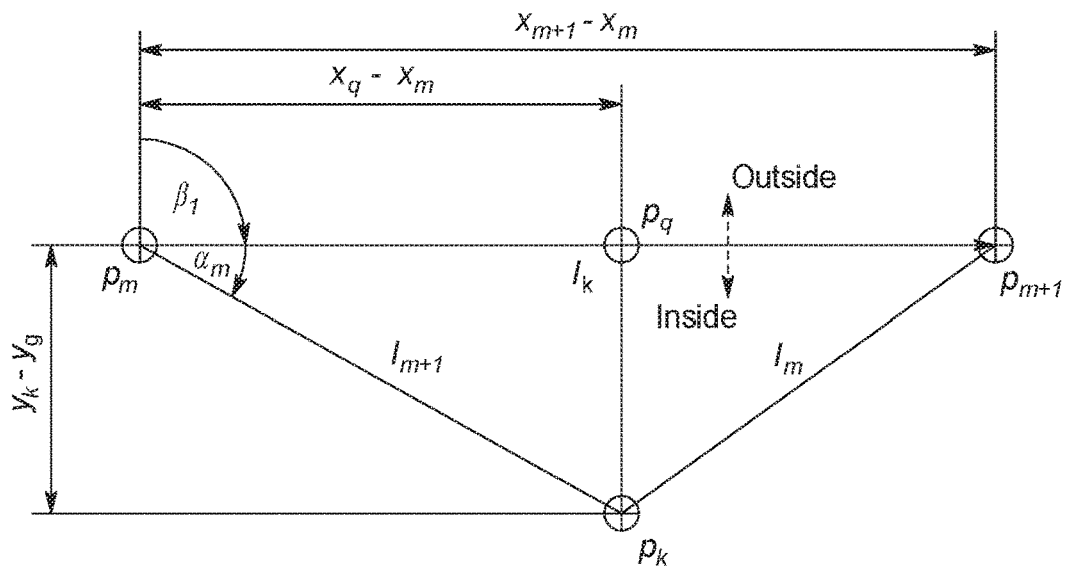
FIG. 15 illustrates a step the system for determining the number of remote vehicles following the host vehicle of FIG. 2 uses when the determining the boundaries of a jurisdiction.

For the case where $\beta_1$ is equal to $\pi/2$ as illustrated in FIG. 15, it can be seen that as long as $y_k$ is less than or equal to $y_q$, point k falls within the defined boundary. The following expressions can be used to define this case mathematically where:

$$f_2(\beta_1) = \frac{1}{4}\left(\frac{\beta_1 - \pi/2 + \sigma}{|\beta_1 - \pi/2| + \sigma} + 1\right)\left(\frac{\pi/2 - \beta_1 + \sigma}{|\pi/2 - \beta_1| + \sigma} + 1\right) =$$

$$1 \text{ if } \beta_1 = \frac{\pi}{2} \text{ else } f_2(\beta_1) = 0.$$

And $$f_2(x, y) = \frac{1}{2}\left(\frac{y_q - y_k + \sigma}{|y_q - y_k| + \sigma} + 1\right) = 1$$

if point k lies below point q else $f_2(x, y)=0$.

Angle $\beta_1$ greater than or equal to $\pi/2$ and less than $\pi$

Figure 16:
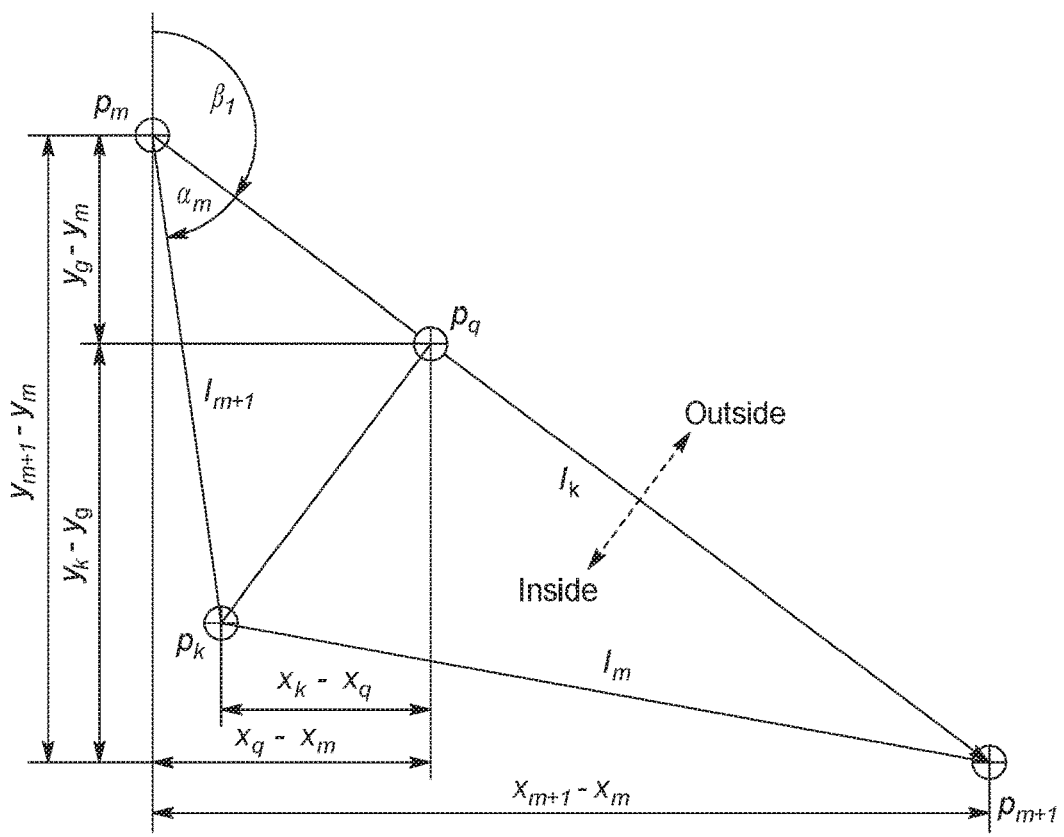
FIG. 16 illustrates a step the system for determining the number of remote vehicles following the host vehicle of FIG. 2 uses when the determining the boundaries of a jurisdiction.

For the case where $\beta_1$ is equal to or greater than $\pi/2$ and less than $\pi$ as illustrated in FIG. 16, it can be seen that as long as $x_k$ is less than or equal to $x_q$ and $y_k$ is less than or equal to $y_q$, point k falls within the defined boundary. The following expressions can be used to define this case mathematically where:

$$f_3(\beta_1) = \frac{1}{4}\left(\frac{\beta_1 - \pi/2 + \sigma}{|\beta_1 - \pi/2| + \sigma} + 1\right)\left(\frac{\pi - \beta_1}{|\pi - \beta_1| + \sigma} + 1\right) =$$

$$1 \text{ if } \frac{\pi}{2} \le \beta_1 < \pi \text{ else } f_3(\beta_1) = 0.$$

And $$f_3(x, y) = \frac{1}{4}\left(\frac{x_q - x_k + \sigma}{|x_q - x_k| + \sigma} + 1\right)\left(\frac{y_q - y_k + \sigma}{|y_q - y_k| + \sigma} + 1\right) = 1$$

if point k lies below and to the left of point q else $f_3(x, y)=0$.

Angle $\beta_1$ equal to $\pi$

For the case where $\beta_1$ is equal to $\pi$ as illustrated in FIG. 16, it can be seen that as long as $x_k$ is less than or equal to $x_q$, point k falls within the defined boundary. The following expressions can be used to define this case mathematically where:

$$f_4(\beta_1) = \frac{1}{4}\left(\frac{\beta_1 - \pi + \sigma}{|\beta_1 - \pi| + \sigma} + 1\right)\left(\frac{\pi - \beta_1 + \sigma}{|\pi - \beta_1| + \sigma} + 1\right) =$$

$$1 \text{ when } \beta_1 = \pi \text{ else it equals 0.}$$

And $$f_4(x, y) = \frac{1}{2}\left(\frac{x_q - x_k + \sigma}{|x_q - x_k| + \sigma} + 1\right) = 1$$

if point k lies to the left of point q else $f_4(x, y)=0$.

Angle $\beta_1$ greater than or equal to $\pi$ and less than $3\pi/2$

Figure 17:
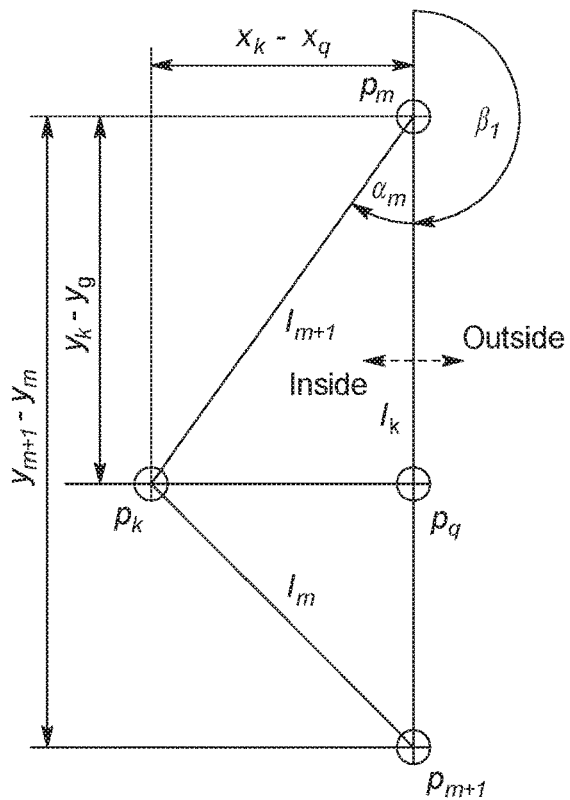
FIG. 17 illustrates a step the system for determining the number of remote vehicles following the host vehicle of FIG. 2 uses when the determining the boundaries of a jurisdiction.

For the case where $\beta_1$ is equal to or greater than $\pi$ and less than $3\pi/2$ as illustrated in FIG. 17, it can be seen that as long as $x_k$ is less than or equal to $x_q$ and $y_k$ is greater than or equal to $y_q$, point k falls within the defined boundary. The following expressions can be used to define this case mathematically where:

$$f_5(\beta_1) = \frac{1}{4}\left(\frac{\beta_1 - \pi + \sigma}{|\beta_1 - \pi| + \sigma} + 1\right)\left(\frac{3\pi/2 - \beta_1}{|3\pi/2 - \beta_1| + \sigma} + 1\right) =$$

$$1 \text{ if } \pi \le \beta_1 < \frac{3}{2}\pi \text{ else } f_5(\beta_1) = 0.$$

And $$f_5(x, y) = \frac{1}{4}\left(\frac{x_q - x_k + \sigma}{|x_q - x_k| + \sigma} + 1\right)\left(\frac{y_k - y_q + \sigma}{|y_k - y_q| + \sigma} + 1\right) = 1$$

if point k lies above and to the left of point q else $f_5(x, y)=0$.

Angle $\beta_1$ equal to $3\pi/2$

Figure 18:
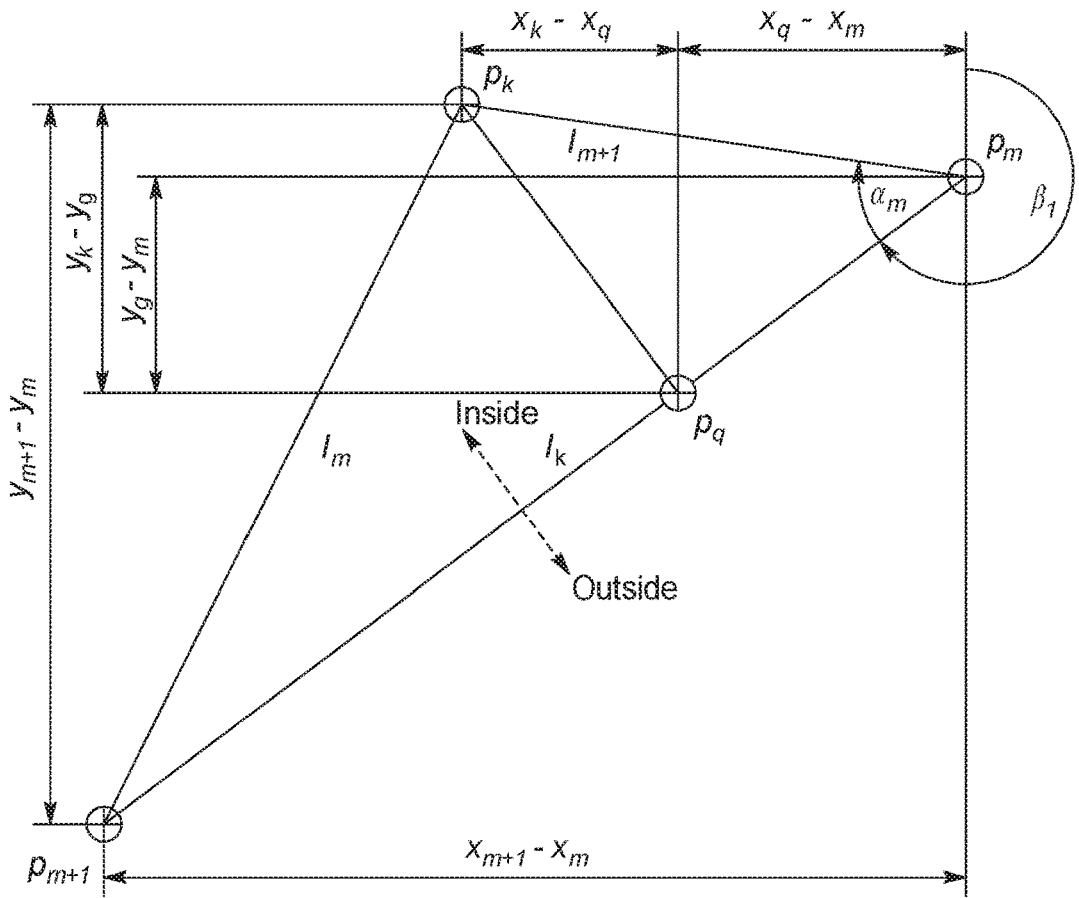
FIG. 18 illustrates a step the system for determining the number of remote vehicles following the host vehicle of FIG. 2 uses when the determining the boundaries of a jurisdiction.

For the case where $\beta_1$ is equal to $3\pi/2$ as illustrated in FIG. 18, it can be seen that as long as $y_k$ is greater than or equal to $y_q$, point k falls within the defined boundary. The following expressions can be used to define this case mathematically where:

$$f_7(\beta_1) = \frac{1}{4}\left(\frac{\beta_1 - 3\pi/2 + \sigma}{|\beta_1 - 3\pi/2| + \sigma} + 1\right)\left(\frac{2\pi - \beta_1}{|2\pi - \beta_1| + \sigma} + 1\right) =$$

$$1 \text{ if } \frac{3}{2}\pi \le \beta_1 < 2\pi \text{ else } f_7(\beta_1) = 0.$$

And $$f_7(x, y) = \frac{1}{4}\left(\frac{x_k - x_q + \sigma}{|x_k - x_q| + \sigma} + 1\right)\left(\frac{y_k - y_q + \sigma}{|y_k - y_q| + \sigma} + 1\right) = 1$$

if point k lies above and to the right of point q else $f_7(x, y)=0$.

Angle $\beta_1$ equal to 0

Figure 19:
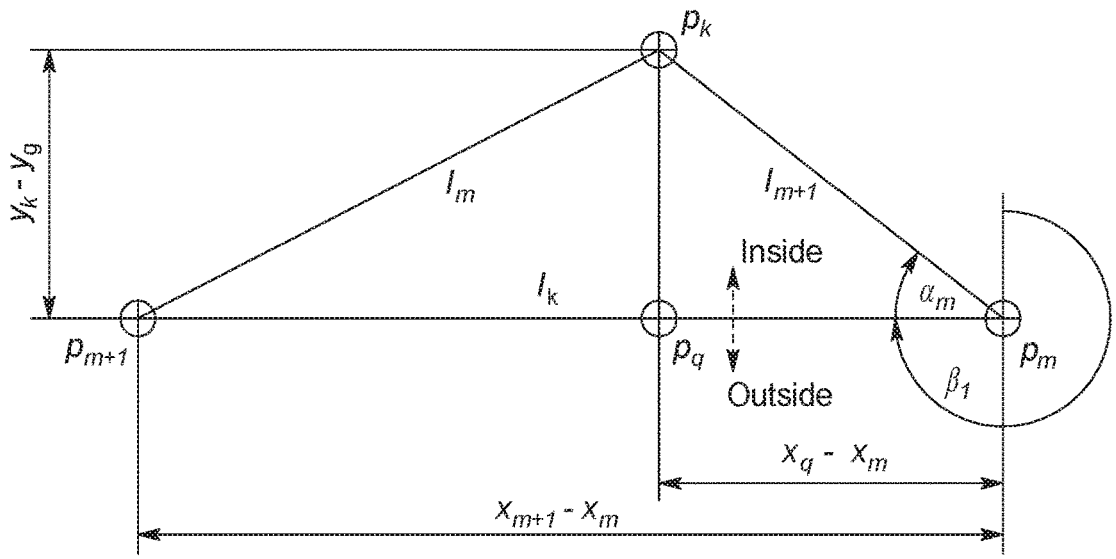
FIG. 19 illustrates a step the system for determining the number of remote vehicles following the host vehicle of FIG. 2 uses when the determining the boundaries of a jurisdiction.
Figure 20:
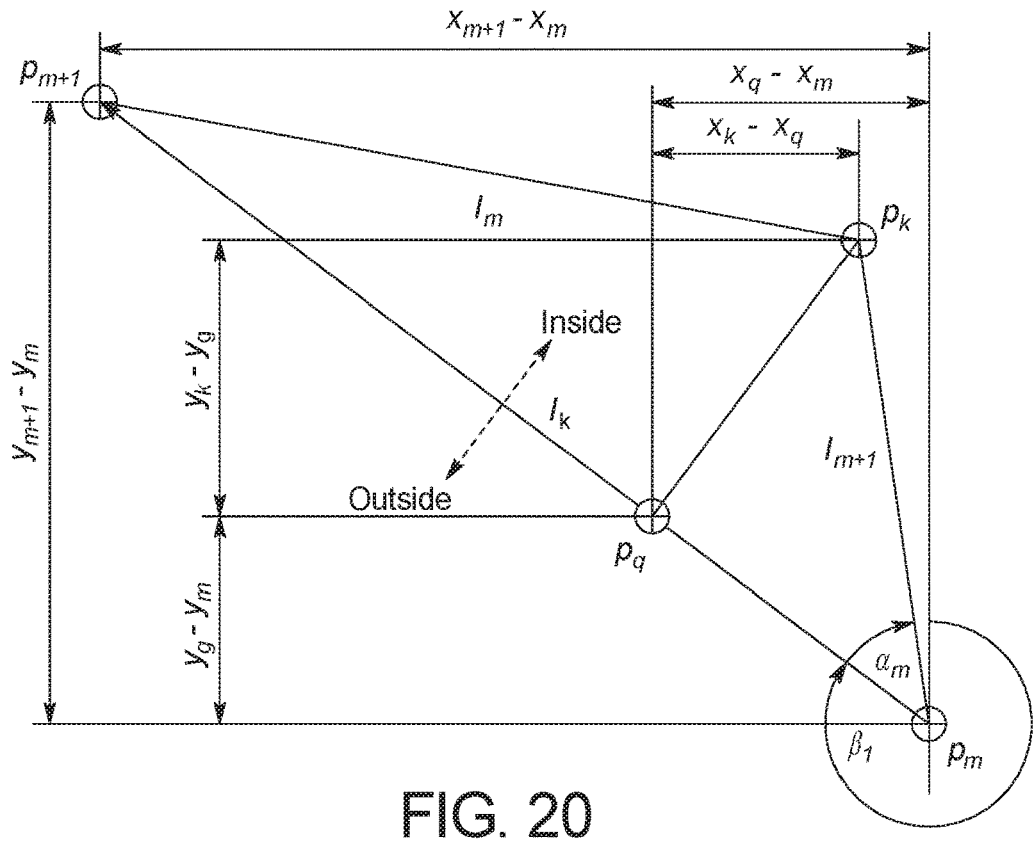
FIG. 20 illustrates a step the system for determining the number of remote vehicles following the host vehicle of FIG. 2 uses when the determining the boundaries of a jurisdiction.
Figure 21:
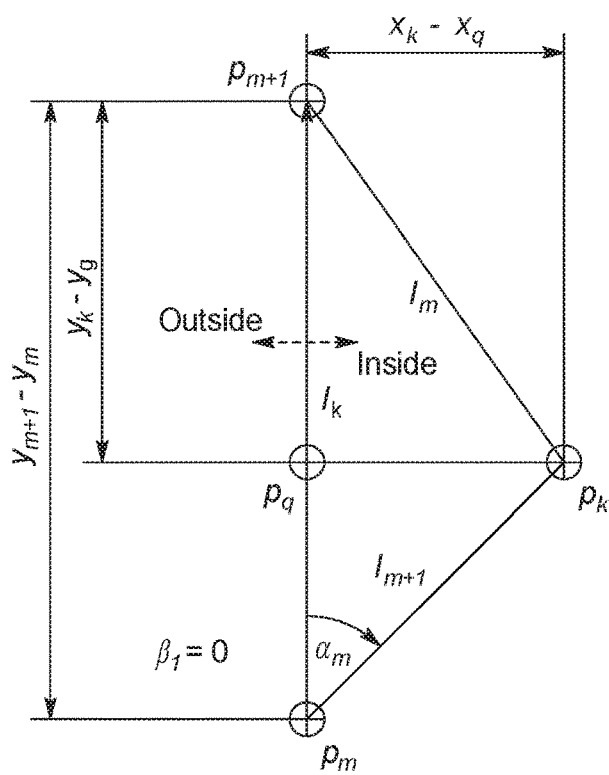
FIG. 21 illustrates a step the system for determining the number of remote vehicles following the host vehicle of FIG. 2 uses when the determining the boundaries of a jurisdiction.

For the case where $\beta_1$ is equal to zero as illustrated in FIG. 19, it can be seen that as long as $x_k$ is greater than or equal to $x_q$, point k falls within the defined boundary. The following expressions can be used to define this case mathematically where:

$$f_8(\beta_1) = \frac{1}{4}\left(\frac{\beta_1 - 0 + \sigma}{|\beta_1 - 0| + \sigma} + 1\right)\left(\frac{0 - \beta_1 + \sigma}{|0 - \beta_1| + \sigma} + 1\right) =$$

$$1 \text{ when } \beta_1 = 0 \text{ else } f_6(\beta_1) = 0.$$

And $$f_8(x, y) = \frac{1}{2}\left(\frac{x_k - x_q + \sigma}{|x_k - x_q| + \sigma} + 1\right) = 1$$

if point k lies to the right of point q else $f_8(x, y)=0$.

Finally, if $$\sum_{i=1}^{8} Q_i = 1$$

where:

$$Q_1 = f_1(\beta_1) \times f_1(x,y)$$

$$Q_2 = f_2(\beta_1) \times f_2(x,y)$$

$Q_3 = f_3(\beta_1) \times f_3(x,y)$ $Q_4 = f_4(\beta_1) \times f_4(x,y)$ $Q_5 = f_5(\beta_1) \times f_5(x,y)$ $Q_6 = f_6(\beta_1) \times f_6(x,y)$ $Q_7 = f_7(\beta_1) \times f_7(x,y)$ $Q_8 = f_8(\beta_1) \times f_8(x,y)$ Then the point in question (k) will lie within the jurisdiction otherwise it falls outside. Thus, as can be understood the host vehicle 10, as represented by k will lie within a known jurisdiction.

Thus, once the jurisdiction or the area in which the host vehicle 10 is positioned is determined, the controller 24 can compare the position of the host vehicle 10 with known jurisdiction rules or laws. That is, once the system 12 has determined the location of the host vehicle 10 within a certain jurisdiction, and the controller 24 reviews a jurisdictional data base saved in the data storage 34 to determine the jurisdictional requirements for a vehicle when being followed by a plurality of vehicles on a two-lane road 44. If the jurisdictional rules or laws require the host vehicle 10 to pull over when a predetermined number of remote vehicles 14 are following the host vehicle 10, the system can determine the number of remote vehicles 14 following the host vehicle 10.

Turning to FIGS. 22-29, the system is configured to determine whether a remote vehicle 14 is following the host vehicle 10. A series of mathematical expressions can be defined that provide specific information regarding the longitudinal, lateral, elevation and heading of the remote vehicles 14 relative to the host vehicle 10. In other words, the system 12 determines the position and direction of remote vehicles 14 relative to the host vehicle 10, based on the known position, direction and speed, for example, of the host vehicle 10 and the known position, direction and/or speed, for example, of each of the remote vehicles 14, the system 12 can determine whether the host vehicle 10 is being followed by a predetermined number of remote vehicles 14. The equations are defined as follows.

Remote Vehicle Position Relative to Host Vehicle (Longitudinal and Lateral Position)

Q1: remote vehicle 14 is to the Northeast of the host vehicle 10

$$Q_1 = \frac{1}{4}\left[\frac{\phi_{RV} - \phi_{HV} - \sigma}{|\phi_{RV} - \phi_{HV}| + \sigma} + 1\right] \times \left[\frac{\theta_{RV} - \theta_{HV} + \sigma}{|\theta_{RV} - \theta_{HV}| + \sigma} + 1\right]$$

Figure 22:
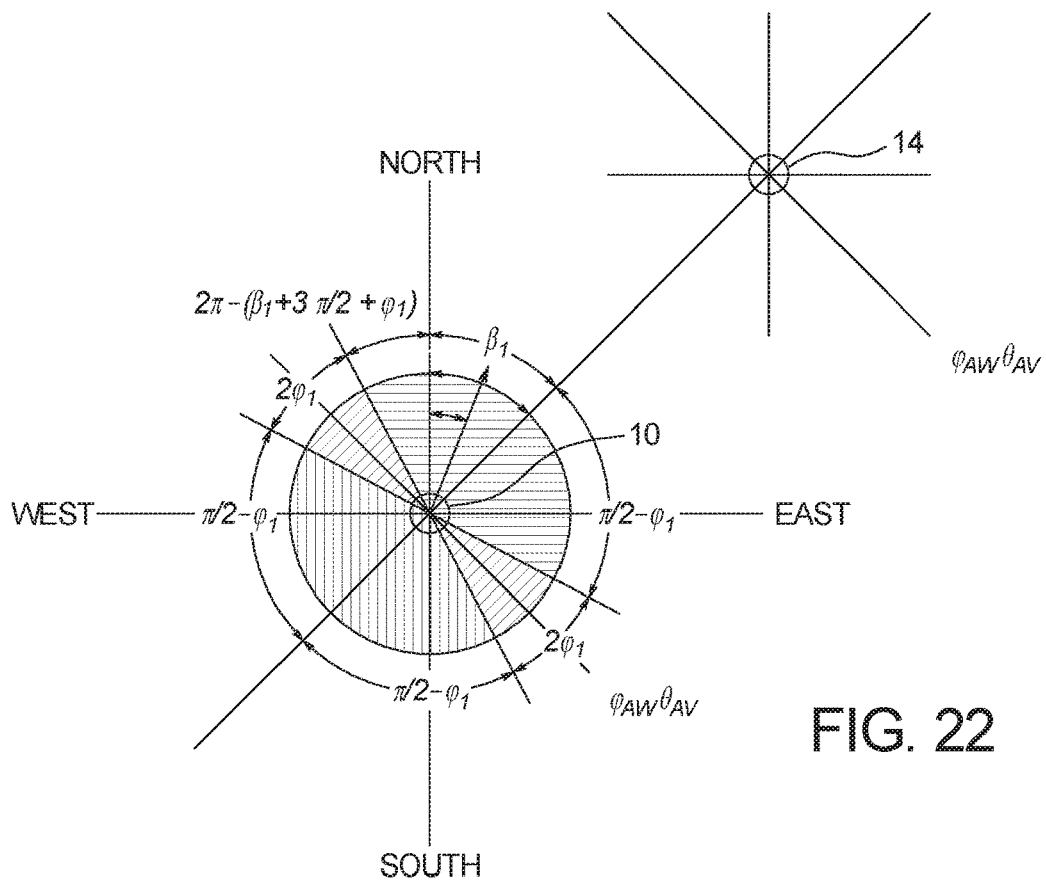
FIG. 22 illustrates a step the system for determining the number of remote vehicles following the host vehicle of FIG. 2 uses in determination of the number of remote vehicles following the host vehicle when the remote vehicles position is to the northeast of the host vehicle.
Figure 23:
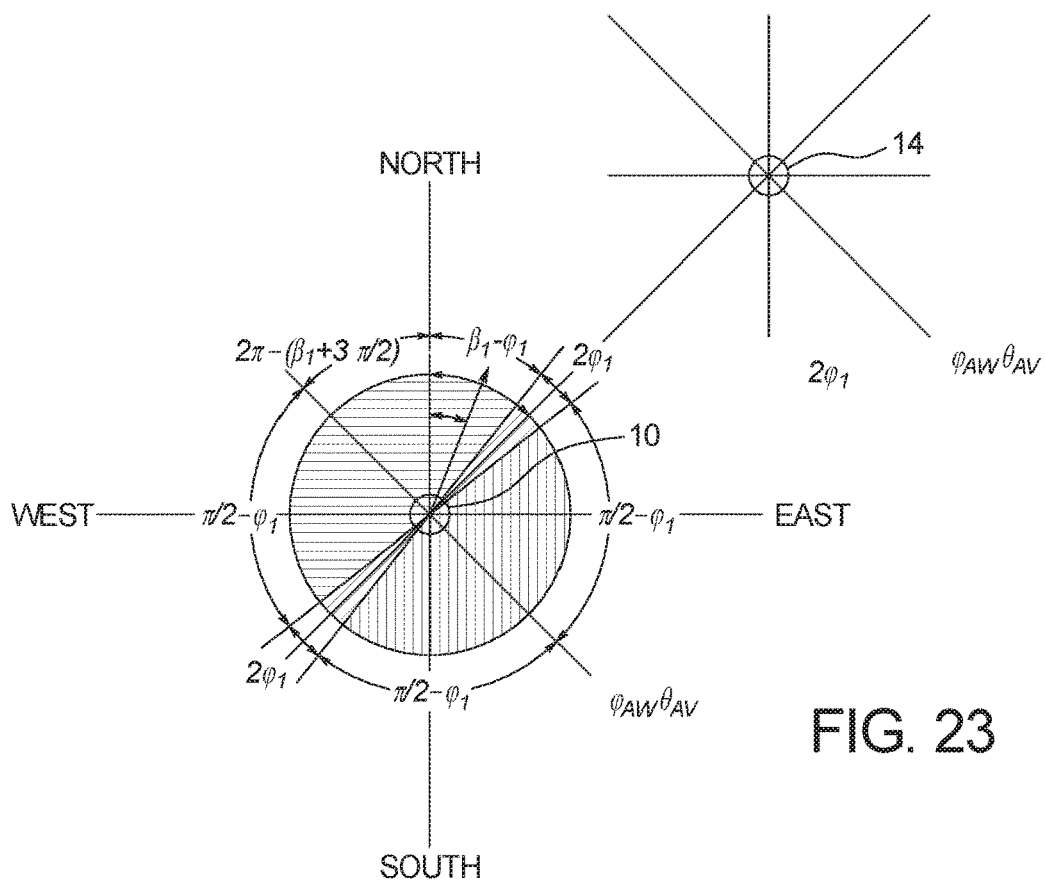
FIG. 23 illustrates a step the system for determining the number of remote vehicles following the host vehicle of FIG. 2 uses in determination of the number of remote vehicles following the host vehicle when the remote vehicles position is to the northeast of the host vehicle.

If the remote vehicle 14 is northeast of the host vehicle 10, as shown in FIGS. 22 and 23, both latitude and longitude for the remote vehicle 14 is greater than the latitude and longitude for the host vehicle 10. Under these conditions, the expression for $Q_1$ above will equal 1 otherwise it will equal 0.

Longitudinal Position (XW)

The remote vehicle 14 is ahead (XW=00) of the host vehicle 10 if:

$0 \leq \delta_{HV} < A_1$ or $A_2 \leq \delta_{HV} < 2\pi$

Where:

$A_1 = \beta_1 + \pi/2 - \varphi_1$ $A_4 = \beta_1 + 3\pi/2 - \varphi_1$ $\varphi_1$ is a threshold value that defines the angular range in which the remote vehicle 14 is defined to be adjacent to the host vehicle 10

$$\beta_1 = \pi\left[\frac{\theta_{HV} - \theta_{RV} - \sigma}{|\theta_{HV} - \theta_{RV}| + \sigma} + 1\right] - $$
$$\cos^{-1}\left(\frac{(\phi_{RV} - \phi_{HV})}{\sqrt{(\theta_{RV} - \theta_{HV})^2 \cos^2\phi_{HV} + (\phi_{RV} - \phi_{HV})^2}}\right)\left[\frac{\theta_{HV} - \theta_{RV} - \sigma}{|\theta_{HV} - \theta_{RV}| + \sigma}\right]$$

This region is identified as the horizontal cross hatching area in FIG. 22. These conditions can be defined in one mathematical expression as:

$$P_{Q_1} = \frac{1}{4}\left[\frac{\delta_{HV} - 0 + \sigma}{|\delta_{HV} - 0| + \sigma} + 1\right] \times \left[\frac{A_1 - \delta_{HV} - \sigma}{|A_1 - \delta_{HV}| + \sigma} + 1\right] + $$
$$\frac{1}{4}\left[\frac{\delta_{HV} - A_4 + \sigma}{|\delta_{HV} - A_4| + \sigma} + 1\right] \times \left[\frac{2\pi - \delta_{HV} - \sigma}{|2\pi - \delta_{HV}| + \sigma} + 1\right]$$

The remote vehicle 14 is adjacent (XW=01) to the host vehicle 10 if:

$A_1 \leq \delta_{HV} < A_2$ or $A_3 \leq \delta_{HV} < A_4$

Where:

$A_1 = \beta_1 + \pi/2 - \varphi_1$ $A_2 = \beta_1 + \pi/2 - \varphi_1$ $A_3 = \beta_1 + 3\pi/2 - \varphi_1$ $A_4 = \beta_1 + 3\pi/2 - \varphi_1$ These two specific angular ranges are identified as the interface between the vertical cross hatching area and horizontal cross hatching area in FIG. 22. These conditions can be defined in one mathematical expression as:

$$A_{Q_1} = \frac{1}{4}\left[\frac{\delta_{HV} - A_1 + \sigma}{|\delta_{HV} - A_1| + \sigma} + 1\right] \times \left[\frac{A_2 - \delta_{HV} - \sigma}{|A_2 - \delta_{HV}| + \sigma} + 1\right] + $$
$$\frac{1}{4}\left[\frac{\delta_{HV} - A_3 + \sigma}{|\delta_{HV} - A_3| + \sigma} + 1\right] \times \left[\frac{A_4 - \delta_{HV} - \sigma}{|A_4 - \delta_{HV}| + \sigma} + 1\right]$$

The remote vehicle 14 is behind (XW=10) the host vehicle 10 if:

$A_2 \leq \delta_{HV} < A_3$

Where:

$A_2 = \beta_1 + \pi/2 + \varphi_1$ $A_3 = \beta_1 + 3\pi/2 - \varphi_1$

This region is identified as the vertical cross hatching area in FIG. 22. These conditions can be defined in one mathematical expression as:

$$B_{Q_1} = \frac{1}{4}\left[\frac{\delta_{HV} - A_2 + \sigma}{|\delta_{HV} - A_2| + \sigma} + 1\right] \times \left[\frac{A_3 - \delta_{HV} - \sigma}{|A_3 - \delta_{HV}| + \sigma} + 1\right]$$

Lateral Position (VU)

The remote vehicle 14 is in lane (VU=00) with the host vehicle 10 if:

$$A_5 \leq \delta_{HV} < A_6 \text{ or } A_7 \leq \delta_{HV} < A_8$$

Where:

$$A_5 = \beta_1 - \varphi_2$$

$$A_6 = \beta_1 + \varphi_2$$

$$A_7 = \beta_1 + \pi - \varphi_2$$

$$A_8 = \beta_1 + \pi + \varphi_2$$

$\varphi_2$ is a threshold value that defines the angular range in which the remote vehicle 14 is defined to be in the same lane with the host vehicle 10.

These two specific angular ranges are identified as the interface between the horizontal cross-sectional area and vertical cross-sectional area in FIG. 23. These conditions can be defined in one mathematical expression as:

$$I_{Q_1} = \frac{1}{4}\left[\frac{\delta_{HV} - A_5 + \sigma}{|\delta_{HV} - A_5| + \sigma} + 1\right] \times \left[\frac{A_6 - \delta_{HV} - \sigma}{|A_6 - \delta_{HV}| + \sigma} + 1\right] + \frac{1}{4}\left[\frac{\delta_{HV} - A_7 + \sigma}{|\delta_{HV} - A_8| + \sigma} + 1\right] \times \left[\frac{A_8 - \delta_{HV} - \sigma}{|A_8 - \delta_{HV}| + \sigma} + 1\right]$$

The remote vehicle 14 is to the left (VU=01) of the host vehicle 10 if:

$$A_6 \leq \delta_{HV} < A_7$$

Where:

$$A_6 = \beta_1 + \varphi_2$$

$$A_7 = \beta_1 + \pi - \varphi_2$$

This region is identified as the vertical cross-sectional area in FIG. 23. These conditions can be defined in one mathematical expression as:

$$L_{Q_1} = \frac{1}{4}\left[\frac{\delta_{HV} - A_6 + \sigma}{|\delta_{HV} - A_6| + \sigma} + 1\right] \times \left[\frac{A_7 - \delta_{HV} - \sigma}{|A_7 - \delta_{HV}| + \sigma} + 1\right]$$

The remote vehicle 14 is to the right (VU=10) of the host vehicle 10 if:

$$0 \leq \delta_{HV} < A_5 \text{ or } A_8 \leq \delta_{HV} < 2\pi$$

Where:

$$A_5 = \beta_1 - \varphi_2$$

$$A_8 = \beta_1 + \pi + \varphi_2$$

This region is identified as the horizontal cross-sectional area in FIG. 23. These conditions can be defined in one mathematical expression as:

$$R_{Q_1} = \frac{1}{4}\left[\frac{\delta_{HV} - 0 + \sigma}{|\delta_{HV} - 0| + \sigma} + 1\right] \times \left[\frac{A_5 - \delta_{HV} - \sigma}{|A_5 - \delta_{HV}| + \sigma} + 1\right] + \frac{1}{4}\left[\frac{\delta_{HV} - A_8 + \sigma}{|\delta_{HV} - A_8| + \sigma} + 1\right] \times \left[\frac{2\pi - \delta_{HV} - \sigma}{|2\pi - \delta_{HV}| + \sigma} + 1\right]$$

The expressions are then consolidated in Table 1 for the case when the remote vehicle 14 is to the northeast of the host vehicle 10.

TABLE 1

|  |  | Lateral Position | | | |
| --- | --- | --- | --- | --- | --- |
| $Q_1$ |  | Remote vehicle 14 in lane ($I_{Q_1}$) | Remote vehicle 14 Left ($L_{Q_1}$) | Remote vehicle 14 Right ($R_{Q_1}$) | Unused |
| Longitudinal Position | Remote vehicle 14 Ahead ($P_{Q_1}$) | $Q_1 \times P_{Q_1} \times I_{Q_1}$ | $Q_1 \times P_{Q_1} \times L_{Q_1}$ | $Q_1 \times P_{Q_1} \times R_{Q_1}$ | 0 |
|  | Remote vehicle 14 Adjacent ($A_{Q_1}$) | $Q_1 \times A_{Q_1} \times I_{Q_1}$ | $Q_1 \times A_{Q_1} \times L_{Q_1}$ | $Q_1 \times A_{Q_1} \times R_{Q_1}$ | 0 |
|  | Remote vehicle 14 Behind ($B_{Q_1}$) | $Q_1 \times B_{Q_1} \times I_{Q_1}$ | $Q_1 \times B_{Q_1} \times L_{Q_1}$ | $Q_1 \times B_{Q_1} \times R_{Q_1}$ | 0 |
|  | Unused | 0 | 0 | 0 | 0 |

Q2: Remote Vehicle is to the Northwest of the Host Vehicle $$Q_2 = \frac{1}{4}\left[\frac{\phi_{RV} - \phi_{HV} + \sigma}{|\phi_{RV} - \phi_{HV}| + \sigma} + 1\right] \times \left[\frac{\theta_{HV} - \theta_{RV} - \sigma}{|\theta_{HV} - \theta_{RV}| + \sigma} + 1\right]$$

Figure 24:
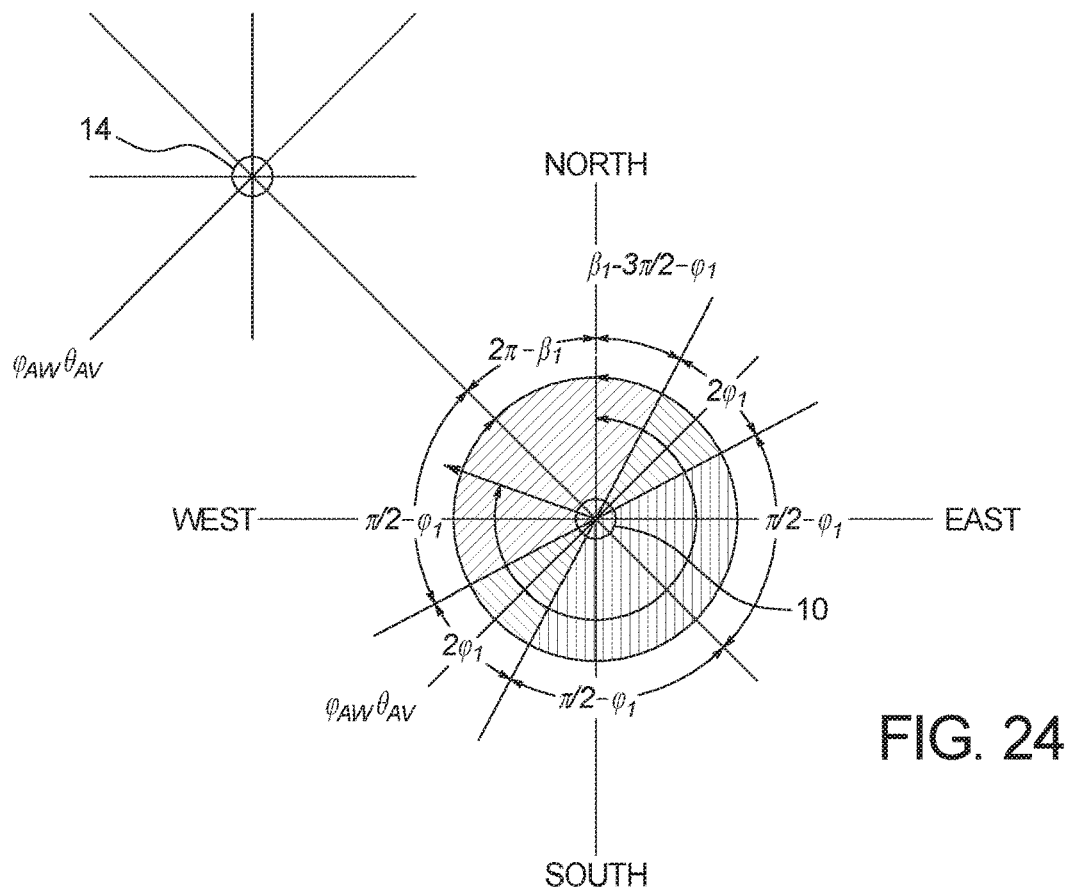
FIG. 24 illustrates a step the system for determining the number of remote vehicles following the host vehicle of FIG. 2 uses in determination of the number of remote vehicles following the host vehicle when the remote vehicles position is to the northwest of the host vehicle.
Figure 25:
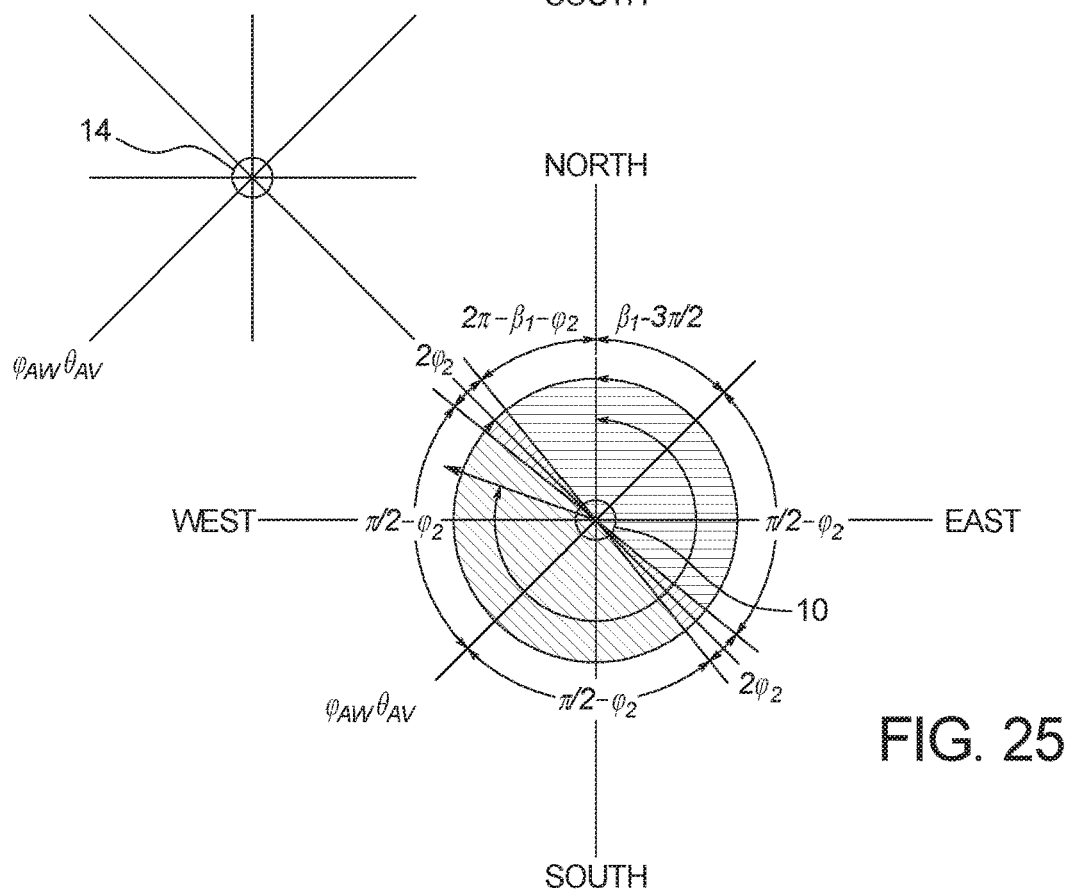
FIG. 25 illustrates a step the system for determining the number of remote vehicles following the host vehicle of FIG. 2 uses in determination of the number of remote vehicles following the host vehicle when the remote vehicles position is to the northwest of the host vehicle.

If the remote vehicle 14 is northwest of the Host vehicle 10 as shown in FIGS. 24 and 25, the latitude for the remote vehicle 14 is greater than the latitude of the host vehicle 10 but the longitude for the remote vehicle 14 is less than the longitude for the host vehicle 10. Under these conditions, the expression for $Q_2$ above will equal 1 otherwise it will equal 0.

Longitudinal Position (XW)

The remote vehicle 14 is ahead (XW=00) of the host vehicle 10 if:

$$0 \leq \delta_{HV} < A_9 \text{ or } A_{12} \leq \delta_{HV} < 2\pi$$

Where:

$$A_9 = \beta_1 - 3\pi/2 - \varphi_1$$

$$A_{12} = \beta_1 - \pi/2 - \varphi_1$$

$\varphi_1$ is a threshold value that defines the angular range in which the remote vehicle 14 is defined to be adjacent to the host vehicle 10.

$$\beta_1 = \pi\left[\frac{\theta_{HV} - \theta_{RV} - \sigma}{|\theta_{HV} - \theta_{RV}| + \sigma} + 1\right] -$$

-continued $$\cos^{-1}\left(\frac{(\phi_{RV} - \phi_{HV})}{\sqrt{(\theta_{RV} - \theta_{HV})^2 \cos^2\phi_{HV} + (\phi_{RV} - \phi_{HV})^2}}\right)\left[\frac{\theta_{HV} - \theta_{RV} - \sigma}{|\theta_{HV} - \theta_{RV}| + \sigma}\right]$$

This region is identified as the diagonal (from upper right to lower left) sectional area in FIG. 24. These conditions can be defined in one mathematical expression as:

$$P_{Q_2} = \frac{1}{4}\left[\frac{\delta_{HV} - 0 + \sigma}{|\delta_{HV} - 0| + \sigma} + 1\right] \times \left[\frac{A_9 - \delta_{HV} - \sigma}{|A_9 - \delta_{HV}| + \sigma} + 1\right] +$$
$$\frac{1}{4}\left[\frac{\delta_{HV} - A_{12} + \sigma}{|\delta_{HV} - A_{12}| + \sigma} + 1\right] \times \left[\frac{2\pi - \delta_{HV} - \sigma}{|2\pi - \delta_{HV}| + \sigma} + 1\right]$$

The remote vehicle 14 is adjacent (XW=01) to the host vehicle 10 if:

$A_9 \leq \delta_{HV} < A_{10}$ or $A_{11} \leq \delta_{HV} < A_{12}$

Where:

$A_9 = \beta_1 - 3\pi/2 - \varphi_1$ $A_{10} = \beta_1 - 3\pi/2 + \varphi_1$ $A_{11} = \beta_1 - \pi/2 - \varphi_1$ $A_{12} = \beta_1 - \pi/2 + \varphi_1$ These two specific angular ranges are identified as the interface between the vertical cross-sectional area and the diagonal (from upper right to lower left) cross sectional area in FIG. 24. These conditions can be defined in one mathematical expression as:

$$A_{Q_2} = \frac{1}{4}\left[\frac{\delta_{HV} - A_9 + \sigma}{|\delta_{HV} - A_9| + \sigma} + 1\right] \times \left[\frac{A_{10} - \delta_{HV} - \sigma}{|A_{10} - \delta_{HV}| + \sigma} + 1\right] +$$
$$\frac{1}{4}\left[\frac{\delta_{HV} - A_{11} + \sigma}{|\delta_{HV} - A_{11}| + \sigma} + 1\right] \times \left[\frac{A_{12} - \delta_{HV} - \sigma}{|A_{12} - \delta_{HV}| + \sigma} + 1\right]$$

The mote vehicle 14 is behind (XW=10) the host vehicle 10 if:

$A_{10} \leq \delta_{HV} < A_{11}$

Where:

$A_{10} = \beta_1 - 3\pi/2 + \varphi_1$ $A_{11} = \beta_1 - \pi/2 - \varphi_1$

This region is identified as the vertical cross-sectional area in FIG. 24. These conditions can be defined in one mathematical expression as:

$$B_{Q_2} = \frac{1}{4}\left[\frac{\delta_{HV} - A_{10} + \sigma}{|\delta_{HV} - A_{10}| + \sigma} + 1\right] \times \left[\frac{A_{11} - \delta_{HV} - \sigma}{|A_{11} - \delta_{HV}| + \sigma} + 1\right]$$

Lateral Position (VU)

The remote vehicle 14 is in lane (VU=00) with the host vehicle 10 if:

$A_{13} \leq \delta_{HV} < A_{14}$ or $A_{15} \leq \delta_{HV} < A_{16}$

Where:

$A_{13} = \beta_1 - \pi - \varphi_2$ $A_{14} = \beta_1 - \pi + \varphi_2$ $A_{15} = \beta_1 - \varphi_2$ $A_{16} = \beta_1 + \varphi_2$ $\varphi_2$ is a threshold value that defines the angular range in which the remote vehicle 14 is defined to be in the same lane with the host vehicle 10.

These two specific angular ranges are identified as the interface between the horizontal cross sectional area and the diagonal (from upper left to lower right) sectional area in FIG. 25. These conditions can be defined in one mathematical expression as:

$$I_{Q_2} = \frac{1}{4}\left[\frac{\delta_{HV} - A_{13} + \sigma}{|\delta_{HV} - A_{13}| + \sigma} + 1\right] \times \left[\frac{A_{14} - \delta_{HV} - \sigma}{|A_{14} - \delta_{HV}| + \sigma} + 1\right] +$$
$$\frac{1}{4}\left[\frac{\delta_{HV} - A_{15} + \sigma}{|\delta_{HV} - A_{15}| + \sigma} + 1\right] \times \left[\frac{A_{16} - \delta_{HV} - \sigma}{|A_{16} - \delta_{HV}| + \sigma} + 1\right]$$

The remote vehicle 14 is to the left (VU=01) of the host vehicle 10 if:

$0 \leq \delta_{HV} < A_{13}$ or $A_{16} \leq \delta_{HV} < 2\pi$

Where:

$A_{13} = \beta_1 - \pi - \varphi_2$ $A_{16} = \beta_1 + \varphi_2$

This region is identified as the blue shaded area in the illustration on the right side of FIG. 2. These conditions can be defined in one mathematical expression as:

$$L_{Q_2} = \frac{1}{4}\left[\frac{\delta_{HV} - 0 + \sigma}{|\delta_{HV} - 0| + \sigma} + 1\right] \times \left[\frac{A_{13} - \delta_{HV} - \sigma}{|A_{13} - \delta_{HV}| + \sigma} + 1\right] +$$
$$\frac{1}{4}\left[\frac{\delta_{HV} - A_{16} + \sigma}{|\delta_{HV} - A_{16}| + \sigma} + 1\right] \times \left[\frac{2\pi - \delta_{HV} - \sigma}{|2\pi - \delta_{HV}| + \sigma} + 1\right]$$

The remote vehicle 14 is to the right (VU=10) of the host vehicle 10 if:

$A_{14} \leq \delta_{HV} < A_{15}$

Where:

$A_{14} = \beta_1 - \pi + \varphi_2$ $A_{15} = \beta_1 - \varphi_2$

This region is identified as the diagonal (from upper left to lower right) sectional area in FIG. 25. These conditions can be defined in one mathematical expression as:

$$R_{Q_2} = \frac{1}{4}\left[\frac{\delta_{HV} - A_{14} + \sigma}{|\delta_{HV} - A_{14}| + \sigma} + 1\right] \times \left[\frac{A_{15} - \delta_{HV} - \sigma}{|A_{15} - \delta_{HV}| + \sigma} + 1\right]$$

The expressions are then consolidated in Table 2 for the case when the remote vehicle 14 is to the northwest of the host vehicle 10.

TABLE 2

| $Q_2$ | | Lateral Position | | | |
|---|---|---|---|---|---|
| | | Remote vehicle 14 in lane ($I_{Q_2}$) | Remote vehicle 14 Left ($L_{Q_2}$) | Remote vehicle 14 Right ($R_{Q_2}$) | Unused |
| Longitudinal Position | Remote vehicle 14 Ahead ($P_{Q_2}$) | $Q_2 \times P_{Q_2} \times I_{Q_2}$ | $Q_2 \times P_{Q_2} \times L_{Q_2}$ | $Q_2 \times P_{Q_2} \times R_{Q_2}$ | 0 |
| | Remote vehicle 14 Adjacent ($A_{Q_2}$) | $Q_2 \times A_{Q_2} \times I_{Q_2}$ | $Q_2 \times A_{Q_2} \times L_{Q_2}$ | $Q_2 \times A_{Q_2} \times R_{Q_2}$ | 0 |
| | Remote vehicle 14 Behind ($B_{Q_2}$) | $Q_2 \times B_{Q_2} \times I_{Q_2}$ | $Q_2 \times B_{Q_2} \times L_{Q_2}$ | $Q_2 \times B_{Q_2} \times R_{Q_2}$ | 0 |
| | Unused | 0 | 0 | 0 | 0 |

Q3: Remote Vehicle is to the Southwest of the Host Vehicle $$Q_3 = \frac{1}{4}\left[\frac{\phi_{HV} - \phi_{RV} - \sigma}{|\phi_{HV} - \phi_{RV}| + \sigma} + 1\right] \times \left[\frac{\theta_{HV} - \theta_{RV} + \sigma}{|\theta_{HV} - \theta_{RV}| + \sigma} + 1\right]$$

Figure 26:
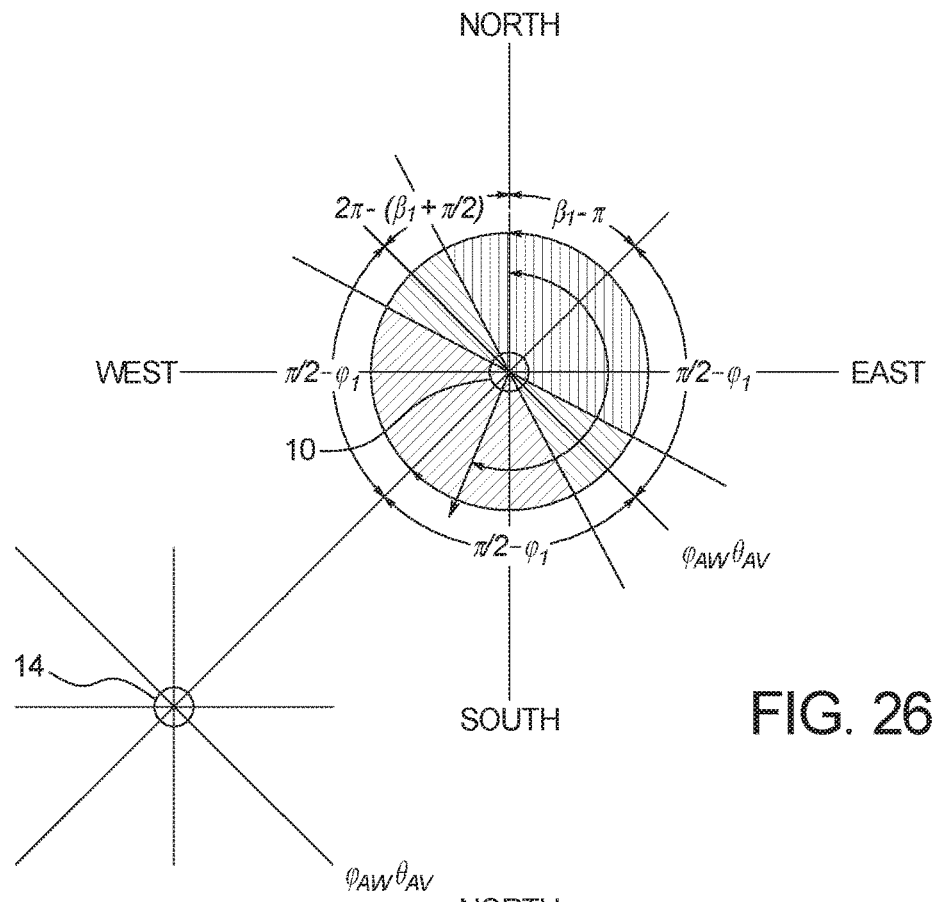
FIG. 26 illustrates a step the system for determining the number of remote vehicles following the host vehicle of FIG. 2 uses in determination of the number of remote vehicles following the host vehicle when the remote vehicles position is to the southwest of the host vehicle.
Figure 27:
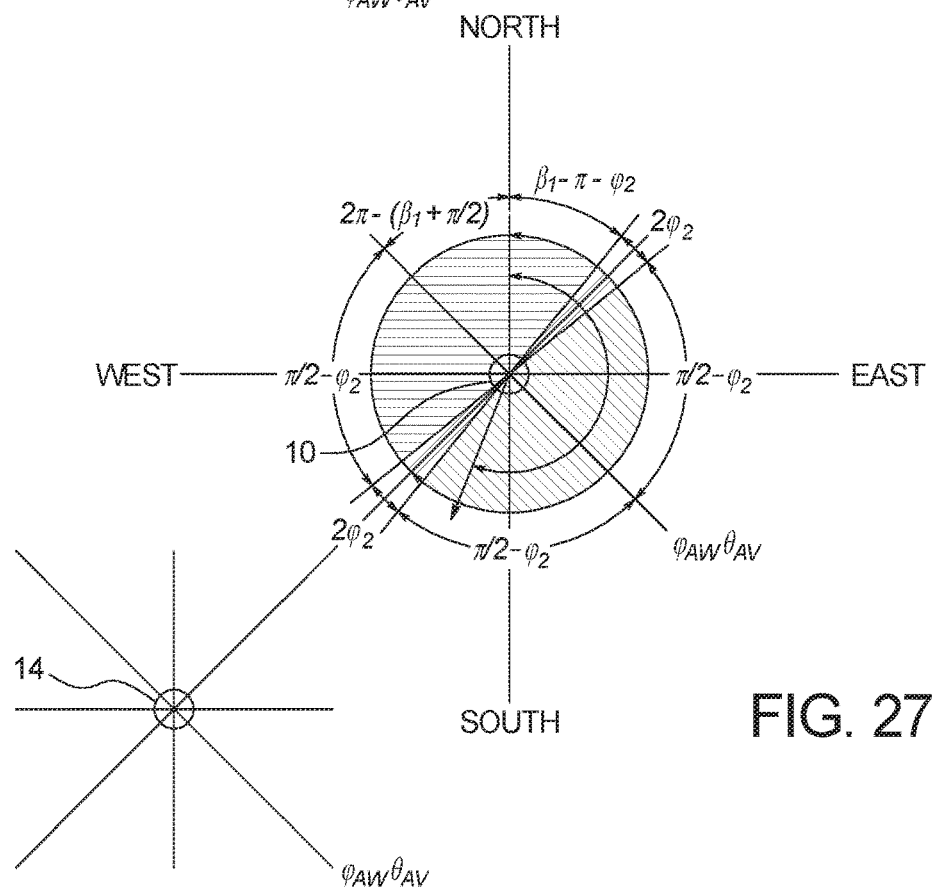
FIG. 27 illustrates a step the system for determining the number of remote vehicles following the host vehicle of FIG. 2 uses in determination of the number of remote vehicles following the host vehicle when the remote vehicles position is to the southwest of the host vehicle.

If the remote vehicle 14 is southwest of the host vehicle 10 as shown in FIGS. 26 and 27, both latitude and longitude for the remote vehicle 14 is less than the latitude and longitude for the host vehicle 10. Under these conditions, the expression for $Q_3$ above will equal 1 otherwise it will equal 0.

Longitudinal Position (XW)

The remote vehicle 14 is ahead (XW=00) of the host vehicle 10 if:

$$A_{12} \leq \delta_{HV} < A_1$$

Where:

$$A_{12} = \beta_1 - \pi/2 + \varphi_1$$

$$A_1 = \beta_1 + \pi/2 - \varphi_1$$

$\varphi_1$ is a threshold value that defines the angular range in which the remote vehicle 14 is defined to be adjacent to the host vehicle 10

$$\beta_1 = \pi\left[\frac{\theta_{HV} - \theta_{RV} - \sigma}{|\theta_{HV} - \theta_{RV}| + \sigma} + 1\right] - \cos^{-1}\left(\frac{(\phi_{RV} - \phi_{HV})}{\sqrt{(\theta_{RV} - \theta_{HV})^2 \cos^2\phi_{HV} + (\phi_{RV} - \phi_{HV})^2}}\right)\left[\frac{\theta_{HV} - \theta_{RV} - \sigma}{|\theta_{HV} - \theta_{RV}| + \sigma}\right]$$

This region is identified as the diagonal (upper right to lower left) cross sectional area in FIG. 26. These conditions can be defined in one mathematical expression as:

$$P_{Q_3} = \frac{1}{4}\left[\frac{\delta_{HV} - A_{12} + \sigma}{|\delta_{HV} - A_{12}| + \sigma} + 1\right] \times \left[\frac{A_1 - \delta_{HV} - \sigma}{|A_1 - \delta_{HV}| + \sigma} + 1\right]$$

The remote vehicle 14 is adjacent (XW=01) to the host vehicle 10 if:

$$A_1 \leq \delta_{HV} < A_2 \text{ or } A_{11} \leq \delta_{HV} < A_2$$

Where:

$$A_1 = \beta_1 + \pi/2 - \varphi_1$$

$$A_2 = \beta_1 + \pi/2 + \varphi_1$$

$$A_{11} = \beta_1 - \pi/2 - \varphi_1$$

$$A_{12} = \beta_1 - \pi/2 + \varphi_1$$

These two specific angular ranges are identified as the interface between the vertical cross-sectional area and the diagonal (upper right to lower left) cross sectional area in FIG. 26. These conditions can be defined in one mathematical expression as:

$$A_{Q_3} = \frac{1}{4}\left[\frac{\delta_{HV} - A_1 + \sigma}{|\delta_{HV} - A_1| + \sigma} + 1\right] \times \left[\frac{A_2 - \delta_{HV} - \sigma}{|A_2 - \delta_{HV}| + \sigma} + 1\right] + \frac{1}{4}\left[\frac{\delta_{HV} - A_{11} + \sigma}{|\delta_{HV} - A_{11}| + \sigma} + 1\right] \times \left[\frac{A_{12} - \delta_{HV} - \sigma}{|A_{12} - \delta_{HV}| + \sigma} + 1\right]$$

The remote vehicle 14 is behind (XW=10) the host vehicle 10 if:

$$0 \leq \delta_{HV} < A_{11} \text{ or } A_2 \leq \delta_{HV} < 2\pi$$

Where:

$$A_2 = \beta_1 + \pi/2 + \varphi_1$$

$$A_{11} = \beta_1 - \pi/2 - \varphi_1$$

This region is identified as the vertical cross-sectional area in FIG. 26. These conditions can be defined in one mathematical expression as:

$$B_{Q_3} = \frac{1}{4}\left[\frac{\delta_{HV} - 0 + \sigma}{|\delta_{HV} - 0| + \sigma} + 1\right] \times \left[\frac{A_{11} - \delta_{HV} - \sigma}{|A_{11} - \delta_{HV}| + \sigma} + 1\right] + \frac{1}{4}\left[\frac{\delta_{HV} - A_2 + \sigma}{|\delta_{HV} - A_2| + \sigma} + 1\right] \times \left[\frac{2\pi - \delta_{HV} - \sigma}{|2\pi - \delta_{HV}| + \sigma} + 1\right]$$

Lateral Position (VU)

The remote vehicle 14 is in lane (VU=00) with the host vehicle 10 if:

$$A_{13} \leq \delta_{HV} < A_{14} \text{ or } A_{15} \leq \delta_{HV} < A_{16}$$

Where:

$$A_{13} = \beta_1 - \pi - \varphi_2$$

$$A_{14} = \beta_1 - \pi + \varphi_2$$

$$A_{15} = \beta_1 - \varphi_2$$

$$A_{16} = \beta_1 + \varphi_2$$

$\varphi_2$ is a threshold value that defines the angular range in which the remote vehicle 14 is defined to be in the same lane with the host vehicle 10

These two specific angular ranges are identified as the interface between the diagonal (upper left to lower right) cross sectional area and the horizontal area in FIG. 27. These conditions can be defined in one mathematical expression as:

$$I_{Q_3} = \frac{1}{4}\left[\frac{\delta_{HV} - A_{13} + \sigma}{|\delta_{HV} - A_{13}| + \sigma} + 1\right] \times \left[\frac{A_{14} - \delta_{HV} - \sigma}{|A_{14} - \delta_{HV}| + \sigma} + 1\right] +$$

$$\frac{1}{4}\left[\frac{\delta_{HV} - A_{15} + \sigma}{|\delta_{HV} - A_{15}| + \sigma} + 1\right] \times \left[\frac{A_{16} - \delta_{HV} - \sigma}{|A_{16} - \delta_{HV}| + \sigma} + 1\right]$$

The remote vehicle 14 is to the left (VU=01) of the host vehicle 10 if:

$0 \leq \delta_{HV} < A_{13}$ or $A_{16} \leq \delta_{HV} < 2\pi$ $A_{13} = \beta_1 - \pi - \varphi_2$ $A_{16} = \beta_1 + \varphi_2$ This region is identified as the horizontal area in FIG. 27. These conditions can be defined in one mathematical expression as:

$$L_{Q_3} = \frac{1}{4}\left[\frac{\delta_{HV} - 0 + \sigma}{|\delta_{HV} - 0| + \sigma} + 1\right] \times \left[\frac{A_{13} - \delta_{HV} - \sigma}{|A_{13} - \delta_{HV}| + \sigma} + 1\right] +$$

$$\frac{1}{4}\left[\frac{\delta_{HV} - A_{16} + \sigma}{|\delta_{HV} - A_{16}| + \sigma} + 1\right] \times \left[\frac{2\pi - \delta_{HV} - \sigma}{|2\pi - \delta_{HV}| + \sigma} + 1\right]$$

The remote vehicle 14 is to the right (VU=10) of the host vehicle 10 if:

$A_{14} \leq \delta_{HV} < A_{15}$

Where:

$A_{14} = \beta_1 - \pi + \varphi_2$ $A_{15} = \beta_1 - \varphi_2$

This region is identified as the diagonal (upper left to lower right) cross sectional area in FIG. 27. These conditions can be defined in one mathematical expression as:

$$R_{Q_3} = \frac{1}{4}\left[\frac{\delta_{HV} - A_{14} + \sigma}{|\delta_{HV} - A_{14}| + \sigma} + 1\right] \times \left[\frac{A_{15} - \delta_{HV} - \sigma}{|A_{15} - \delta_{HV}| + \sigma} + 1\right]$$

The expressions are then consolidated in Table 3 for the case when the remote vehicle 14 is to the southwest of the host vehicle 10.

Q4: Remote Vehicle is to the Southeast of the Host Vehicle $$Q_4 = \frac{1}{4}\left[\frac{\phi_{HV} - \phi_{RV} + \sigma}{|\phi_{HV} - \phi_{RV}| + \sigma} + 1\right] \times \left[\frac{\theta_{RV} - \theta_{HV} - \sigma}{|\theta_{RV} - \theta_{HV}| + \sigma} + 1\right]$$

Figure 28:
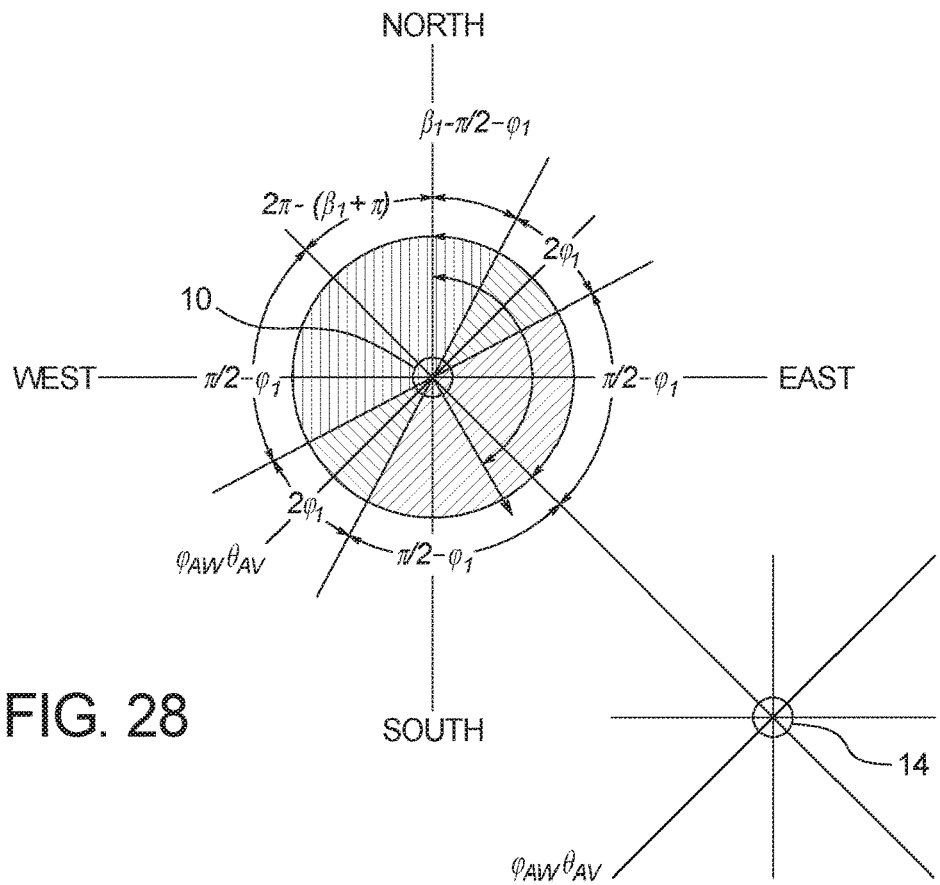
FIG. 28 illustrates a step the system for determining the number of remote vehicles following the host vehicle of FIG. 2 uses in determination of the number of remote vehicles following the host vehicle when the remote vehicles position is to the southeast of the host vehicle.
Figure 29:
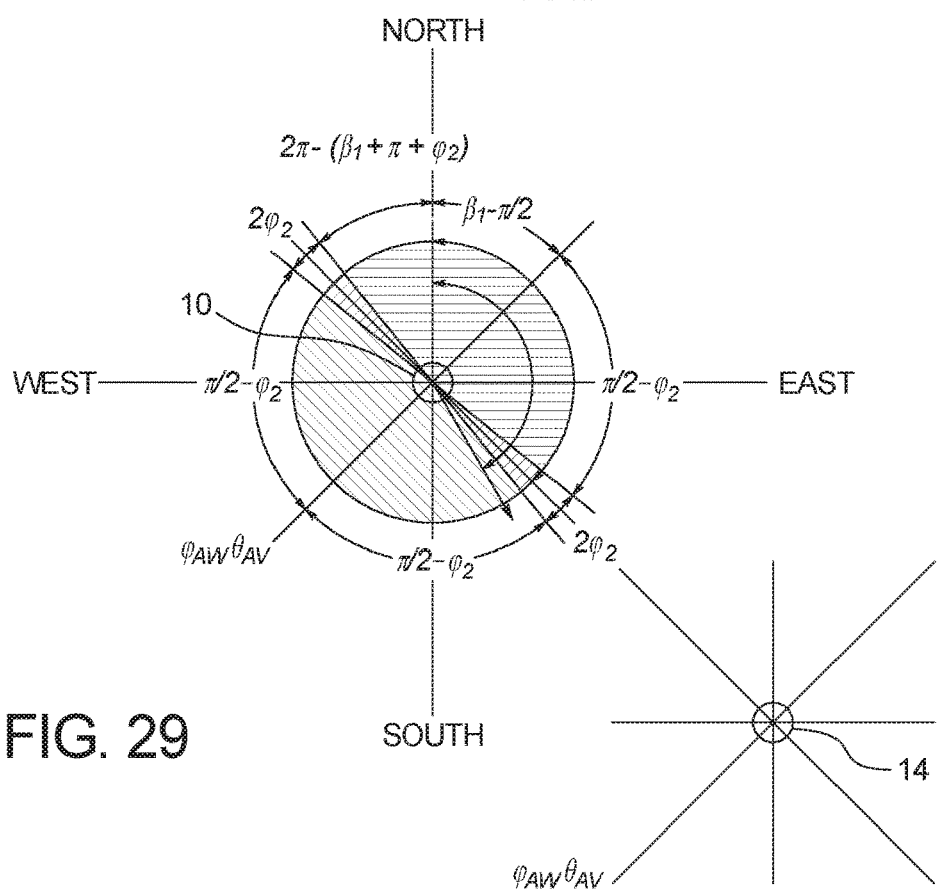
FIG. 29 illustrates a step the system for determining the number of remote vehicles following the host vehicle of FIG. 2 uses in determination of the number of remote vehicles following the host vehicle when the remote vehicles position is to the southeast of the host vehicle.
Figure 30:
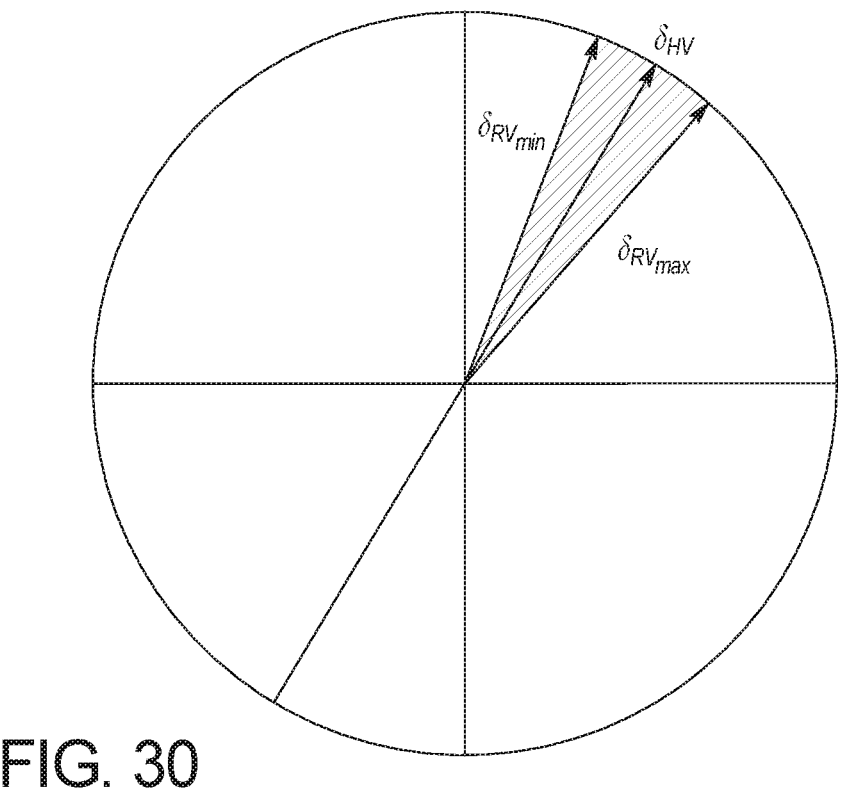
FIG. 30 illustrates the maximum remote vehicle heading angle when the remote vehicle is heading the same direction as the host vehicle.
Figure 31:
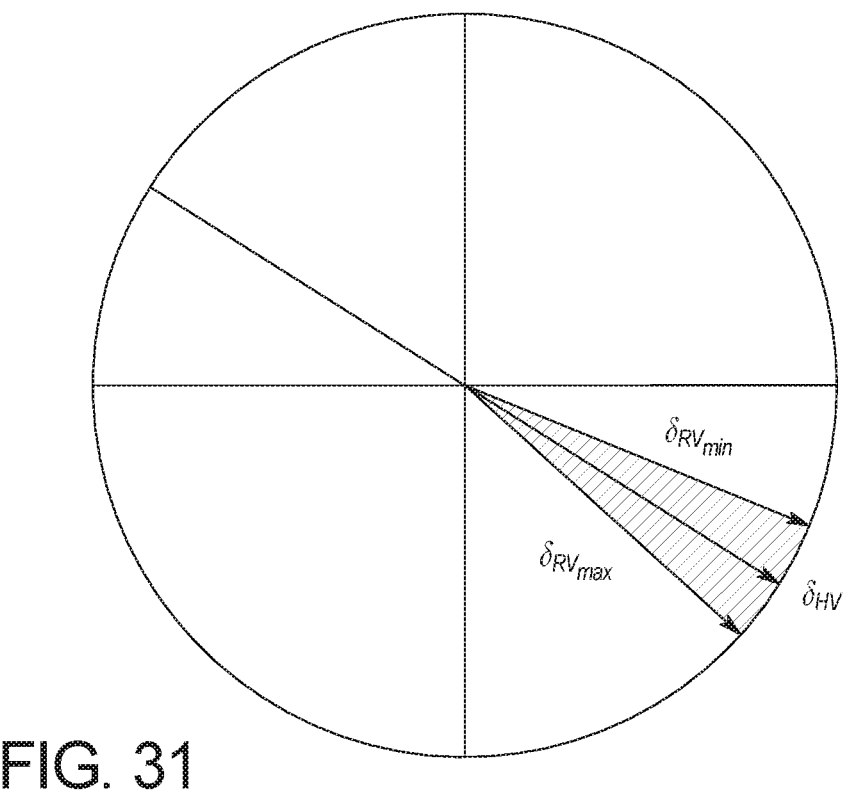
FIG. 31 illustrates the maximum remote vehicle heading angle when the remote vehicle is heading the same direction as the host vehicle.
Figure 32:
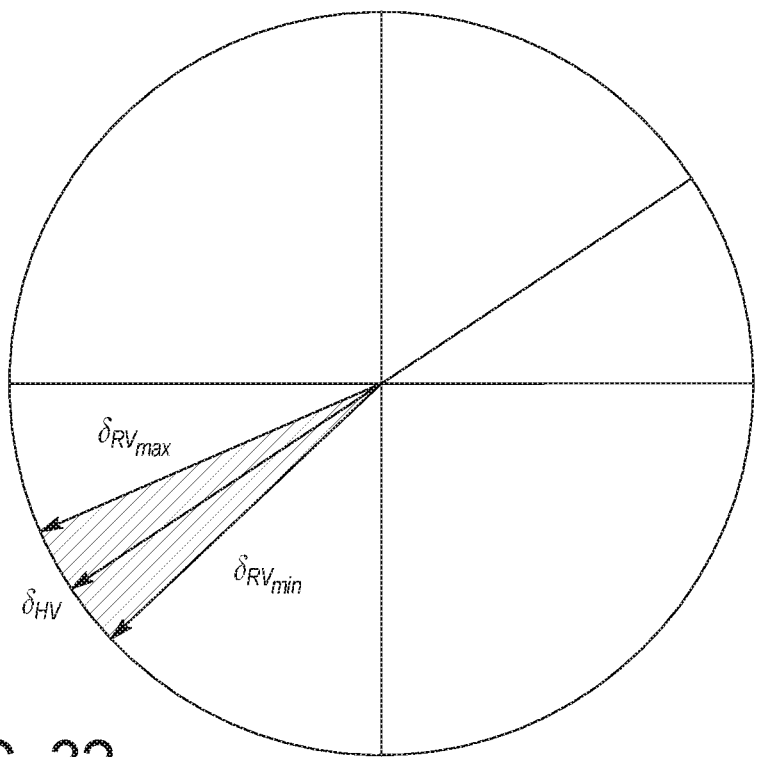
FIG. 32 illustrates the maximum remote vehicle heading angle when the remote vehicle is heading the same direction as the host vehicle.
Figure 33:
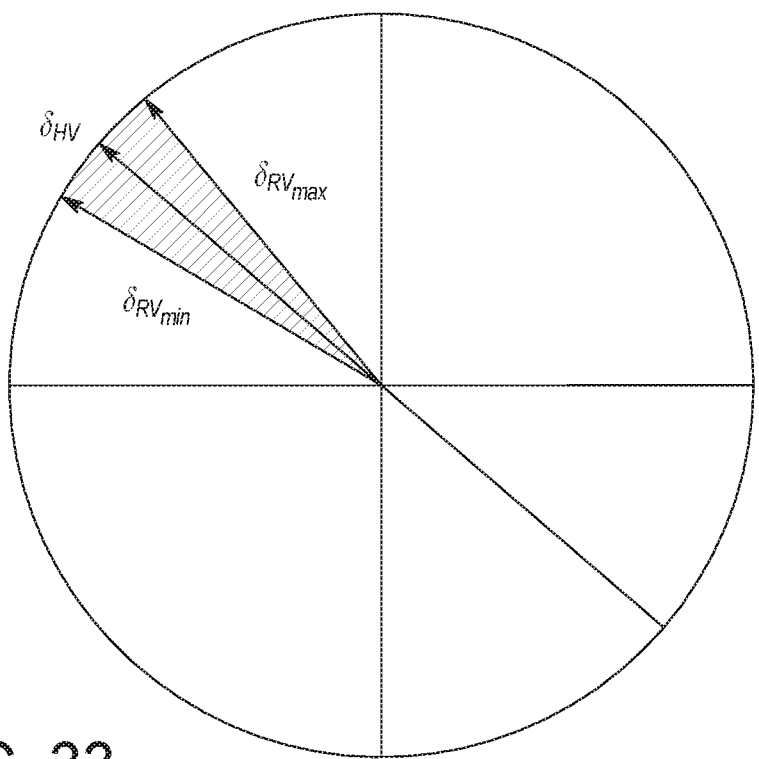
FIG. 33 illustrates the maximum remote vehicle heading angle when the remote vehicle is heading the same direction as the host vehicle.

If the remote vehicle 14 is southeast of the Host vehicle 10 as shown in FIGS. 28 and 29, the latitude for the remote vehicle 14 is less than the latitude of the host vehicle 10 but the longitude for the remote vehicle 14 is greater than the longitude for the host vehicle 10. Under these conditions, the expression for $Q_4$ above will equal 1 otherwise it will equal 0.

Longitudinal Position (XW)

The remote vehicle 14 is ahead (XW=00) of the host vehicle 10 if:

$A_{12} \leq \delta_{HV} < A_1$

Where:

$A_1 = \beta_1 + \pi/2 - \varphi_1$ $A_{12} = \beta_1 - \pi/2 + \varphi_1$ $\varphi_1$ is a threshold value that defines the angular range in which the remote vehicle 14 is defined to be adjacent to the host vehicle 10

$$\beta_1 = \pi\left[\frac{\theta_{HV} - \theta_{RV} - \sigma}{|\theta_{HV} - \theta_{RV}| + \sigma} + 1\right] -$$

$$\cos^{-1}\left(\frac{(\phi_{RV} - \phi_{HV})}{\sqrt{(\theta_{RV} - \theta_{HV})^2 \cos^2\phi_{HV} + (\phi_{RV} - \phi_{HV})^2}}\right)\left[\frac{\theta_{HV} - \theta_{RV} - \sigma}{|\theta_{HV} - \theta_{RV}| + \sigma}\right]$$

This region is identified as the diagonal (from upper right to lower left) cross sectional area in FIG. 28. These conditions can be defined in one mathematical expression as:

$$P_{Q_4} = \frac{1}{4}\left[\frac{\delta_{HV} - A_{12} + \sigma}{|\delta_{HV} - A_{12}| + \sigma} + 1\right] \times \left[\frac{A_1 - \delta_{HV} - \sigma}{|A_1 - \delta_{HV}| + \sigma} + 1\right]$$

The remote vehicle 14 is adjacent (XW=01) to the host vehicle 10 if:

$A_1 \leq \delta_{HV} < A_2$ or $A_{11} \leq \delta_{HV} < A_{12}$

Where:

$A_1 = \beta_1 + \pi/2 - \varphi_1$ $A_2 = \beta_1 + \pi/2 + \varphi_1$

TABLE 3

| | | Lateral Position | | | |
|---|---|---|---|---|---|
| $Q_3$ | | Remote vehicle 14 in lane ($I_{Q_3}$) | Remote vehicle 14 Left ($L_{Q_3}$) | Remote vehicle 14 Right ($R_{Q_3}$) | Unused |
| Longitudinal Position | Remote vehicle 14 Ahead ($P_{Q_3}$) | $Q_3 \times P_{Q_3} \times I_{Q_3}$ | $Q_3 \times P_{Q_3} \times L_{Q_3}$ | $Q_3 \times P_{Q_3} \times R_{Q_3}$ | 0 |
| | Remote vehicle 14 Adjacent ($A_{Q_3}$) | $Q_3 \times A_{Q_3} \times I_{Q_3}$ | $Q_3 \times A_{Q_3} \times L_{Q_3}$ | $Q_3 \times A_{Q_3} \times R_{Q_3}$ | 0 |
| | Remote vehicle 14 Behind ($B_{Q_3}$) | $Q_3 \times B_{Q_3} \times I_{Q_3}$ | $Q_3 \times B_{Q_3} \times L_{Q_3}$ | $Q_3 \times B_{Q_3} \times R_{Q_3}$ | 0 |
| | Unused | 0 | 0 | 0 | 0 |

$A_{11} = \beta_1 - \pi/2 - \varphi_1$ $A_{12} = \beta_1 - \pi/2 + \varphi_1$

These two specific angular ranges are identified as the interface between the vertical cross-sectional area and the diagonal (from upper right to lower left) cross sectional area in FIG. 28. These conditions can be defined in one mathematical expression as:

$$A_{Q_4} = \frac{1}{4}\left[\frac{\delta_{HV} - A_1 + \sigma}{|\delta_{HV} - A_1| + \sigma} + 1\right] \times \left[\frac{A_2 - \delta_{HV} - \sigma}{|A_2 - \delta_{HV}| + \sigma} + 1\right] + \frac{1}{4}\left[\frac{\delta_{HV} - A_{11} + \sigma}{|\delta_{HV} - A_{11}| + \sigma} + 1\right] \times \left[\frac{A_{12} - \delta_{HV} - \sigma}{|A_{12} - \delta_{HV}| + \sigma} + 1\right]$$

The remote vehicle 14 is behind (XW=10) the host vehicle 10 if:

$A_2 \leq \delta_{HV} < 2\pi$ or $0 \leq \delta_{HV} < A_{11}$

Where:

$A_2 = \beta_1 + \pi/2 + \varphi_1$ $A_{11} = \beta_1 - \pi/2 - \varphi_1$

This region is identified as the vertical cross-sectional area in FIG. 28. These conditions can be defined in one mathematical expression as:

$$B_{Q_4} = \frac{1}{4}\left[\frac{\delta_{HV} - 0 + \sigma}{|\delta_{HV} - 0| + \sigma} + 1\right] \times \left[\frac{A_{11} - \delta_{HV} - \sigma}{|A_{11} - \delta_{HV}| + \sigma} + 1\right] + \frac{1}{4}\left[\frac{\delta_{HV} - A_2 + \sigma}{|\delta_{HV} - A_2| + \sigma} + 1\right] \times \left[\frac{2\pi - \delta_{HV} - \sigma}{|2\pi - \delta_{HV}| + \sigma} + 1\right]$$

Lateral Position (VU)

The remote vehicle 14 is in lane (VU=00) with the host vehicle 10 if:

$A_5 \leq \delta_{HV} < A_6$ or $A_7 \leq \delta_{HV} < A_8$

Where:

$A_5 = \beta_1 - \varphi_2$ $A_6 = \beta_1 + \varphi_2$ $A_7 = \beta_1 + \pi - \varphi_2$ $A_8 = \beta_1 + \pi + \varphi_2$ $\varphi_2$ is a threshold value that defines the angular range in which the remote vehicle 14 is defined to be in the same lane with the host vehicle 10

These two specific angular ranges are identified as the interface between the horizontal cross-sectional area and the diagonal (form upper left to lower right) cross sectional area in FIG. 29. These conditions can be defined in one mathematical expression as:

$$I_{Q_4} = \frac{1}{4}\left[\frac{\delta_{HV} - A_5 + \sigma}{|\delta_{HV} - A_5| + \sigma} + 1\right] \times \left[\frac{A_6 - \delta_{HV} - \sigma}{|A_6 - \delta_{HV}| + \sigma} + 1\right] + \frac{1}{4}\left[\frac{\delta_{HV} - A_7 + \sigma}{|\delta_{HV} - A_7| + \sigma} + 1\right] \times \left[\frac{A_8 - \delta_{HV} - \sigma}{|A_8 - \delta_{HV}| + \sigma} + 1\right]$$

The remote vehicle 14 is to the left (VU=01) of the host vehicle 10 if:

$A_6 \leq \delta_{HV} < A_7$

Where:

$A_5 = \beta_1 - \varphi_2$ $A_8 = \beta_1 + \pi + \varphi_2$

This region is identified as the diagonal (form upper left to lower right) cross sectional area in FIG. 29. These conditions can be defined in one mathematical expression as:

$$L_{Q_4} = \frac{1}{4}\left[\frac{\delta_{HV} - A_6 + \sigma}{|\delta_{HV} - A_6| + \sigma} + 1\right] \times \left[\frac{A_7 - \delta_{HV} - \sigma}{|A_7 - \delta_{HV}| + \sigma} + 1\right]$$

The remote vehicle 14 is to the right (VU=10) of the host vehicle 10 if:

$0 \leq \delta_{HV} < A_5$ or $A_8 \leq \delta_{HV} < 2\pi$

Where:

$A_5 = \beta_1 - \varphi_2$ $A_8 = \beta_1 + \pi + \varphi_2$

This region is identified as the horizontal cross-sectional area in FIG. 29. These conditions can be defined in one mathematical expression as:

$$R_{Q_4} = \frac{1}{4}\left[\frac{\delta_{HV} - 0 + \sigma}{|\delta_{HV} - 0| + \sigma} + 1\right] \times \left[\frac{A_5 - \delta_{HV} - \sigma}{|A_5 - \delta_{HV}| + \sigma} + 1\right] + \frac{1}{4}\left[\frac{\delta_{HV} - A_8 + \sigma}{|\delta_{HV} - A_8| + \sigma} + 1\right] \times \left[\frac{2\pi - \delta_{HV} - \sigma}{|2\pi - \delta_{HV}| + \sigma} + 1\right]$$

The expressions are then consolidated in Table 4 for the case when the remote vehicle 14 is to the southwest of the host vehicle 10.

TABLE 4

| | | Lateral Position | | | |
|---|---|---|---|---|---|
| | $Q_4$ | Remote vehicle in lane ($I_{Q_4}$) | Remote vehicle Left ($L_{Q_4}$) | Remote vehicle Right ($R_{Q_4}$) | Unused |
| Longitudinal Position | Remote vehicle Ahead ($P_{Q_4}$) | $Q_4 \times P_{Q_4} \times I_{Q_4}$ | $Q_4 \times P_{Q_4} \times L_{Q_4}$ | $Q_4 \times P_{Q_4} \times R_{Q_4}$ | 0 |
| | Remote vehicle Adjacent ($A_{Q_4}$) | $Q_4 \times A_{Q_4} \times I_{Q_4}$ | $Q_4 \times A_{Q_4} \times L_{Q_4}$ | $Q_4 \times A_{Q_4} \times R_{Q_{44}}$ | 0 |
| | Remote vehicle Behind ($B_{Q_4}$) | $Q_4 \times B_{Q_4} \times I_{Q_4}$ | $Q_4 \times B_{Q_4} \times L_{Q_4}$ | $Q_4 \times B_{Q_4} \times R_{Q_4}$ | 0 |
| | Unused | 0 | 0 | 0 | 0 |

Summary (Tables 1-4)

TABLE 5

| $Q_1$ | | Lateral Position | | | |
|---|---|---|---|---|---|
| | | Remote vehicle in lane ($I_{Q_1}$) | Remote vehicle Left ($L_{Q_1}$) | Remote vehicle Right ($R_{Q_1}$) | Unused |
| Longitudinal Position | Remote vehicle Ahead ($P_{Q_1}$) | $Q_1 \times P_{Q_1} \times I_{Q_1}$ | $Q_1 \times P_{Q_1} \times L_{Q_1}$ | $Q_1 \times P_{Q_1} \times R_{Q_1}$ | 0 |
| | Remote vehicle Adjacent ($A_{Q_1}$) | $Q_1 \times A_{Q_1} \times I_{Q_1}$ | $Q_1 \times A_{Q_1} \times L_{Q_1}$ | $Q_1 \times A_{Q_1} \times R_{Q_1}$ | 0 |
| | Remote vehicle Behind ($B_{Q_1}$) | $Q_1 \times B_{Q_1} \times I_{Q_1}$ | $Q_1 \times B_{Q_1} \times L_{Q_1}$ | $Q_1 \times B_{Q_1} \times R_{Q_1}$ | 0 |
| | Unused | 0 | 0 | 0 | 0 |

| $Q_2$ | | Lateral Position | | | |
|---|---|---|---|---|---|
| | | Remote vehicle in lane ($I_{Q_2}$) | Remote vehicle Left ($L_{Q_2}$) | Remote vehicle Right ($R_{Q_2}$) | Unused |
| Longitudinal Position | Remote vehicle Ahead ($P_{Q_2}$) | $Q_2 \times P_{Q_2} \times I_{Q_2}$ | $Q_2 \times P_{Q_2} \times L_{Q_2}$ | $Q_2 \times P_{Q_2} \times R_{Q_2}$ | 0 |
| | Remote vehicle Adjacent ($A_{Q_2}$) | $Q_2 \times A_{Q_2} \times I_{Q_2}$ | $Q_2 \times A_{Q_2} \times L_{Q_2}$ | $Q_2 \times A_{Q_2} \times R_{Q_2}$ | 0 |
| | Remote vehicle Behind ($B_{Q_2}$) | $Q_2 \times B_{Q_2} \times I_{Q_2}$ | $Q_2 \times B_{Q_2} \times L_{Q_2}$ | $Q_2 \times B_{Q_2} \times R_{Q_2}$ | 0 |
| | Unused | 0 | 0 | 0 | 0 |

| $Q_3$ | | Lateral Position | | | |
|---|---|---|---|---|---|
| | | Remote vehicle in lane ($I_{Q_3}$) | Remote vehicle Left ($L_{Q_3}$) | Remote vehicle Right ($R_{Q_3}$) | Unused |
| Longitudinal Position | Remote vehicle Ahead ($P_{Q_3}$) | $Q_3 \times P_{Q_3} \times I_{Q_3}$ | $Q_3 \times P_{Q_3} \times L_{Q_3}$ | $Q_3 \times P_{Q_3} \times R_{Q_3}$ | 0 |
| | Remote vehicle Adjacent ($A_{Q_3}$) | $Q_3 \times A_{Q_3} \times I_{Q_3}$ | $Q_3 \times A_{Q_3} \times L_{Q_3}$ | $Q_3 \times A_{Q_3} \times R_{Q_3}$ | 0 |
| | Remote vehicle Behind ($B_{Q_3}$) | $Q_3 \times B_{Q_3} \times I_{Q_3}$ | $Q_3 \times B_{Q_3} \times L_{Q_3}$ | $Q_3 \times B_{Q_3} \times R_{Q_3}$ | 0 |
| | Unused | 0 | 0 | 0 | 0 |

| $Q_4$ | | Lateral Position | | | |
|---|---|---|---|---|---|
| | | Remote vehicle in lane ($I_{Q_4}$) | Remote vehicle Left ($L_{Q_4}$) | Remote vehicle Right ($R_{Q_4}$) | Unused |
| Longitudinal Position | Remote vehicle Ahead ($P_{Q_4}$) | $Q_4 \times P_{Q_4} \times I_{Q_4}$ | $Q_4 \times P_{Q_4} \times L_{Q_4}$ | $Q_4 \times P_{Q_4} \times R_{Q_4}$ | 0 |
| | Remote vehicle Adjacent ($A_{Q_4}$) | $Q_4 \times A_{Q_4} \times I_{Q_4}$ | $Q_4 \times A_{Q_4} \times L_{Q_4}$ | $Q_4 \times A_{Q_4} \times R_{Q_{44}}$ | 0 |
| | Remote vehicle Behind ($B_{Q_4}$) | $Q_4 \times B_{Q_4} \times I_{Q_4}$ | $Q_4 \times B_{Q_4} \times L_{Q_4}$ | $Q_4 \times B_{Q_4} \times R_{Q_4}$ | 0 |
| | Unused | 0 | 0 | 0 | 0 |

The longitudinal and lateral relative position bits for the relative position code are defined in Table 6:

TABLE 6

| | | VU | | | |
|---|---|---|---|---|---|
| | | 00 | 01 | 10 | 11 |
| XW | 00 | 0000 | 0001 | 0010 | 0011 |
| | 01 | 0100 | 0101 | 0110 | 0111 |
| | 10 | 1000 | 1001 | 1010 | 1011 |
| | 11 | 1100 | 1101 | 1110 | 1111 |

Bits X through U are generated using the array of expressions shown in Table 7

TABLE 7

| x | w | v | u |
|---|---|---|---|
| $x_1 = 0$ | $w_1 = 0$ | $v_1 = 0$ | $u_1 = 0$ |
| $x_2 = 0$ | $w_2 = 0$ | $v_2 = 0$ | $u_2 = \sum_{i=1}^{4} Q_i \times P_{Q_i} \times L_{Q_i} \times 1$ |

TABLE 7-continued

| x | w | v | u |
|---|---|---|---|
| $x_3 = 0$ | $w_3 = 0$ | $v_3 = \sum_{i=1}^{4} Q_i \times P_{Q_i} \times R_{Q_i} \times 1$ | $u_3 = 0$ |
| $x_4 = 0$ | $w_4 = \sum_{i=1}^{4} Q_i \times A_{Q_i} \times I_{Q_i} \times 1$ | $v_4 = 0$ | $u_4 = 0$ |
| $x_5 = 0$ | $w_5 = \sum_{i=1}^{4} Q_i \times A_{Q_i} \times L_{Q_i} \times 1$ | $v_5 = 0$ | $u_5 = \sum_{i=1}^{4} Q_i \times A_{Q_i} \times L_{Q_i} \times 1$ |
| $x_6 = 0$ | $w_6 = \sum_{i=1}^{4} Q_i \times A_{Q_i} \times R_{Q_i} \times 1$ | $v_6 = \sum_{i=1}^{4} Q_i \times A_{Q_i} \times R_{Q_i} \times 1$ | $u_6 = 0$ |
| $x_7 = \sum_{i=1}^{4} Q_i \times B_{Q_i} \times I_{Q_i} \times 1$ | $w_7 = 0$ | $v_7 = 0$ | $u_7 = 0$ |
| $x_8 = \sum_{i=1}^{4} Q_i \times B_{Q_i} \times L_{Q_i} \times 1$ | $w_8 = 0$ | $v_8 = 0$ | $u_8 = \sum_{i=1}^{4} Q_i \times B_{Q_i} \times L_{Q_i} \times 1$ |
| $x_9 = \sum_{i=1}^{4} Q_i \times B_{Q_i} \times R_{Q_i} \times 1$ | $w_9 = 0$ | $v_9 = \sum_{i=1}^{4} Q_i \times B_{Q_i} \times R_{Q_i} \times 1$ | $u_9 = 0$ |
| $X = \sum_{i=1}^{9} x_i$ | $W = \sum_{i=1}^{9} w_i$ | $V = \sum_{i=1}^{9} v_i$ | $U = \sum_{i=1}^{9} u_i$ |

Elevation

The elevation component of relative position is easily provided by the following three expressions.

If the host vehicle 10 and remote vehicle 14 are at the same elevation, $$Z_1 = \frac{1}{4}\left[\frac{\varepsilon - (z_{HV} - z_{RV}) + \sigma}{|\varepsilon - (z_{HV} - z_{RV})| + \sigma} + 1\right] \times \left[\frac{\varepsilon - (z_{HV} - z_{RV}) - \sigma}{|\varepsilon - (z_{HV} - z_{RV})| + \sigma} + 1\right] = 1(TS = 00)$$

If the host vehicle 10 is lower, $$Z_2 = \frac{1}{2}\left[\frac{(z_{RV} - z_{HV}) - \varepsilon - \sigma}{|(z_{RV} - z_{HV}) - \varepsilon| + \sigma} + 1\right] = 1(TS = 01)$$

If the host vehicle 10 is higher, $$Z_3 = \frac{1}{2}\left[\frac{(z_{HV} - z_{RV}) - \varepsilon - \sigma}{|(z_{HV} - z_{RV}) - \varepsilon| + \sigma} + 1\right] = 1(TS = 10)$$

where:

$z_{HV}$=host vehicle 10 elevation $z_{RV}$=remote vehicle 14 elevation $\varepsilon$=a defined threshold value of distance such as 4 m.

Bits T and S U are generated using the array of expressions shown in Table 8.

TABLE 8

| t | s |
|---|---|
| $t_1 = Z_1 \times 0$ | $s_1 = Z_1 \times 0$ |
| $t_2 = Z_2 \times 0$ | $s_2 = Z_2 \times 0$ |
| $t_3 = Z_3 \times 0$ | $s_3 = Z_3 \times 0$ |

$$T = \sum_{i=1}^{3} t_i$$

$$S = \sum_{i=1}^{3} s_i$$

Remote Vehicle Position Relative to Host Vehicle (Heading)

When the host vehicle 10 and the remote vehicle 14 traveling in same direction, (RQ=01). The remote vehicle 14 heading angle as a function of the host vehicle 10 heading angle for the case of following vehicles can be defined as follows:

$$\delta_{RV} = \delta_{HV}$$

However, narrowly defining $\delta_{RV}$ to be exactly the same as $\delta_{HV}$ would result in a condition where the two vehicles would almost never be classified as heading in the same direction when in reality this condition is a very common occurrence. In order to account for small differences in heading angles, a variable $\varphi_2$ is used to define a range of heading angles for the remote vehicle 14 in which the remote vehicle 14 would be considered to be heading in the same direction as the host vehicle 10. To define this range, the following expressions are defined.

Minimum Remote Vehicle Heading Angle

If $\delta_{RV}-\varphi_2<0$ then $\delta_{RV_{min}}^{01}=2\pi+\delta_{RV}-\varphi_2$
If $\delta_{RV}-\varphi_2\geq 0$ then $\delta_{RV_{min}}^{01}=\delta_{RV}-\varphi_2$ These conditions can be combined into one mathematical expression as:

$$\delta_{RV_{min}}^{01}=\varsigma_{min_1}\times(2\pi+\delta_{RV}-\varphi_2)+\varsigma_{min_2}\times(\delta_{RV}-\varphi_2)$$

Where:

$$\varsigma_{min_1}=\frac{1}{2}\left[\frac{0-(\delta_{RV}-\varphi_2)-\sigma}{|0-(\delta_{RV}-\varphi_2)|+\sigma}+1\right]$$

$$\varsigma_{min_2}=\frac{1}{2}\left[\frac{(\delta_{RV}-\varphi)-0+\sigma}{|(\delta_{RV}-\varphi)-0|+\sigma}+1\right]$$

These expressions have two values, 0 or 1 depending on the value of day and can be thought of as filtering functions that ensure the appropriate expression is used to calculate the value of $\delta_{RV_{min}}^{01}$.

Maximum Remote Vehicle Heading Angle

If $\delta_{RV}+\varphi<2\pi$ then $\delta_{RV_{max}}^{01}=\delta_{RV}+\varphi_2$
If $\delta_{RV}+\varphi\geq 2\pi$ then $\delta_{RV_{max}}^{01}=\delta_{RV}+\varphi_2-2\pi$ These conditions can be combined into one mathematical expression as:

$$\delta_{RV_{max}}^{01}=\varsigma_{max_1}\times(\delta_{RV}+\varphi_2)+\varsigma_{max_2}\times(\delta_{RV}+\varphi_2-2\pi)$$

Where:

$$\varsigma_{max_1}=\frac{1}{2}\left[\frac{2\pi-(\delta_{RV}+\varphi_2)-\sigma}{|2\pi-(\delta_{RV}+\varphi_2)|+\sigma}+1\right]$$

$$\varsigma_{max_2}=\frac{1}{2}\left[\frac{(\delta_{RV}+\varphi_2)-2\pi+\sigma}{|(\delta_{RV}+\varphi_2)-2\pi|+\sigma}+1\right]$$

These expressions have two values, 0 or 1 depending on the value of $\delta_{RV}$ and can be thought of as filtering functions that ensure the appropriate expression is used to calculate the value of $\delta_{RV_{max}}^{01}$.

The remote vehicle 14 is considered to be traveling in the same direction as the host vehicle 10 when the heading angle of the remote vehicle 14. $\delta_{RV}$ falls within the range $\delta_{RV_{min}}^{01}$ and $\delta_{RV_{max}}^{01}$ therefore in most cases, the heading angle of the host vehicle 10. $\delta_{HV}$ will be greater than or equal to $\delta_{RV_{min}}^{01}$ and less than or equal to $\delta_{RV_{max}}^{01}$ otherwise the remote vehicle 14 will be considered to be traveling in a direction other than the same direction of the host vehicle 10 as shown in FIGS. 30-33.

Figure 34:
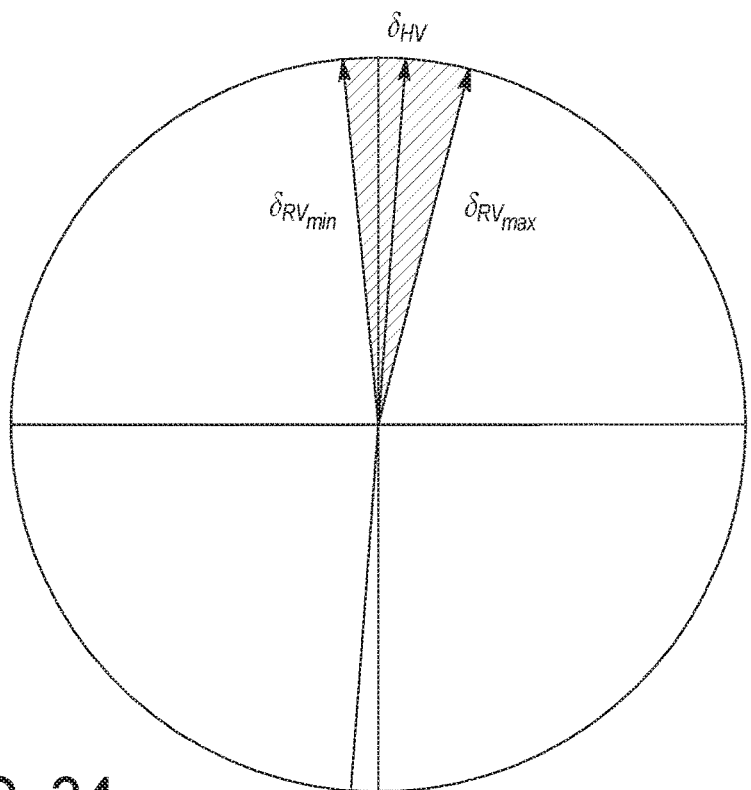
FIG. 34 illustrates the maximum remote vehicle heading angle when the remote vehicle is heading the same direction as the host vehicle.
Figure 35:
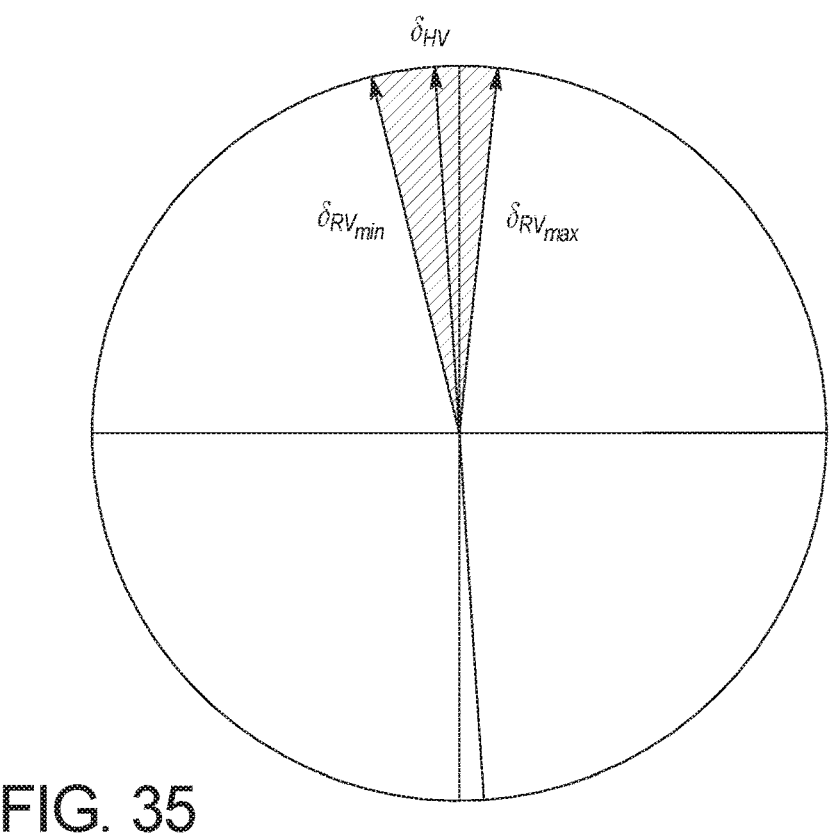
FIG. 35 illustrates the maximum remote vehicle heading angle when the remote vehicle is heading the same direction as the host vehicle.

However, because of the fixed reference used where North=0°, there are cases where $\delta_{HV}$ will be less than or equal to $\delta_{RV_{min}}^{01}$ and less than or equal to $\delta_{RV_{max}}^{01}$ or cases where $\delta_{HV}$ will be greater than or equal to $\delta_{RV_{min}}^{01}$ and greater than or equal to $\delta_{RV_{max}}^{01}$ such as shown in FIGS. 34 and 35.

Consider the following expressions for $H_1$ and $H_2$.

$$H_1=\delta_{HV}-\delta_{RV_{min}}^{01}$$

$$H_2=\delta_{HV}-\delta_{RV_{max}}^{01}$$

For any value of $\delta_{HV}$, the values for $H_1$ and $H_2$ fall within three distinct categories:

1: $H_1$ is negative, $H_2$ is negative and $H_1<H_2$ ($\delta_{HV}<\delta_{RV_{min}}^{01}$ and $\delta_{HV}<\delta_{RV_{max}}^{01}$)
2: $H_1$ is positive, $H_2$ is negative and $H_1>H_2$ ($\delta_{HV}>\delta_{RV_{min}}^{01}$ and $\delta_{HV}<\delta_{RV_{max}}^{01}$)
3: $H_1$ is positive, $H_2$ is positive and $H_1<H_2$ ($\delta_{HV}>\delta_{RV_{min}}^{01}$ and $\delta_{HV}>\delta_{RV_{max}}^{01}$)

From these three conditions, it can be shown that for any combination of $\delta_{HV}$ and $\delta_{RV}$, where $0\leq\delta_{HV}<2\pi$ and $0\leq\delta_{RV}<2\pi$ the following expressions can be used to identify if the host vehicle 10 and remote vehicle 14 are traveling in the same direction.

$$\Delta_1^{01}=\frac{1}{8}\left[\frac{\delta_{RV_{min}}^{01}-\delta_{RV}+\sigma}{|\delta_{RV_{min}}^{01}-\delta_{RV}|+\sigma}+1\right]\times$$
$$\left[\frac{\delta_{RV_{max}}^{01}-\delta_{RV}+\sigma}{|\delta_{RV_{max}}^{01}-\delta_{RV}|+\sigma}+1\right]\times\left[1-\frac{H_1-H_2-\sigma}{|H_1-H_2|+\sigma}\right]$$

If $H_1<H_2$, $\delta_{RV}\leq\delta_{RV_{min}}^{01}$ and $\delta_{RV}\leq\delta_{RV_{max}}^{01}$ $\Delta_1^{01}=1$ otherwise $\Delta_1^{01}=0$ $$\Delta_2^{01}=\frac{1}{8}\left[\frac{\delta_{RV}-\delta_{RV_{min}}^{01}+\sigma}{|\delta_{RV}-\delta_{RV_{min}}^{01}|+\sigma}+1\right]\times$$
$$\left[\frac{\delta_{RV_{max}}^{01}-\delta_{RV}+\sigma}{|\delta_{RV_{max}}^{01}-\delta_{RV}|+\sigma}+1\right]\times\left[\frac{H_1-H_2-\sigma}{|H_1-H_2|+\sigma}+1\right]$$

If $H_1>H_2$ and $\delta_{RV_{min}}^{01}\leq\delta_{RV}\leq\delta_{RV_{max}}^{01}$, $\Delta_2^{01}=1$ otherwise $\Delta_2^{01}=0$ $$\Delta_3^{01}=\frac{1}{8}\left[\frac{\delta_{RV}-\delta_{RV_{min}}^{01}+\sigma}{|\delta_{RV}-\delta_{RV_{min}}^{01}|+\sigma}+1\right]\times$$
$$\left[\frac{\delta_{RV}-\delta_{RV_{max}}^{01}+\sigma}{|\delta_{RV}-\delta_{RV_{max}}^{01}|+\sigma}+1\right]\times\left[1-\frac{H_1-H_2-\sigma}{|H_1-H_2|+\sigma}\right]$$

If $H_1>H_2$ and $\delta_{RV_{min}}^{01}\leq\delta_{RV}$ and $\delta_{RV_{max}}^{01}\leq\delta_{RV}$ $\Delta_1^{01}=1$ otherwise $\Delta_1^{01}=0$ Also, it is advantageous to define the difference of $H_1$ and $H_2$ as follows:

$$H_1-H_2=\delta_{HV}-\delta_{RV_{min}}^{01}-(\delta_{HV}-\delta_{RV_{max}}^{01})$$

$$H_1-H_2=\delta_{HV}-\delta_{RV_{min}}^{01}-\delta_{HV}+\delta_{RV_{max}}^{01}$$

$$H_1-H_2=\delta_{HV}-\delta_{RV_{min}}^{01}-\delta_{HV}+\delta_{RV_{max}}^{01}$$

$$H_1-H_2=\delta_{RV_{max}}^{01}-\delta_{RV_{min}}^{01}$$

Then the previous expressions can be expressed as:

$$\Delta_1^{01}=\frac{1}{8}\left[\frac{\delta_{RV_{min}}^{01}-\delta_{RV}+\sigma}{|\delta_{RV_{min}}^{01}-\delta_{RV}|+\sigma}+1\right]\times$$
$$\left[\frac{\delta_{RV_{max}}^{01}-\delta_{RV}+\sigma}{|\delta_{RV_{max}}^{01}-\delta_{RV}|+\sigma}+1\right]\times\left[1-\frac{\delta_{RV_{max}}^{01}-\delta_{RV_{min}}^{01}-\sigma}{|\delta_{RV_{max}}^{01}-\delta_{RV_{min}}^{01}|+\sigma}\right]$$

$$\Delta_2^{01}=\frac{1}{8}\left[\frac{\delta_{RV}-\delta_{RV_{min}}^{01}+\sigma}{|\delta_{RV}-\delta_{RV_{min}}^{01}|+\sigma}+1\right]\times$$
$$\left[\frac{\delta_{RV_{max}}^{01}-\delta_{RV}+\sigma}{|\delta_{RV_{max}}^{01}-\delta_{RV}|+\sigma}+1\right]\times\left[\frac{\delta_{RV_{max}}^{01}-\delta_{RV_{min}}^{01}-\sigma}{|\delta_{RV_{max}}^{01}-\delta_{RV_{min}}^{01}|+\sigma}+1\right]$$

$$\Delta_3^{01}=\frac{1}{8}\left[\frac{\delta_{RV}-\delta_{RV_{min}}^{01}+\sigma}{|\delta_{RV}-\delta_{RV_{min}}^{01}|+\sigma}+1\right]\times$$
$$\left[\frac{\delta_{RV}-\delta_{RV_{max}}^{01}+\sigma}{|\delta_{RV}-\delta_{RV_{max}}^{01}|+\sigma}+1\right]\times\left[1-\frac{\delta_{RV_{max}}^{01}-\delta_{RV_{min}}^{01}-\sigma}{|\delta_{RV_{max}}^{01}-\delta_{RV_{min}}^{01}|+\sigma}\right]$$

If the sum of these three expressions is equal to 1, the host vehicle 10 and remote vehicle 14 are traveling in the same direction. This condition is expressed mathematically as:

$$\sum_{i=1}^{3} \Delta_i^{01} = 1 \ (RQ = 01)$$

Thus:

$$r_1 = \sum_{i=1}^{3} \Delta_i^{01} \times 0$$

$$q_1 = \sum_{i=1}^{3} \Delta_i^{01} \times 1$$

host vehicle 10 and remote vehicle 14 approaching either other from opposite directions (RQ=10):
Remote vehicle 14 Heading angle as a function of Host vehicle 10 heading angle for the case of on-coming vehicles can be defined as follows:

$$\delta_{RV} = \frac{1}{2}\left[\frac{\delta_{HV} - \pi - \sigma}{|\delta_{HV} - \pi| + \sigma} + 1\right] \times (\delta_{HV} - \pi) + \frac{1}{2}\left[\frac{\pi - \delta_{HV} - \sigma}{|\pi - \delta_{HV}| + \sigma} + 1\right] \times (\delta_{HV} + \pi)$$

However, narrowly defining $\delta_{RV}$ to be exactly opposite of $\delta_{HV}$ in would result in a condition where the two vehicles would almost never be classified as heading in opposite direction when in reality this condition is a very common occurrence. In order to account for small differences in heading angles, the variable $\varphi_2$ is used to define a range a range of heading angles for the remote vehicle 14 in which the remote vehicle 14 would be considered to be heading in the opposite direction of the host vehicle 10. To define this range, the following expressions are defined:
Minimum Remote Vehicle Heading Angle:
If $\delta_{RV} - \varphi_2 < 0$ then $\delta_{RV_{min}}^{10} = 2\pi + \delta_{RV} - \varphi_2$
If $\delta_{RV} - \varphi_2 \geq 0$ then $\delta_{RV_{min}}^{10} = \delta_{RV} - \varphi_2$
These conditions can be combined into one mathematical expression as:

$$\delta_{RV_{min}}^{10} = \zeta_{min_1} \times (2\pi + \delta_{RV} - \varphi_2) + \zeta_{min_2} \times (\delta_{RV} - \varphi_2)$$

Where:

$$\zeta_{min_1} = \frac{1}{2}\left[\frac{0 - (\delta_{RV} - \varphi_2) - \sigma}{|0 - (\delta_{RV} - \varphi_2)| + \sigma} + 1\right]$$

$$\zeta_{min_2} = \frac{1}{2}\left[\frac{(\delta_{RV} - \varphi_2) - 0 + \sigma}{|(\delta_{RV} - \varphi_2) - 0| + \sigma} + 1\right]$$

These expressions have two values, 0 or 1 depending on the value of $\delta_{RV}$ and can be thought of as filtering functions that ensure the appropriate expression is used to calculate the value of $\delta_{RV_{min}}^{10}$.
Maximum Remote Vehicle Heading Angle
If $\delta_{RV} + \varphi_2 < 2\pi$ then $\delta_{RV_{max}}^{10} = \delta_{RV} + \varphi_2$
If $\delta_{RV} + \varphi_2 \geq 2\pi$ then $\delta_{RV_{max}}^{10} = \delta_{RV} + \varphi_2 - 2\pi$
These conditions can be combined into one mathematical expression as:

$$\delta_{RV_{max}}^{10} = \zeta_{min_1} \times (\delta_{RV} + \varphi_2) + \zeta_{min_2} \times (\delta_{RV} + \varphi_2 - 2\pi)$$

where:

$$\zeta_{max_1} = \frac{1}{2}\left[\frac{2\pi - (\delta_{RV} + \varphi_2) - \sigma}{|2\pi - (\delta_{RV} + \varphi_2)| + \sigma} + 1\right]$$

$$\zeta_{max_2} = \frac{1}{2}\left[\frac{(\delta_{RV} + \varphi_2) - 2\pi + \sigma}{|(\delta_{RV} + \varphi_2) - 2\pi| + \sigma} + 1\right]$$

These expressions have two values, 0 or 1 depending on the value of $\delta_{RV}$ and can be thought of as filtering functions that ensure the appropriate expression is used to calculate the value of $\delta_{RV_{max}}^{10}$.

Figure 36:
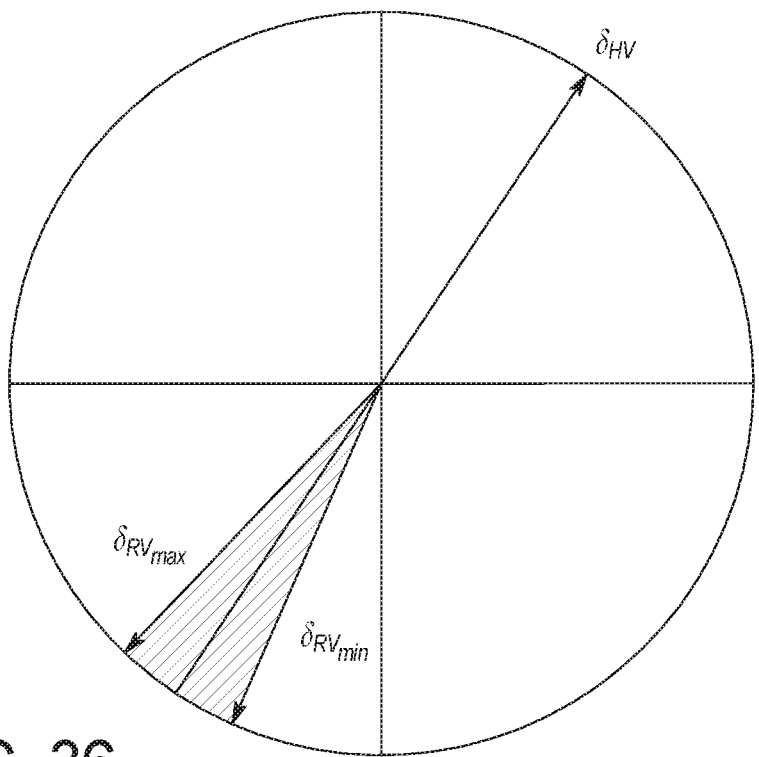
FIG. 36 illustrates the maximum remote vehicle heading angle when the remote vehicle is heading the same direction as the host vehicle.
Figure 37:
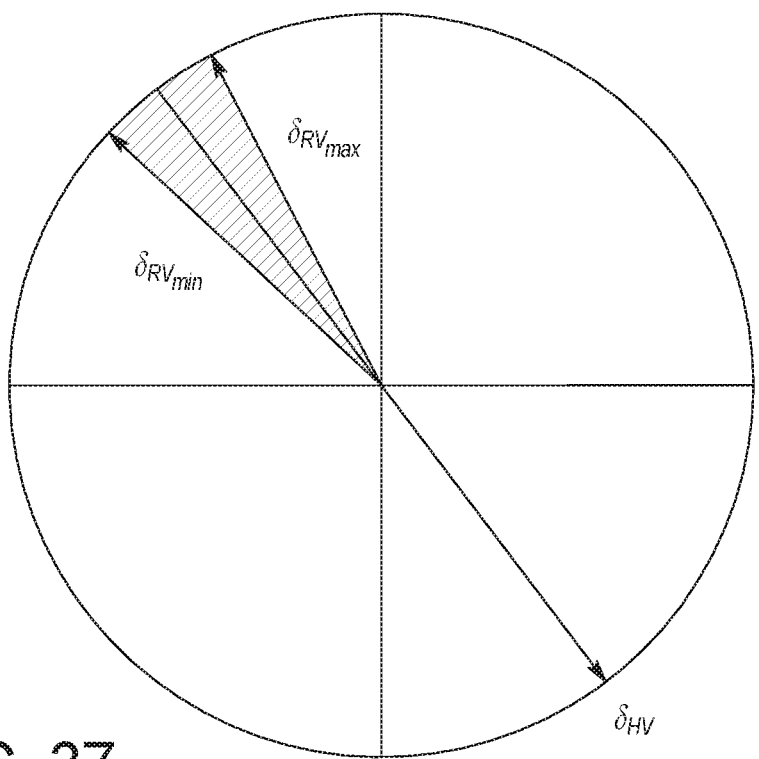
FIG. 37 illustrates the maximum remote vehicle heading angle when the remote vehicle is heading the same direction as the host vehicle.
Figure 38:
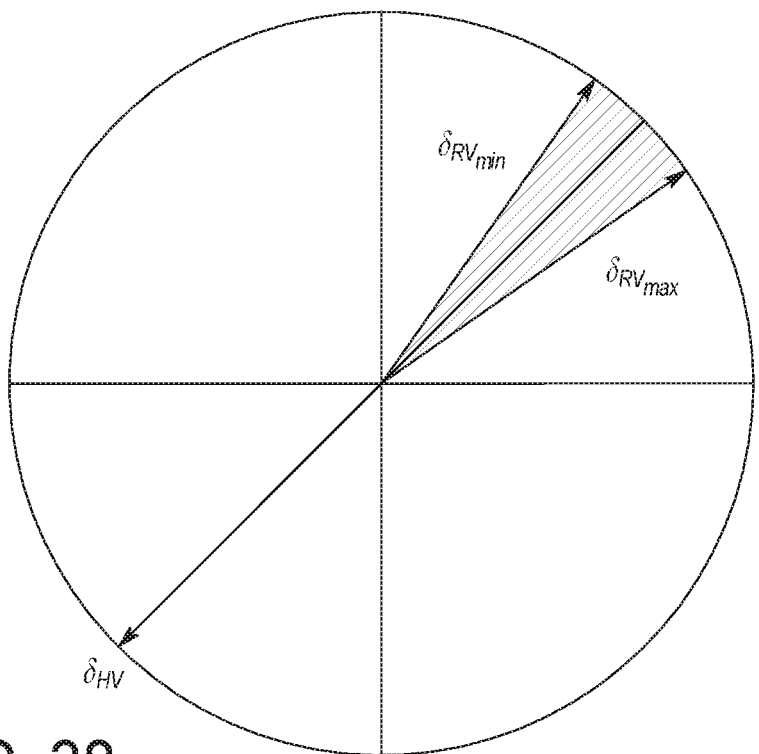
FIG. 38 illustrates the maximum remote vehicle heading angle when the remote vehicle is heading the same direction as the host vehicle.
Figure 39:
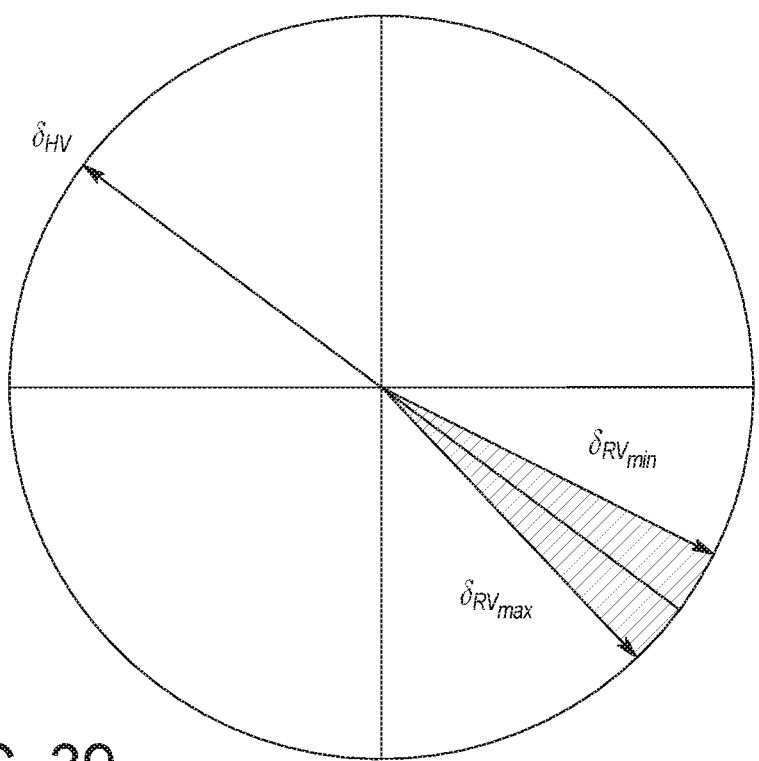
FIG. 39 illustrates the maximum remote vehicle heading angle when the remote vehicle is heading the same direction as the host vehicle.
Figure 40:
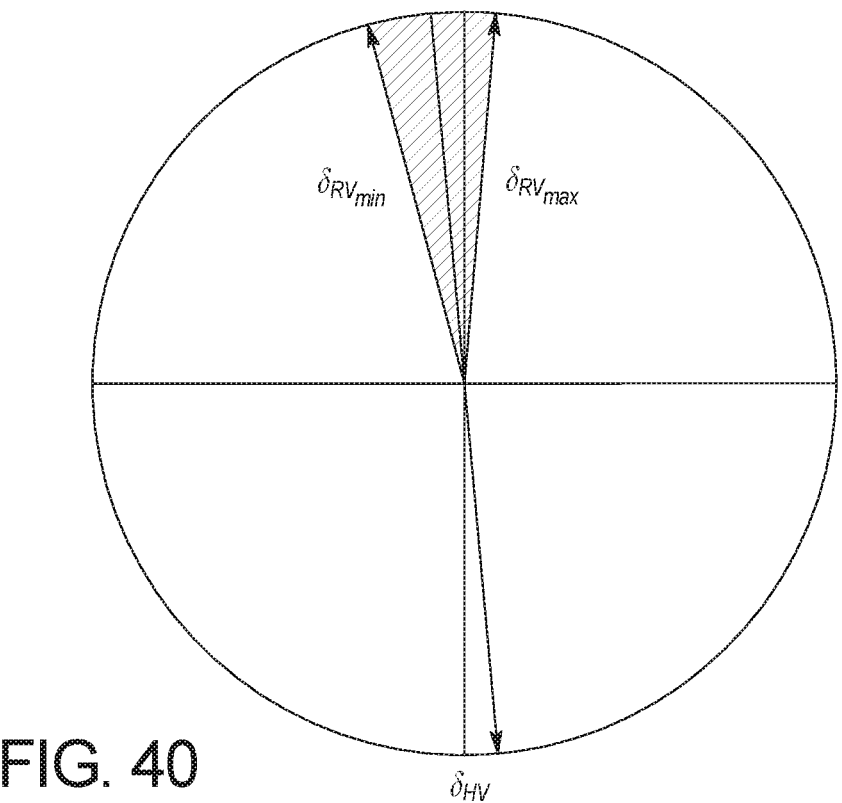
FIG. 40 illustrates the maximum remote vehicle heading angle when the remote vehicle is heading the same direction as the host vehicle.
Figure 41:
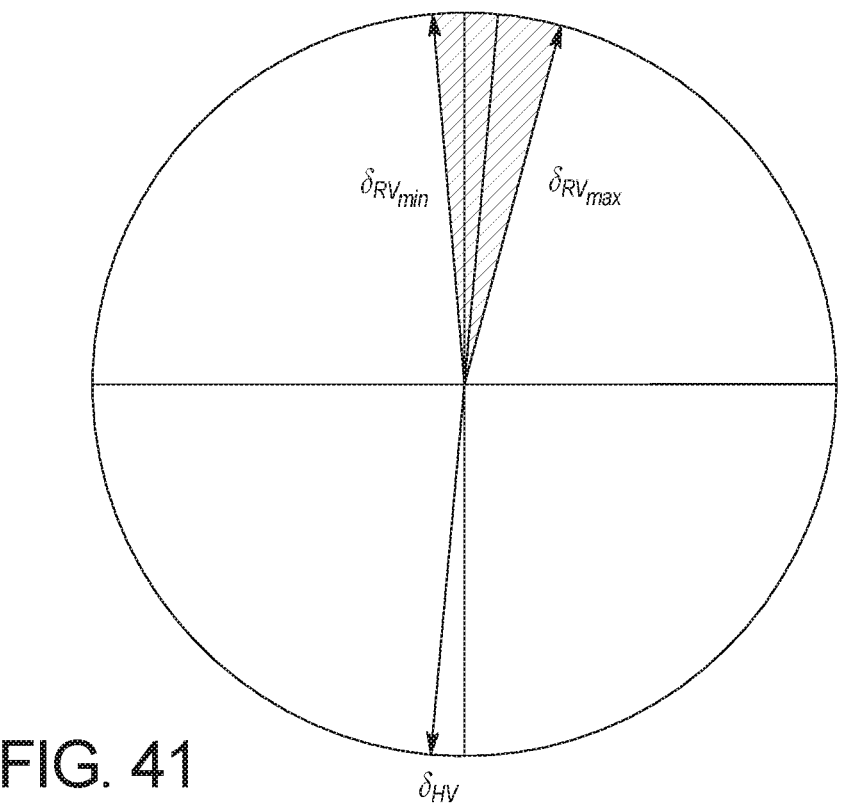
FIG. 41 illustrates the maximum remote vehicle heading angle when the remote vehicle is heading the same direction as the host vehicle.
Figure 42:
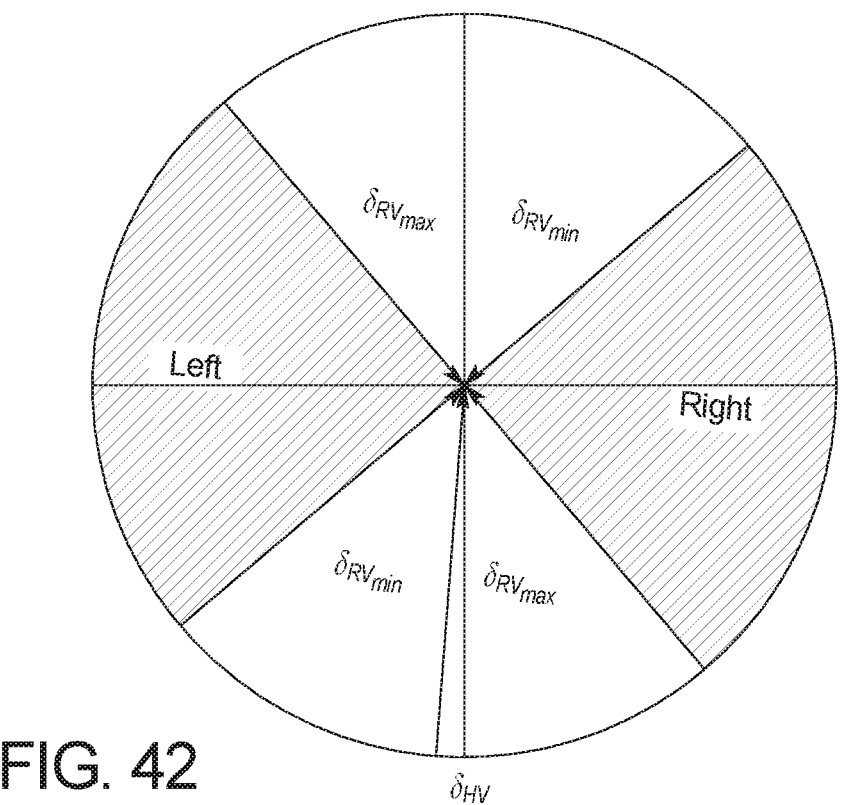
FIG. 42 illustrates a situation in which the remote vehicle is considered to be in a crossing path with the host vehicle.
Figure 43:
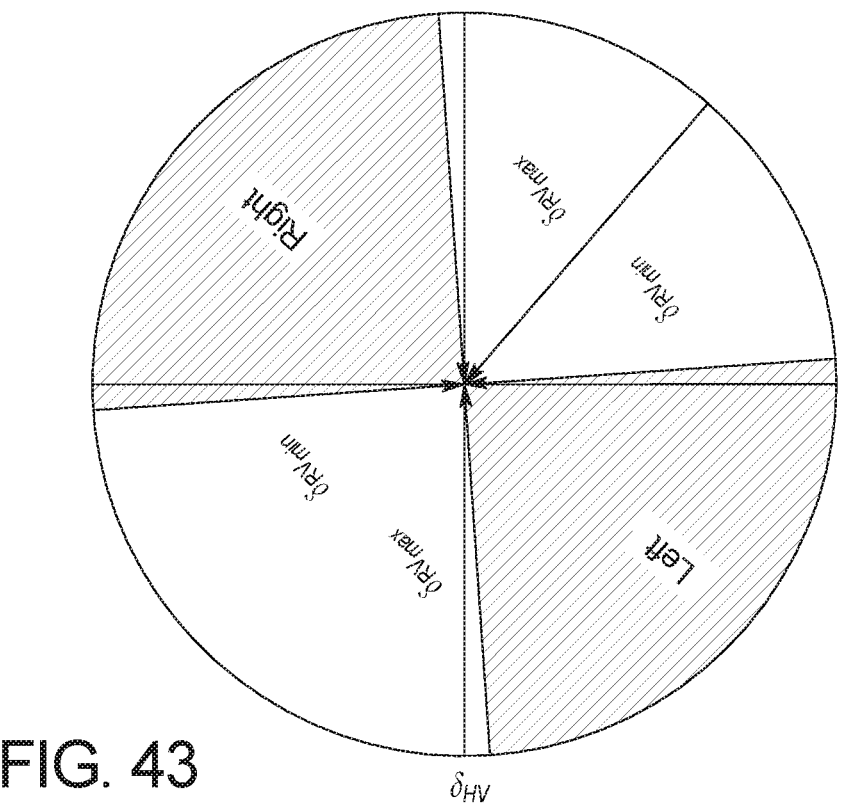
FIG. 43 illustrates a situation in which the remote vehicle is considered to be in a crossing path with the host vehicle.
Figure 44:
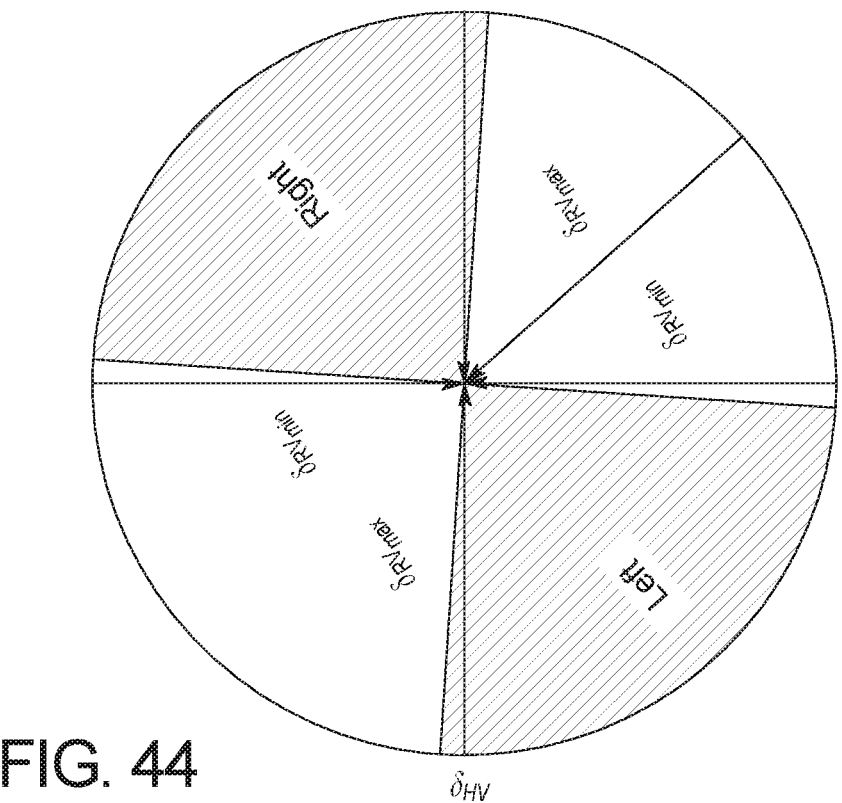
FIG. 44 illustrates a situation in which the remote vehicle is considered to be in a crossing path with the host vehicle.
Figure 45:
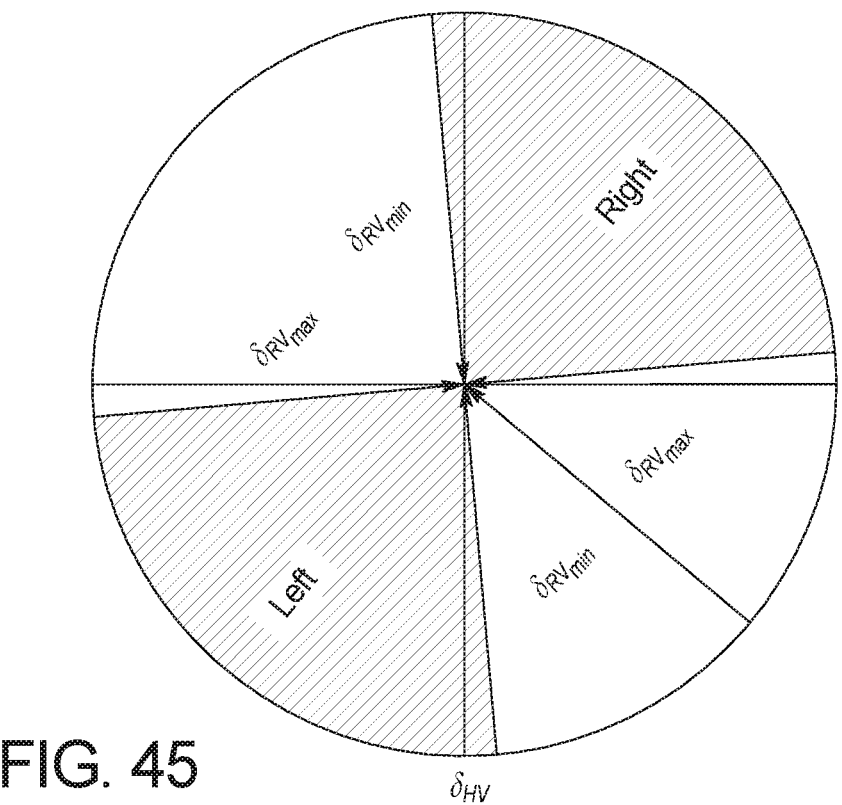
FIG. 45 illustrates a situation in which the remote vehicle is considered to be in a crossing path with the host vehicle.
Figure 46:
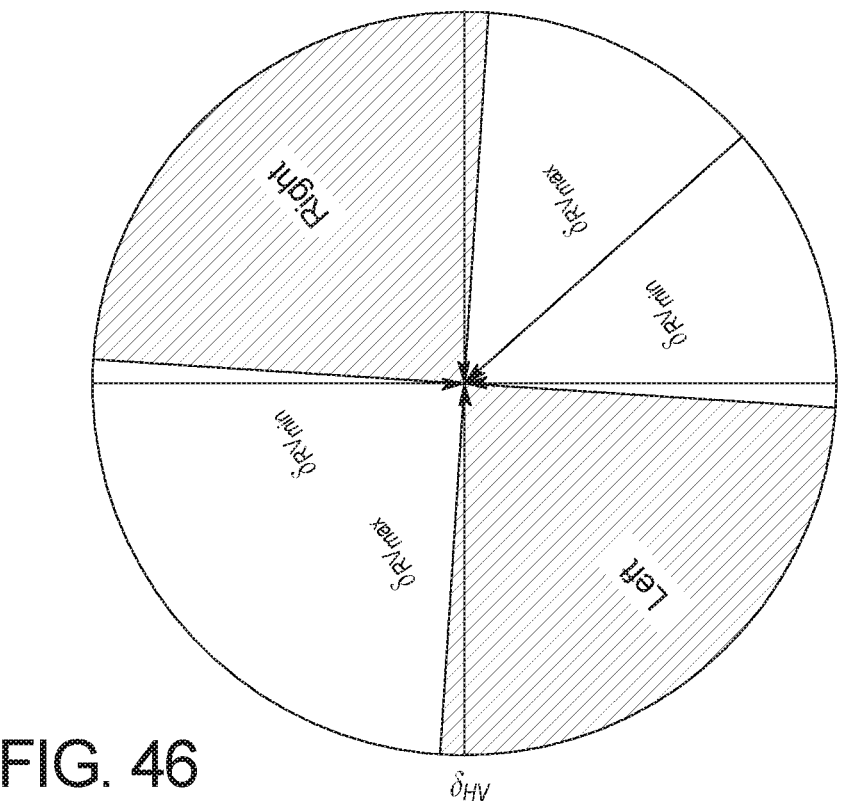
FIG. 46 illustrates a situation in which the remote vehicle is considered to be in a crossing path with the host vehicle.
Figure 47:
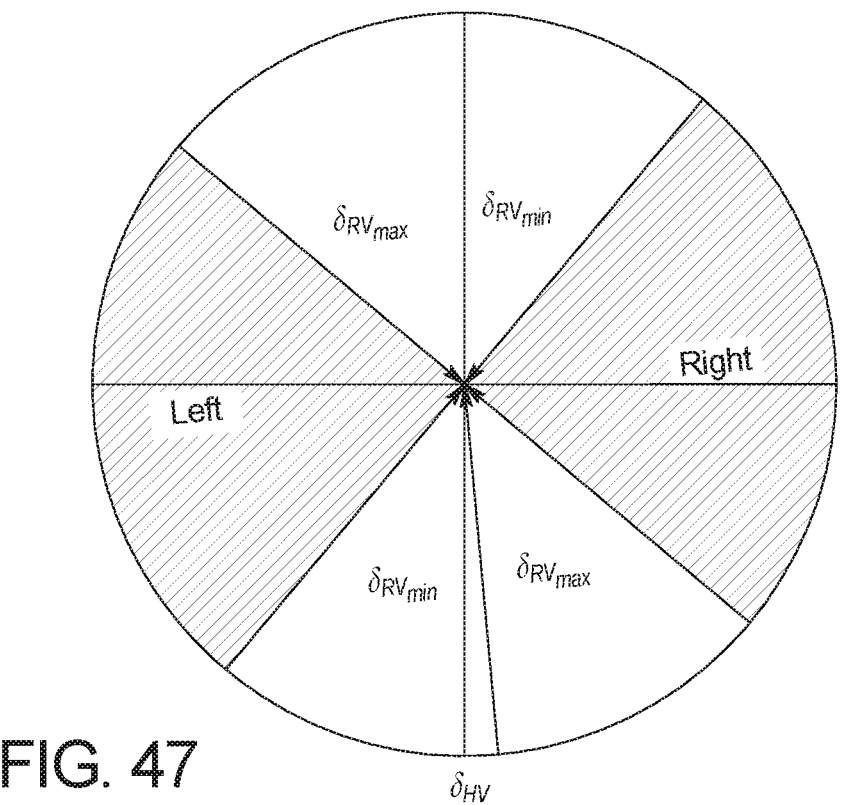
FIG. 47 illustrates a situation in which the remote vehicle is considered to be in a crossing path with the host vehicle.
Figure 48:
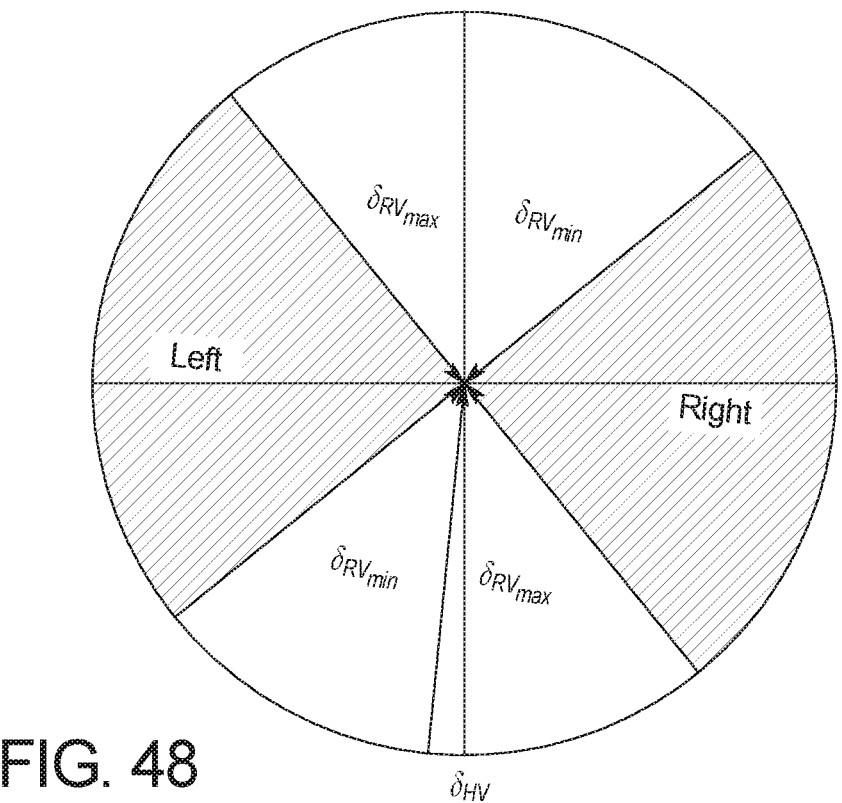
FIG. 48 illustrates a situation in which the remote vehicle is considered to be in a crossing path with the host vehicle.
Figure 49:
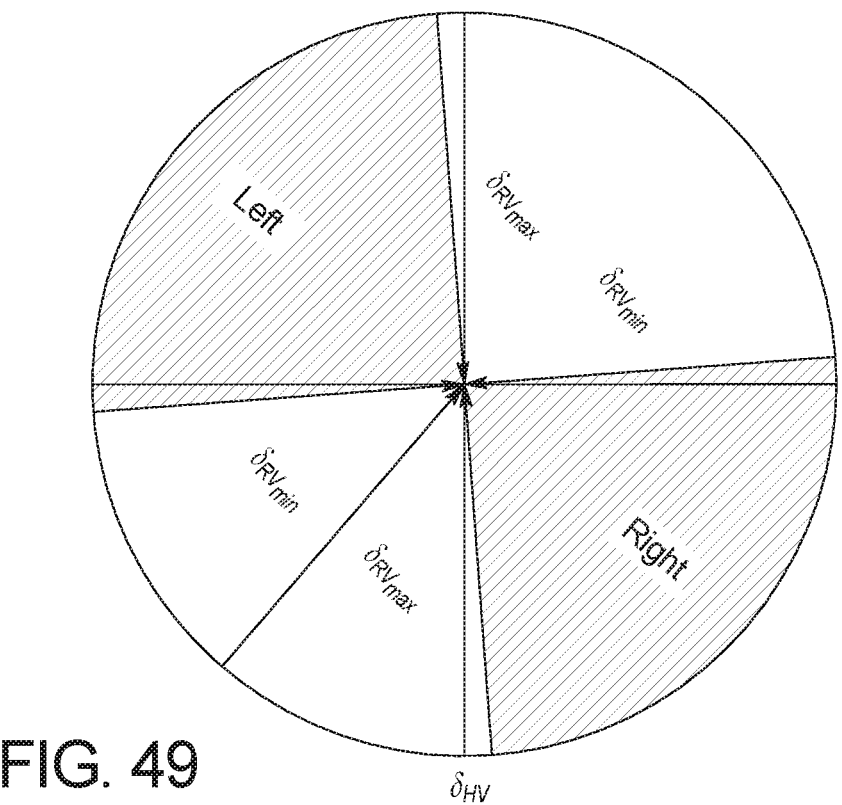
FIG. 49 illustrates a situation in which the remote vehicle is considered to be in a crossing path with the host vehicle.
Figure 50:
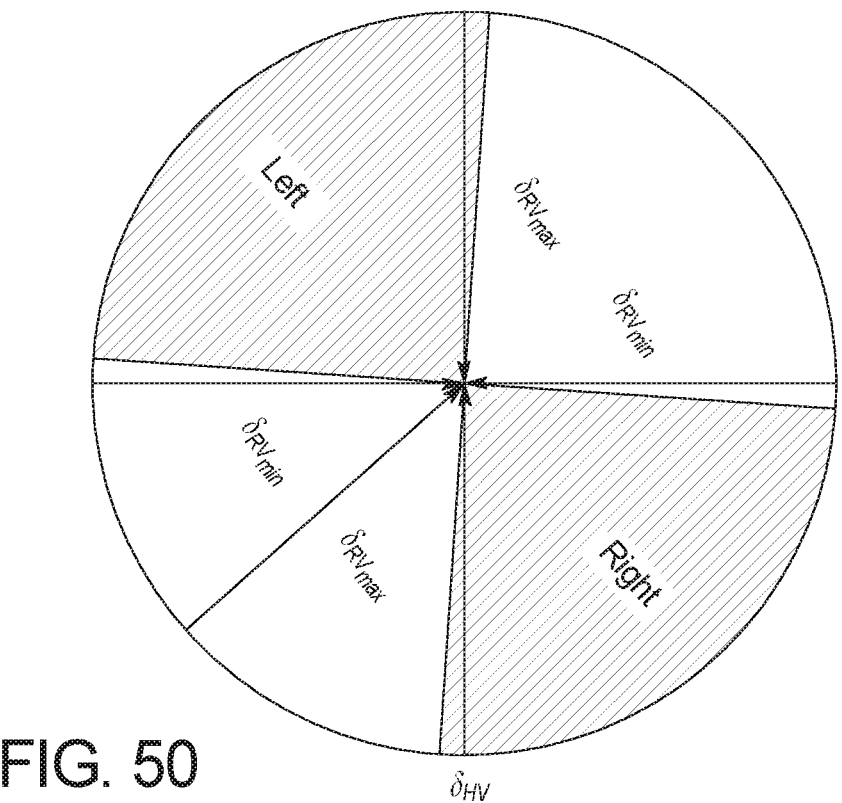
FIG. 50 illustrates a situation in which the remote vehicle is considered to be in a crossing path with the host vehicle.
Figure 51:
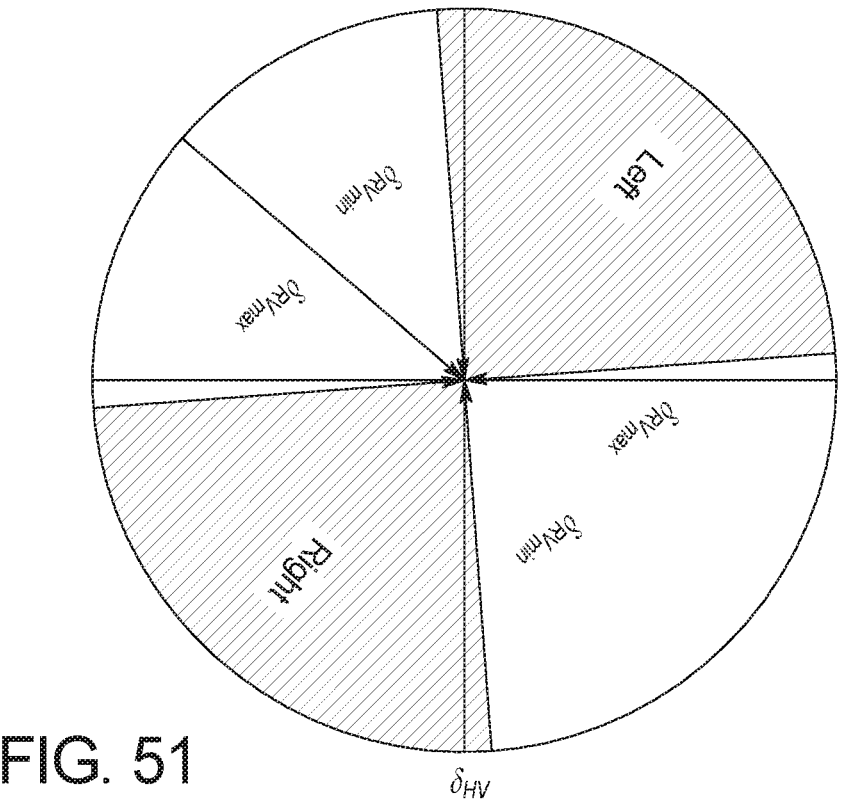
FIG. 51 illustrates a situation in which the remote vehicle is considered to be in a crossing path with the host vehicle.
Figure 52:
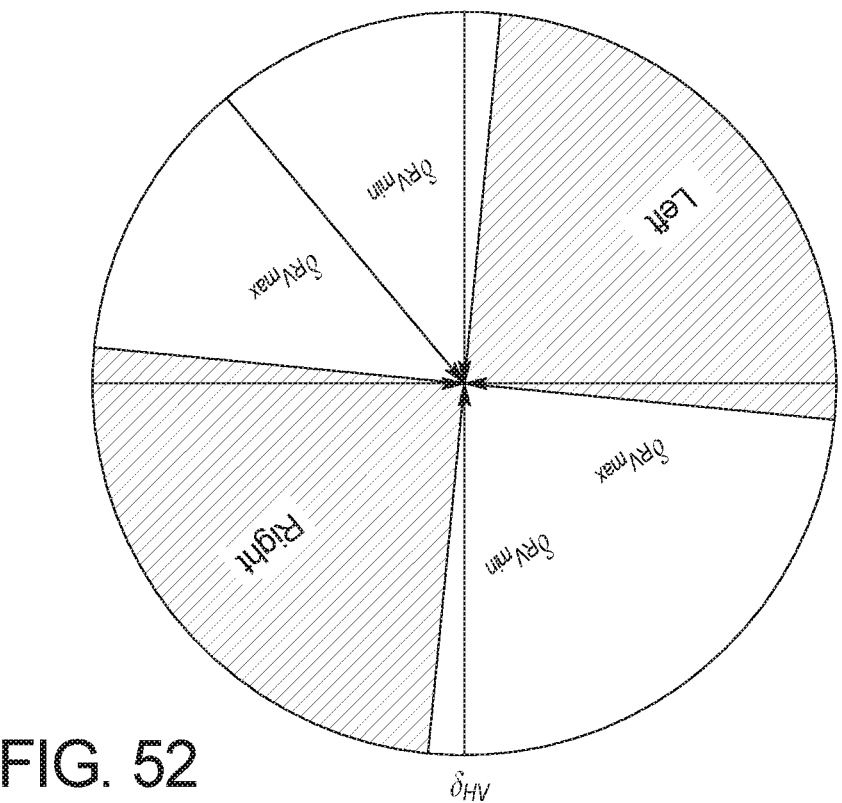
FIG. 52 illustrates a situation in which the remote vehicle is considered to be in a crossing path with the host vehicle.
Figure 53:
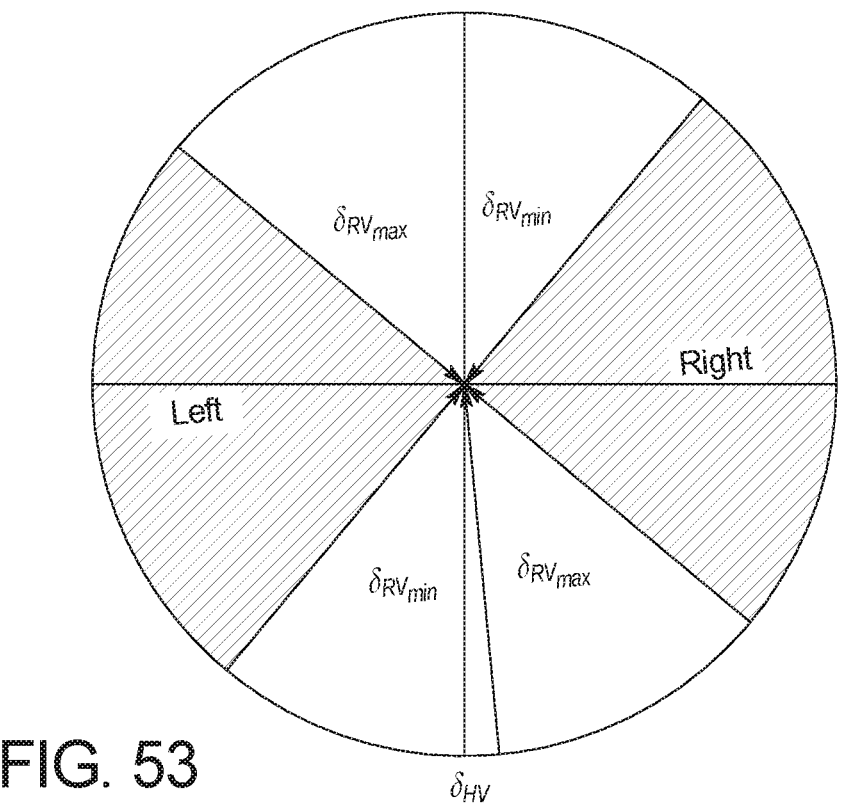
FIG. 53 illustrates a situation in which the remote vehicle is considered to be in a crossing path with the host vehicle.

The remote vehicle 14 is considered to be traveling in the direction opposite of the host vehicle 10 when the heading angle of the remote vehicle 14, $\delta_{RV}$ falls within the range $\delta_{RV_{min}}^{10}$ and $\delta_{RV_{min}}^{10}$ therefore cases exist where the heading angle of the host vehicle 10, $\delta_{HV}$ will be less than $\delta_{RV_{min}}^{10}$ and less than $\delta_{RV_{max}}^{10}$ when $\delta_{HV}$ is less than $\pi$ as shown in FIGS. 36 and 37.
There also exist cases where $\delta_{HV}$ will be greater than $\delta_{RV_{min}}^{10}$ and greater than $\delta_{RV_{max}}^{10}$ when $\delta_{HV}$ is greater than $\pi$ otherwise the remote vehicle 14 will be considered to be traveling in a direction other than the opposite direction of the host vehicle 10 as shown in FIGS. 38 and 39.
However, because of the fixed reference used where North=0°, there are cases where $\delta_{HV}$ will be less than $\delta_{RV_{min}}^{10}$ and greater than $\delta_{RV_{max}}^{10}$ when $\delta_{HV}$ is less than or greater than $\pi$ such as FIGS. 40 and 41.
Consider the following expressions for H$_1$ and H$_2$.

$$H_1 = \delta_{HV} - \delta_{RV_{min}}^{10}$$

$$H_1 = \delta_{HV} - \delta_{RV_{max}}^{10}$$

For any value of $\delta_{HV}$, the values for H$_1$ and H$_2$ fall within three distinct categories:
1: H$_1$ is negative, H$_2$ is negative and H$_1$>H$_2$ ($\delta_{HV} < \delta_{RV_{min}}^{10}$ and $\delta_{HV} < \delta_{RV_{max}}^{10}$)
2: H$_1$ is negative, H$_2$ is positive and H$_1$<H$_2$ ($\delta_{HV} < \delta_{RV_{min}}^{10}$ and $\delta_{HV} > \delta_{RV_{max}}^{10}$)
3: H$_1$ is positive, H$_2$ is positive and H$_1$>H$_2$ ($\delta_{HV} > \delta_{RV_{min}}^{10}$ and $\delta_{HV} > \delta_{RV_{max}}^{10}$)
From these three conditions, it can be shown that for any combination of $\delta_{HV}$ and $\delta_{RV}$, where $0 \leq \delta_{HV} < 2\pi$ and $0 \leq \delta_{RV} < 2\pi$ the following expressions can be used to identify if the host vehicle 10 and remote vehicle 14 are traveling in opposite directions.

$$\Delta_1^{10} = \frac{1}{8}\left[\frac{\delta_{RV} - \delta_{RV_{min}}^{10} + \sigma}{|\delta_{RV} - \delta_{RV_{min}}^{10}| + \sigma} + 1\right] \times$$

$$\left[\frac{\delta_{RV_{max}}^{10} - \delta_{RV} + \sigma}{|\delta_{RV_{max}}^{10} - \delta_{RV}| + \sigma} + 1\right] \times \left[\frac{H_1 - H_2 - \sigma}{|H_1 - H_2| + \sigma} + 1\right]$$

If H$_1$>H$_2$ and $\delta_{RV_{min}}^{10} \leq \delta_{RV} \leq \delta_{RV_{max}}^{10}$, $\Delta_1^{10}=1$ otherwise $\Delta_1^{10}=0$ $$\Delta_2^{10} = \frac{1}{8}\left[\frac{\delta_{RV} - \delta_{RV_{min}}^{10} + \sigma}{|\delta_{RV} - \delta_{RV_{min}}^{10}| + \sigma} + 1\right] \times$$

$$\left[\frac{\delta_{RV} - \delta_{RV_{max}}^{10} + \sigma}{|\delta_{RV} - \delta_{RV_{max}}^{10}| + \sigma} + 1\right] \times \left[1 - \frac{H_1 - H_2 - \sigma}{|H_1 - H_2| + \sigma}\right]$$

If H$_1$<H$_2$, $\delta_{RV_{min}}^{10} \leq \delta_{RV}$ and $\delta_{RV_{max}}^{10} \leq \delta_{RV}$, $\Delta_2^{10}=1$ otherwise $\Delta_2^{10}=0$ $$\Delta_3^{10} = \frac{1}{8}\left[\frac{\delta_{RV_{min}}^{10} - \delta_{RV} + \sigma}{|\delta_{RV_{min}}^{10} - \delta_{RV}| + \sigma} + 1\right] \times$$

-continued $$\left[\frac{\delta_{RV_{max}}^{10} - \delta_{RV} + \sigma}{|\delta_{RV_{max}}^{10} - \delta_{RV}| + \sigma} + 1\right] \times \left[1 - \frac{H_1 - H_2 - \sigma}{|H_1 - H_2| + \sigma}\right]$$

If $H_1 < H_2$, $\delta_{RV} \leq \delta_{RV_{min}}^{10}$ and $\delta_{RV} \leq \delta_{RV_{max}}^{10}$, $\Delta_3^{10} = 1$ otherwise $\Delta_3^{10} = 0$ Also, it is advantageous to define the difference of $H_1$ and $H_2$ as follows:

$$H_1 - H_2 = \delta_{HV} - \delta_{RV_{min}}^{10} - (\delta_{HV} - \delta_{RV_{max}}^{10})$$

$$H_1 - H_2 = \delta_{HV} - \delta_{RV_{min}}^{10} - \delta_{HV} + \delta_{RV_{max}}^{10}$$

$$H_1 - H_2 = \delta_{HV} - \delta_{RV_{min}}^{10} - \delta_{HV} + \delta_{RV_{max}}^{10}$$

$$H_1 - H_2 = \delta_{RV_{max}}^{10} - \delta_{RV_{min}}^{10}$$

Then the previous expressions can be expressed as:

$$\Delta_1^{10} = \frac{1}{8}\left[\frac{\delta_{RV} - \delta_{RV_{min}}^{10} + \sigma}{|\delta_{RV} - \delta_{RV_{min}}^{10}| + \sigma} + 1\right] \times$$

$$\left[\frac{\delta_{RV_{max}}^{10} - \delta_{RV} + \sigma}{|\delta_{RV_{max}}^{10} - \delta_{RV}| + \sigma} + 1\right] \times \left[\frac{\delta_{RV_{max}}^{10} - \delta_{RV_{min}}^{10} - \sigma}{|\delta_{RV_{max}}^{10} - \delta_{RV_{min}}^{10}| + \sigma} + 1\right]$$

$$\Delta_2^{10} = \frac{1}{8}\left[\frac{\delta_{RV} - \delta_{RV_{min}}^{10} + \sigma}{|\delta_{RV} - \delta_{RV_{min}}^{10}| + \sigma} + 1\right] \times$$

$$\left[\frac{\delta_{RV} - \delta_{RV_{max}}^{10} + \sigma}{|\delta_{RV} - \delta_{RV_{max}}^{10}| + \sigma} + 1\right] \times \left[1 - \frac{\delta_{RV_{max}}^{10} - \delta_{RV_{min}}^{10} - \sigma}{|\delta_{RV_{max}}^{10} - \delta_{RV_{min}}^{10}| + \sigma}\right]$$

$$\Delta_3^{10} = \frac{1}{8}\left[\frac{\delta_{RV_{min}}^{10} - \delta_{RV} + \sigma}{|\delta_{RV_{min}}^{10} - \delta_{RV}| + \sigma} + 1\right] \times$$

$$\left[\frac{\delta_{RV_{max}}^{10} - \delta_{RV} + \sigma}{|\delta_{RV_{max}}^{10} - \delta_{RV}| + \sigma} + 1\right] \times \left[1 - \frac{\delta_{RV_{max}}^{10} - \delta_{RV_{min}}^{10} - \sigma}{|\delta_{RV_{max}}^{10} - \delta_{RV_{min}}^{10}| + \sigma}\right]$$

By summing these three expressions, it can be determined that the host vehicle 10 and remote vehicle 14 are approaching each other from opposite directions if:

$$\sum_{i=1}^{3} \Delta_i^{10} = 1 \ (RQ = 10)$$

Thus:

$$r_2 = \sum_{i=1}^{3} \Delta_i^{10} \times 1$$

$$q_2 = \sum_{i=1}^{3} \Delta_i^{10} \times 0$$

host vehicle 10 and remote vehicle 14 approaching from crossing directions (RQ=11) When the remote vehicle 14 and host vehicle 10 approach each other from directions that result in a crossing path, the remote vehicle 14 heading angle, $\delta_{RV}$ can be defined as a function of host vehicle 10 heading angle, $\delta_{HV}$ according to the following expressions. Since a crossing path can occur if the remote vehicle 14 approaches from the left or right, a total of four angles must be defined; minimum and maximum angles for the left and minimum and maximum angle for the right. If $\delta_{RV}$ falls within the two ranges, a crossing path exists.

Remote vehicle 14 Heading angle as a function of Host vehicle 10 heading angle for the case of vehicles crossing paths can be defined as follows:

Minimum Remote Vehicle Heading Angle $$\delta_{RV_{minL}}^{11} = \frac{1}{4}\left[\frac{\delta_{HV} - 0 + \sigma}{|\delta_{HV} - 0| + \sigma} + 1\right] \times \left[\frac{\varphi_6 - \delta_{HV} - \sigma}{|\varphi_6 - \delta_{HV}| + \sigma} + 1\right] \times (\delta_{HV} + \varphi_3) +$$

$$\frac{1}{4}\left[\frac{\delta_{HV} - \varphi_6 + \sigma}{|\delta_{HV} - \varphi_6| + \sigma}\right] \times \left[\frac{2\pi - \delta_{HV} - \sigma}{|2\pi - \delta_{HV}| + \sigma} + 1\right] \times (\delta_{HV} - \varphi_6)$$

$$\delta_{RV_{minR}}^{11} = \frac{1}{4}\left[\frac{\delta_{HV} - 0 + \sigma}{|\delta_{HV} - 0| + \sigma} + 1\right] \times \left[\frac{\varphi_4 - \delta_{HV} - \sigma}{|\varphi_4 - \delta_{HV}| + \sigma} + 1\right] \times (\delta_{HV} + \varphi_5) +$$

$$\frac{1}{4}\left[\frac{\delta_{HV} - \varphi_4 + \sigma}{|\delta_{HV} - \varphi_4| + \sigma}\right] \times \left[\frac{2\pi - \delta_{HV} - \sigma}{|2\pi - \delta_{HV}| + \sigma} + 1\right] \times (\delta_{HV} - \varphi_4)$$

Maximum Remote Vehicle Heading Angle $$\delta_{RV_{maxL}}^{11} = \frac{1}{4}\left[\frac{\delta_{HV} - 0 + \sigma}{|\delta_{HV} - 0| + \sigma} + 1\right] \times \left[\frac{\varphi_5 - \delta_{HV} - \sigma}{|\varphi_5 - \delta_{HV}| + \sigma} + 1\right] \times (\delta_{HV} + \varphi_4) +$$

$$\frac{1}{4}\left[\frac{\delta_{HV} - \varphi_5 + \sigma}{|\delta_{HV} - \varphi_5| + \sigma}\right] \times \left[\frac{2\pi - \delta_{HV} - \sigma}{|2\pi - \delta_{HV}| + \sigma} + 1\right] \times (\delta_{HV} - \varphi_5)$$

$$\delta_{RV_{maxR}}^{11} = \frac{1}{4}\left[\frac{\delta_{HV} - 0 + \sigma}{|\delta_{HV} - 0| + \sigma} + 1\right] \times \left[\frac{\varphi_3 - \delta_{HV} - \sigma}{|\varphi_3 - \delta_{HV}| + \sigma} + 1\right] \times (\delta_{HV} + \varphi_6) +$$

$$\frac{1}{4}\left[\frac{\delta_{HV} - \varphi_3 + \sigma}{|\delta_{HV} - \varphi_3| + \sigma}\right] \times \left[\frac{2\pi - \delta_{HV} - \sigma}{|2\pi - \delta_{HV}| + \sigma} + 1\right] \times (\delta_{HV} - \varphi_3)$$

Where:

$\varphi_3 = \pi/2 - \varphi_L$ $\varphi_4 = \pi/2 - \varphi_L$ $\varphi_5 = 3\pi/2 - \varphi_R$ $\varphi_6 = 3\pi/2 - \varphi_R$ $\varphi_L$ and $\varphi_R$ are threshold values that defines the angular range in which the remote vehicle 14 is defined to be in a crossing path with the host vehicle 10.

These variables define the minimum and maximum boundaries for the range of $\delta_{RV}$ with respect to $\delta_{HV}$ for crossing paths values of $\delta_{RV}$ that fall outside these ranges are considered to be another condition such as in-path, opposite path or diverging path. The direction, left or right, from which the remote vehicle 14 is approaching is immaterial but a single equation for $\delta_{RV_{min}}^{11}$ and $\delta_{RV_{max}}^{11}$ is desired. This can be achieved by the following two equations:

$$\delta_{RV_{min}}^{11} = \delta_{RV_{minL}}^{11} \times \frac{1}{2}\left[\frac{L_{Q_1} + L_{Q_2} - \sigma}{|L_{Q_1} + L_{Q_2}| + \sigma} + 1\right] +$$

$$\delta_{RV_{minR}}^{11} \times \frac{1}{2}\left[\frac{R_{Q_1} + R_{Q_2} - \sigma}{|R_{Q_1} + R_{Q_2}| + \sigma} + 1\right]$$

$$\delta_{RV_{max}}^{11} = \delta_{RV_{maxL}}^{11} \times \frac{1}{2}\left[\frac{L_{Q_1} + L_{Q_2} - \sigma}{|L_{Q_1} + L_{Q_2}| + \sigma} + 1\right] +$$

$$\delta_{RV_{maxR}}^{11} \times \frac{1}{2}\left[\frac{R_{Q_1} + R_{Q_2} - \sigma}{|R_{Q_1} + R_{Q_2}| + \sigma} + 1\right]$$

Where $$L_{Q_1} = L_{Q_4} = \frac{1}{4}\left[\frac{\delta_{HV} - A_6 + \sigma}{|\delta_{HV} - A_6| + \sigma} + 1\right] \times \left[\frac{A_7 - \delta_{HV} - \sigma}{|A_7 - \delta_{HV}| + \sigma} + 1\right]$$

$$L_{Q_2} = L_{Q_3} = \frac{1}{4}\left[\frac{\delta_{HV} - 0 + \sigma}{|\delta_{HV} - 0| + \sigma} + 1\right] \times \left[\frac{A_{13} - \delta_{HV} - \sigma}{|A_{13} - \delta_{HV}| + \sigma} + 1\right] +$$

-continued $$R_{Q_1} = R_{Q_4} = \frac{1}{4}\left[\frac{\delta_{HV} - A_{16} + \sigma}{|\delta_{HV} - A_{16}| + \sigma} + 1\right] \times \left[\frac{2\pi - \delta_{HV} - \sigma}{|2\pi - \delta_{HV}| + \sigma} + 1\right]$$
$$\frac{1}{4}\left[\frac{\delta_{HV} - 0 + \sigma}{|\delta_{HV} - 0| + \sigma} + 1\right] \times \left[\frac{A_5 - \delta_{HV} - \sigma}{|A_5 - \delta_{HV}| + \sigma} + 1\right] +$$
$$\frac{1}{4}\left[\frac{\delta_{HV} - A_8 + \sigma}{|\delta_{HV} - A_8| + \sigma} + 1\right] \times \left[\frac{2\pi - \delta_{HV} - \sigma}{|2\pi - \delta_{HV}| + \sigma} + 1\right]$$

$$R_{Q_2} = R_{Q_3} = \frac{1}{4}\left[\frac{\delta_{HV} - A_{14} + \sigma}{|\delta_{HV} - A_{14}| + \sigma} + 1\right] \times \left[\frac{A_{15} - \delta_{HV} - \sigma}{|A_{15} - \delta_{HV}| + \sigma} + 1\right]$$

And:

$A_5 = \beta_1 - \varphi_2$ $A_6 = \beta_1 + \varphi_2$ $A_7 = \beta_1 + \pi - \varphi_2$ $A_8 = \beta_1 + \pi + \varphi_2$ $A_{13} = \beta_1 - \pi - \varphi_2$ $A_{14} = \beta_1 - \pi + \varphi_2$ $A_{15} = \beta_1 - \varphi_2$ $A_{16} = \beta_1 + \varphi_2$ The remote vehicle 14 is considered to be in a crossing path with the host vehicle 10 when the heading angle of the remote vehicle 14, $\delta_{RV}$ falls within the range $\delta_{RV_{min}}^{11}$ and $\delta_{RV_{max}}^{11}$ as defined above. When the remote vehicle 14 is approaching from the left, there are three regions that need to be considered:

$$0 \leq \delta_{HV} < 3\pi/2 - \varphi_L \rightarrow \begin{cases} \delta_{HV} < \delta_{RV_{min}}^{11} \\ \delta_{HV} < \delta_{RV_{max}}^{11} \end{cases}$$

$$3\pi/2 - \varphi_L \leq \delta_{HV} < 3\pi/2 + \varphi_L \rightarrow \begin{cases} \delta_{HV} < \delta_{RV_{min}}^{11} \\ \delta_{HV} > \delta_{RV_{max}}^{11} \end{cases}$$

$$3\pi/2 + \varphi_L \leq \delta_{HV} < 2\pi \rightarrow \begin{cases} \delta_{HV} > \delta_{RV_{min}}^{11} \\ \delta_{HV} > \delta_{RV_{max}}^{11} \end{cases}$$

These regions are illustrated in FIGS. 42-47.

Similarly, when the remote vehicle 14 is approaching from the right, there are three regions that need to be considered:

$$0 \leq \delta_{HV} < \pi/2 - \varphi_R \rightarrow \begin{cases} \delta_{HV} < \delta_{RV_{min}}^{11} \\ \delta_{HV} < \delta_{RV_{max}}^{11} \end{cases}$$

$$\pi/2 - \varphi_R \leq \delta_{HV} < \pi/2 + \varphi_R \rightarrow \begin{cases} \delta_{HV} < \delta_{RV_{min}}^{11} \\ \delta_{HV} > \delta_{RV_{max}}^{11} \end{cases}$$

$$\pi/2 + \varphi_R \leq \delta_{HV} < 2\pi \rightarrow \begin{cases} \delta_{HV} > \delta_{RV_{min}}^{11} \\ \delta_{HV} > \delta_{RV_{max}}^{11} \end{cases}$$

These regions are illustrated in FIGS. 48-53.

Consider the following expressions for $H_1$ and $H_2$.

$H_1 = \delta_{HV} - \delta_{RV_{min}}^{11}$ $H_2 = \delta_{HV} - \delta_{RV_{max}}^{11}$ For any value of $\delta_{HV}$, the values for $H_1$ and $H_2$ fall within three distinct categories:

1: $H_1$ is negative, $H_2$ is negative and $H_1 > H_2$
2: $H_1$ is negative, $H_2$ is positive and $H_1 < H_2$
3: $H_1$ is positive, $H_2$ is positive and $H_1 > H_2$ From these three conditions, it can be shown that for any combination of $\delta_{HV}$ and $\delta_{RV}$, where $0 \leq \delta_{HV} < 2\pi$ and $0 \leq \delta_{RV} < 2\pi$ the following expressions can be used to identify if the host vehicle 10 and remote vehicle 14 are crossing paths.

$$\Delta_1^{11} = \frac{1}{8}\left[\frac{\delta_{RV} - \delta_{RV_{min}}^{11} + \sigma}{|\delta_{RV} - \delta_{RV_{min}}^{11}| + \sigma} + 1\right] \times$$
$$\left[\frac{\delta_{RV_{max}}^{11} - \delta_{RV} + \sigma}{|\delta_{RV_{max}}^{11} - \delta_{RV}| + \sigma} + 1\right] \times \left[\frac{H_1 - H_2 - \sigma}{|H_1 - H_2| + \sigma} + 1\right]$$

If $H_1 > H_2$, $\delta_{RV_{min}}^{11} \leq \delta_{RV} < \delta_{RV_{max}}^{11}$, $\Delta_1^{11} = 1$ otherwise $\Delta_1^{11} = 0$ $$\Delta_2^{11} = \frac{1}{8}\left[\frac{\delta_{RV_{min}}^{11} - \delta_{RV} + \sigma}{|\delta_{RV_{min}}^{11} - \delta_{RV}| + \sigma} + 1\right] \times$$
$$\left[\frac{\delta_{RV_{max}}^{11} - \delta_{RV} + \sigma}{|\delta_{RV_{max}}^{11} - \delta_{RV}| + \sigma} + 1\right] \times \left[1 - \frac{H_1 - H_2 + \sigma}{|H_1 - H_2| + \sigma}\right]$$

If $H_1 < H_2$, $\delta_{RV_{min}}^{11} \leq \delta_{RV}$ and $\delta_{RV_{max}}^{11} \leq \delta_{RV}$, $\Delta_2^{11} = 1$ otherwise $\Delta_2^{11} = 0$ $$\Delta_3^{11} = \frac{1}{8}\left[\frac{\delta_{RV} - \delta_{RV_{min}}^{11} + \sigma}{|\delta_{RV} - \delta_{RV_{min}}^{11}| + \sigma} + 1\right] \times$$
$$\left[\frac{\delta_{RV} - \delta_{RV_{max}}^{11} + \sigma}{|\delta_{RV} - \delta_{RV_{max}}^{11}| + \sigma} + 1\right] \times \left[1 - \frac{H_1 - H_2 + \sigma}{|H_1 - H_2| + \sigma}\right]$$

If $H_1 < H_2$, $\delta_{RV_{min}}^{11} \leq \delta_{RV}$ and $\delta_{RV_{max}}^{11} \leq \delta_{RV}$, $\Delta_3^{11} = 1$ otherwise $\Delta_3^{11} = 0$ Also, it is advantageous to define the difference of $H_1$ and $H_2$ as follows:

$H_1 - H_2 = \delta_{HV} - \delta_{RV_{min}}^{11} - (\delta_{HV} - \delta_{RV_{max}}^{11})$ $H_1 - H_2 = \delta_{HV} - \delta_{RV_{min}}^{11} - \delta_{HV} + \delta_{RV_{max}}^{11}$ $H_1 - H_2 = \delta_{HV} - \delta_{RV_{min}}^{11} - \delta_{HV} + \delta_{RV_{max}}^{11}$ $H_1 - H_2 = \delta_{HV} - \delta_{RV_{min}}^{11}$ Then the expressions above can be expressed as:

$$\Delta_1^{11} = \frac{1}{8}\left[\frac{\delta_{RV} - \delta_{RV_{min}}^{11} + \sigma}{|\delta_{RV} - \delta_{RV_{min}}^{11}| + \sigma} + 1\right] \times$$
$$\left[\frac{\delta_{RV_{max}}^{11} - \delta_{RV} + \sigma}{|\delta_{RV_{max}}^{11} - \delta_{RV}| + \sigma} + 1\right] \times \left[\frac{\delta_{RV_{max}}^{11} - \delta_{RV_{min}}^{11} - \sigma}{|\delta_{RV_{max}}^{11} - \delta_{RV_{min}}^{11}| + \sigma} + 1\right]$$

$$\Delta_2^{11} = \frac{1}{8}\left[\frac{\delta_{RV_{min}}^{11} - \delta_{RV} + \sigma}{|\delta_{RV_{min}}^{11} - \delta_{RV}| + \sigma} + 1\right] \times$$
$$\left[\frac{\delta_{RV_{max}}^{11} - \delta_{RV} + \sigma}{|\delta_{RV_{max}}^{11} - \delta_{RV}| + \sigma} + 1\right] \times \left[1 - \frac{\delta_{RV_{max}}^{11} - \delta_{RV_{min}}^{11} + \sigma}{|\delta_{RV_{max}}^{11} - \delta_{RV_{min}}^{11}| + \sigma}\right]$$

-continued $$\Delta_3^{11} = \frac{1}{8}\left[\frac{\delta_{RV} - \delta_{RV_{min}}^{11} + \sigma}{|\delta_{RV} - \delta_{RV_{min}}^{11}| + \sigma} + 1\right] \times$$

$$\left[\frac{\delta_{RV} - \delta_{RV_{max}}^{11} + \sigma}{|\delta_{RV} - \delta_{RV_{max}}^{11}| + \sigma} + 1\right] \times \left[1 - \frac{\delta_{RV_{max}}^{11} - \delta_{RV_{min}}^{11} + \sigma}{|\delta_{RV_{max}}^{11} - \delta_{RV_{min}}^{11}| + \sigma}\right]$$

By summing these three expressions, it can be determined that the host vehicle 10 and remote vehicle 14 are crossing paths if $$\sum_{i=1}^{3} \Delta_i^{11} = 1 \ (RQ = 11)$$

Thus:

$$r_3 = \sum_{i=1}^{3} \Delta_i^{11} \times 1$$

$$q_3 = \sum_{i=1}^{3} \Delta_i^{11} \times 1$$

Finally:

$$R = \sum_{i=1}^{3} r_i$$

$$Q = \sum_{i=1}^{3} q_i$$

If R=Q=0 the paths of the remote vehicle 14 and host vehicle 10 are considered to be diverging away from each other.

Figure 54:
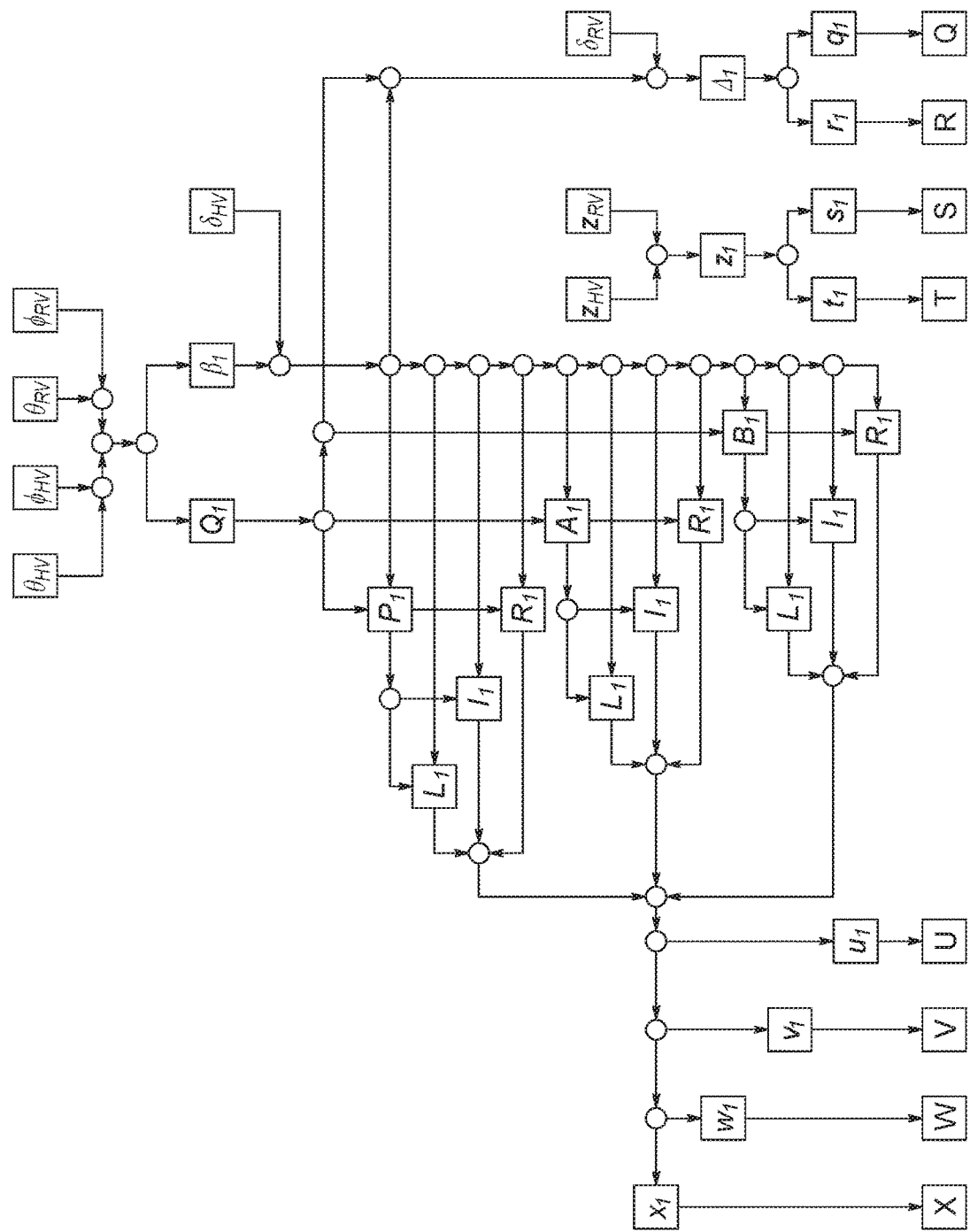
FIG. 54 illustrates source data and equation interdependencies.

FIG. 54 identifies the interdependencies of the source data and expressions that are used to determine the values of the digits X through Q.

Thus, as can be understood, the controller 24, determines whether the host vehicle 10 is traveling along a two-lane road 44 at a certain speed and direction, as described herein. The controller 24 can obtain this information in any manner suitable. For example, the controller 24 can determine the host vehicle 10 is traveling along a two-lane road at a certain speed and direction based on information from the sensor system (sensors 26a-26d), based on stored map data, in the data storage 34 based on determination of location within a specific jurisdiction or in any suitable manner or combination of processes described herein. The controller 24 can then determine the jurisdiction, as described herein. Once the jurisdiction is determined, the controller 24 can determine whether any jurisdictional rules or laws exist that require the host vehicle 10 to pull over to enable remote vehicles 14 to pass. Such jurisdictional information can be saved in data storage 34 within the system 12. Alternatively, the system 12 may request from the cloud or the external server 22 information regarding the jurisdictional rules or laws exist. This information can be transmitted and received via the receiver/transmitter system 36.

The controller 24 can then determine the number of remote vehicles 14 following the host vehicle 10. This determination can be established by calculation, as described herein, by detection vis the sensor system, or any manner or combination of manners desired. Generally, the controller 24 can compare the known speed and direction of travel of the host vehicle 10 with the known speeds and directions of the plurality of host vehicles 14 to determine if a mitigation operation is required or desired.

Figure 55:
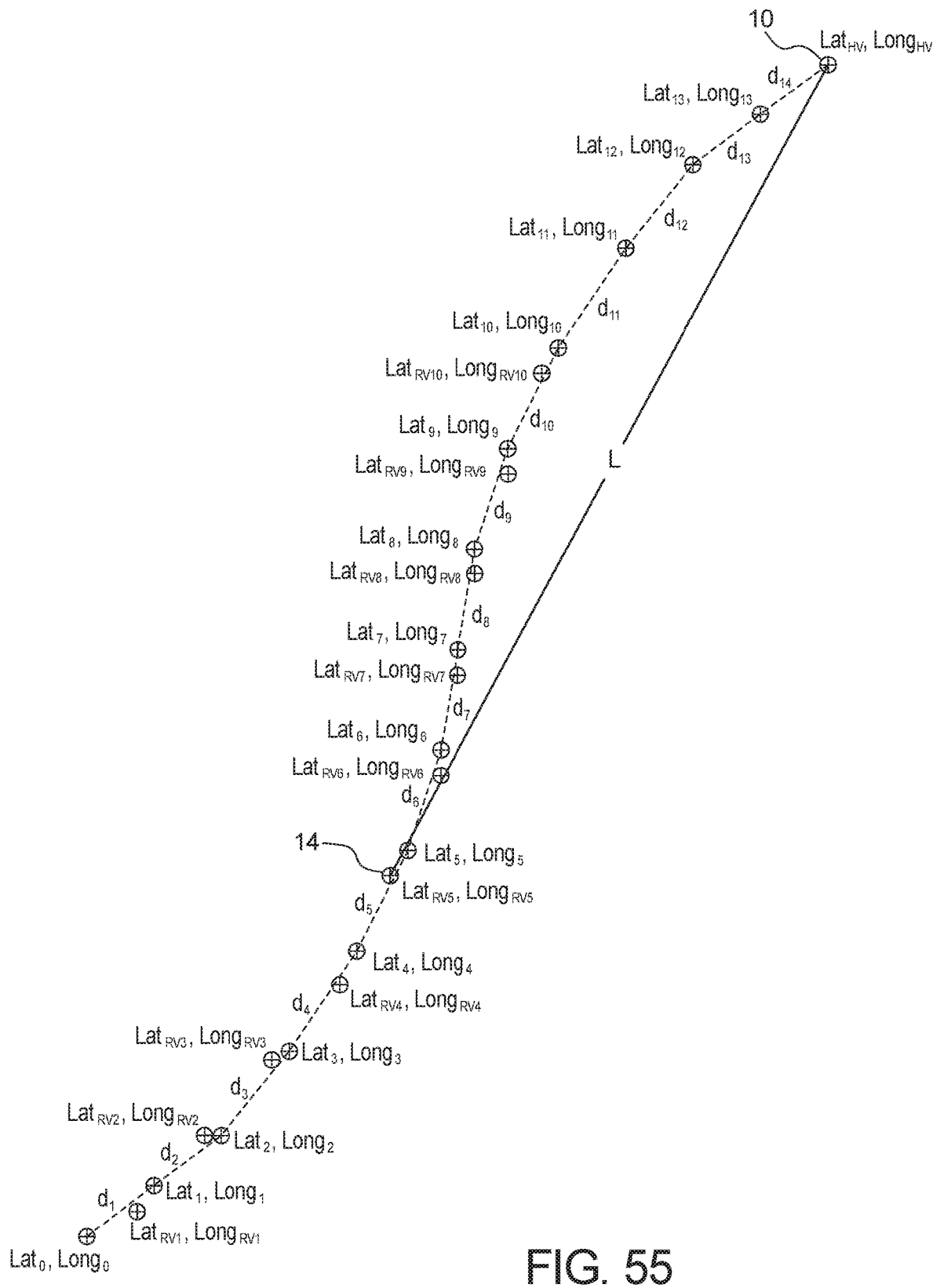
FIG. 55 illustrates a possible erroneous distance calculation.

In some embodiments, as shown in FIG. 55, in determining the number of remote vehicles 14 following the host vehicle 10, the host vehicle 10 records instantaneous GPS location periodically and stores a number of locations (for example fifteen consecutive latitude, longitude and elevation locations), storing the newest location while discarding the oldest location. The position of the host vehicle 10 is shown as $Lat_{HV}$, $Long_{HV}$, the transmitted position of the remote vehicle is shown as $Lat_{RV1}$, $Long_{RV1}$ through $Lat_{RV10}$, $Long_{RV10}$ and the stored a number of locations are shown as $Lat_0$, $Long_0$ through $Lat_{13}$, $Long_{13}$, and are separated by $d_1$ through $d_{13}$. Moreover, the transmitted positions of the In this embodiment, a remote vehicle 14 can be present and can be equipped with communication equipment that broadcasts information about the remote vehicle 14 that includes speed, acceleration, heading and GPS location.

The host vehicle 10 is capable of receiving the messages broadcast from the remote vehicle 14 via the receiver/transmitter system 36. The host vehicle 10 can determine the distance L (D) between host vehicle 10 and remote vehicle 14 by using the following expression $$D = (1-f)r_e\sqrt{\frac{(\theta_{RV} - \theta_{HV})^2 \cos^2\phi_{HV} + (\phi_{RV} - \phi_{HV})^2}{\sin^2\phi_{HV} + (1-f)^2\cos^2\phi_{HV}}}$$

Where:
D=the instantaneous distance between host vehicle 10 and remote vehicle 14
f=1/298.257223563 (earth flattening)
$r_e$=6,378,137 m (earth equatorial radius)
$\theta_{HV}$=host vehicle 10 longitude
$\varphi_{HV}$=host vehicle 10 latitude
$\theta_{RV}$=remote vehicle 14 longitude
$\varphi_{RV}$=remote vehicle 14 latitude However, doing so may result in an erroneous distance calculation as shown in FIG. 55, since a straight line calculation is made. As shown in FIG. 55, the distance L is much shorter than the distance according to the actual path of the host vehicle 10. In order to calculate a more accurate distance value, the system 12 on board the host vehicle 10 performs specific calculations.

The controller 24 determines the distance between the remote vehicle 14 location and the next closest stored GPS location ahead of the remote vehicle 14. In FIG. 55, the closest stored GPS location to the actual position of the remote vehicle 14, in this example is $Lat_{RV5}$, $Long_{RV5}$, would be $lat_5$, $long_5$. The controller 24 on board the host vehicle 10 calculates the distance between $lat_{RV}$, $long_{RV}$ (i.e., $lat_{RV5}$, $long_{RV5}$) and $lat_5$, $long_5$ by using the expression for D:

$$D = (1-f)r_e\sqrt{\frac{(\theta_5 - \theta_{RV})^2 \cos^2\phi_{RV} + (\phi_5 - \phi_{RV})^2}{\sin^2\phi_{RV} + (1-f)^2\cos^2\phi_{RV}}}$$

The controller 24 on board the host vehicle 10 then calculates the distances between each successive stored location and sums the distances to obtain actual distance between host vehicle 10 and remote vehicle 14.

$$D_{RV} = (1-f)r_e \sqrt{\frac{(\theta_5 - \theta_{RV})^2 \cos^2\phi_{RV} + (\phi_5 - \phi_{RV})^2}{\sin^2\phi_{RV} + (1-f)^2 \cos^2\phi_{RV}}} + \sum_{i=6}^{14} D_i$$

Where $$D_i = (1-f)r_e \sqrt{\frac{(\theta_i - \theta_{i-1})^2 \cos^2\phi_i + (\phi_i - \phi_{i-1})^2}{\sin^2\phi_{i-1} + (1-f)^2 \cos^2\phi_{i-1}}} + \sum_{i=6}^{14} D_i$$

The controller 24 on board the host vehicle 10 then determines the remote vehicle's 14 proximity, $T_{RV}$ (in seconds), to the host vehicle 10 by dividing $D_{RV}$ by host vehicle 10 speed, $v_{HV}$.

$$T_{RV} = \frac{D_{RV}}{v_{HV}}$$

The controller 24 on board the host vehicle 10 monitors $T_{RV}$ to determine if it changes over time. If the value remains constant, the system on board the host vehicle 10 determines the remote vehicle 14 is following the host vehicle 10 and is added to a vehicle count, $C_{vehicle}$.

If all remote vehicles 14 were equipped, this procedure could be used to determine the number of remote vehicles 14 following the host vehicle 10. However, in some situations not all remote vehicles 14 will be equipped, therefore a method is needed to determine if vehicles not equipped with communication equipment are also following the host vehicle 10. This can be done to as follows.

The controller 24 on board the host vehicle 10 determines the value of $T_{RV}$ is some multiple of a predetermined threshold value defined in the system 12, such as 2 seconds. Such a value can be predetermined and programmed into the system or can be calculated based on host vehicle speed and other factors. If the multiple is 2, the controller 24 on board the host vehicle 10 assumes there is one unequipped vehicle between the host vehicle 10 and remote vehicle 14. If the multiple is 3, the system on board the host vehicle 10 assumes there are two unequipped vehicles between the host vehicle 10 and remote vehicle 14 and so on.

Accordingly, as can be understood, preferably in this embodiment, at least one remote vehicle 14 is equipped with communication equipment that broadcasts vehicle information or the controller 24 of the host vehicle 10 is aware of the position and location of at least one remote vehicle 14. Such a determination of position can be accomplished in any suitable manner, e.g. using the sensor system (sensors 26a-26d). In the case of multiple remote vehicles 14 following the host vehicle 10, the host vehicle 10 can determine, the number of following remote vehicles 14 by successively evaluating the $T_{RV}$ for each equipped vehicle or known remote vehicle location. For example: $T_{RV1}$=2, $T_{RV2}$=9.5 and remain constant over time. Under these conditions, the controller 24 on board the host vehicle 10 determines that $RV_1$ is behind the host vehicle 10 and $RV_2$ may be the fifth vehicle behind the host vehicle 10 because the factor, F, for $T_{RV2}$ is 4.75 (9.5 divided by 2 seconds) thus the controller 24 on board the host vehicle 10 will advise the driver to check the rearview mirrors because there may be a sufficient number of vehicles following the host vehicle 10 that warrant pulling over, when safe to do so, to allow the remote vehicles 14 to pass.

Thus, by monitoring proximity, $T_{RV}$, of equipped remote vehicles 14, the controller 24 on board the host vehicle 10 is capable, to some extent, of providing advisories to the driver of the host vehicle 10 even though not all remote vehicles 14 may be equipped. For example, using this procedure, the controller 34 can determine a distance/time between the host vehicle 10 and a remote vehicle 14 of the predetermined number of the plurality of remote vehicles. Based on the $T_{RV}$ of this remote vehicle, the controller 24 can determine that the jurisdictional predetermined number of following vehicles is present. Here, the controller 24 estimates the number of remote vehicles 14 based on the distance/time between the remote vehicle 14 and the host vehicle 10. Once the number of remote vehicles is estimated to be at the jurisdictional limit, the controller 24 can cause a mitigation operation to be performed when (or only when) the remote vehicle 14 is within a predetermined distance/time of the host vehicle 10. However, it can be understood that the controller 24 can estimate the distance between multiple remote vehicles 14 is the position or two or more remote vehicles 14 is known.

Figure 6:
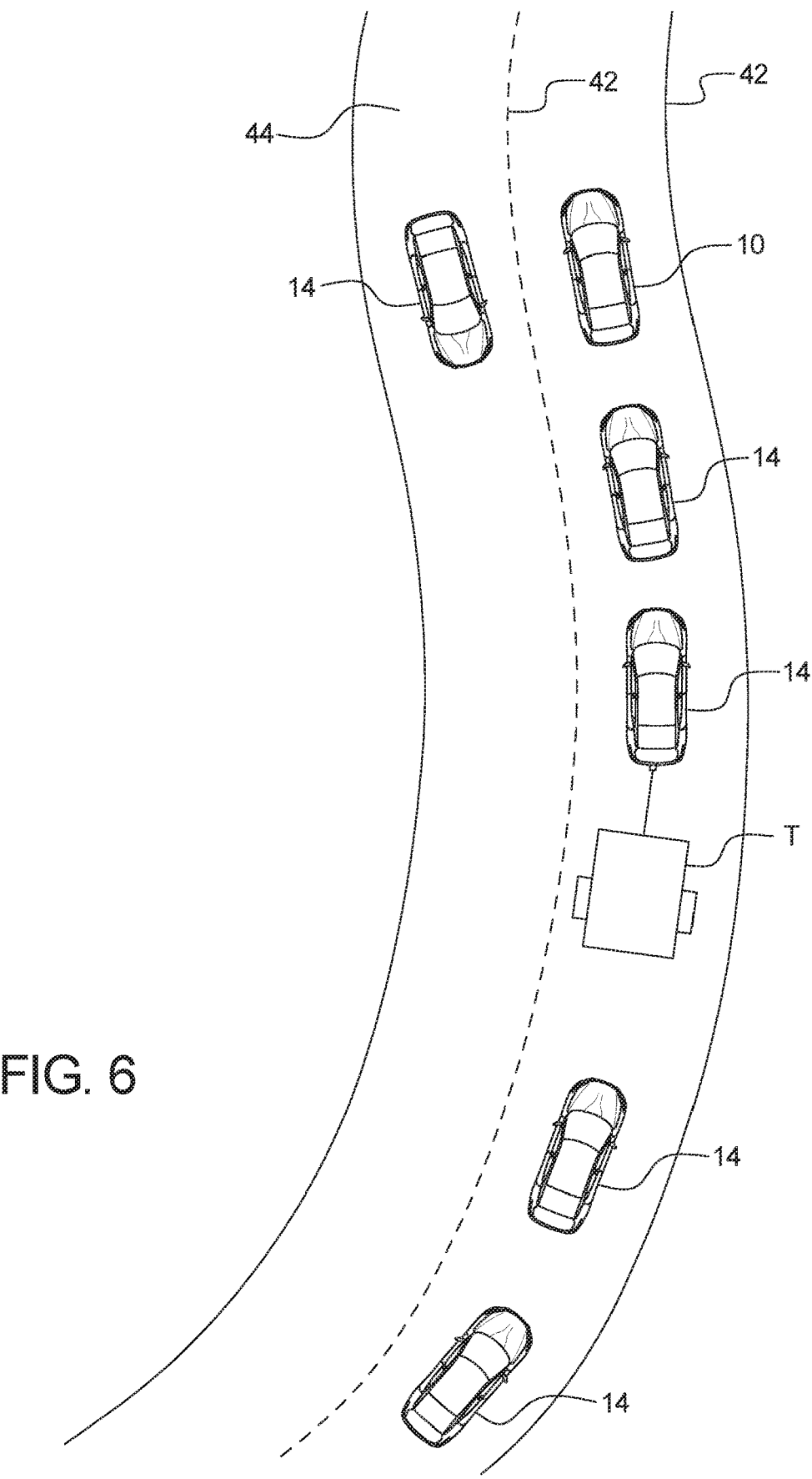
FIG. 6 illustrates the host vehicle including the system for determining the number of remote vehicles following the host vehicle of FIG. 2 traveling along a two-lane road with one of the following vehicles including a trailer.

Moreover, in some situations, as seen in FIG. 6, one or more remote vehicles 14 can be attached to a trailer T. In such a situation, the $T_{RV}$ may not be accurate. Here is remote vehicle 14 can transmit information regarding the trailer T, such that the value of $T_{RV}$ is altered to consider the trailer T. For example, the trailer can be considered to be an additional remote vehicle from a time calculation perspective.

In some situations, the remote vehicle 14 hauling the trailer T may not be equipped with a communication system. In such a situation, the controller 14 of the host vehicle can determine that a remote vehicle is hauling a trailer from another remote vehicle 14 equipped with a communication system or from the sensor system (26a-26d) or in any suitable manner.

Figure 4:
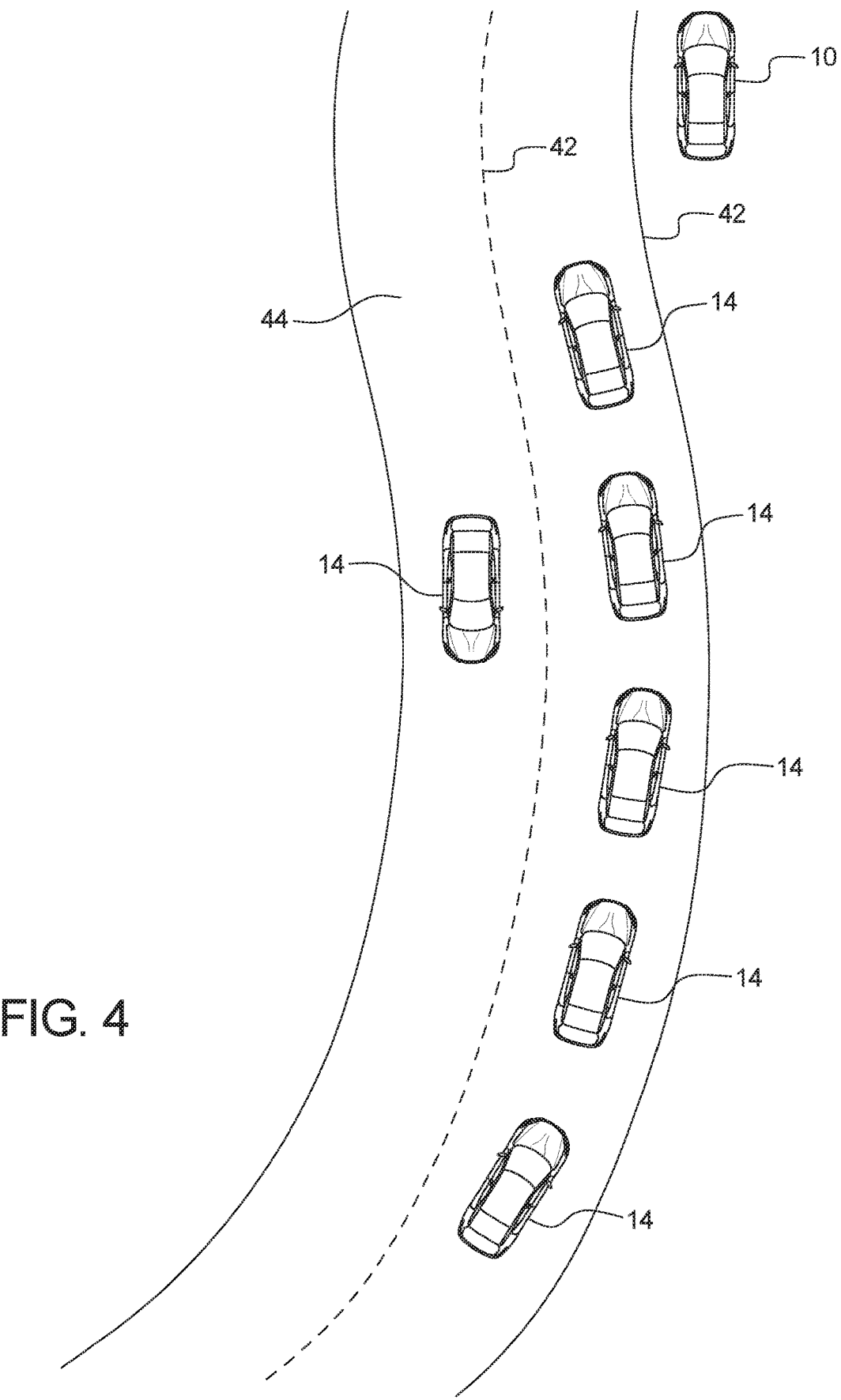
FIG. 4 illustrates the host vehicle including the system for determining the number of remote vehicles following the host vehicle of FIG. 3 with the host vehicle pulling over to enable the following vehicles to pass.
Figure 5:
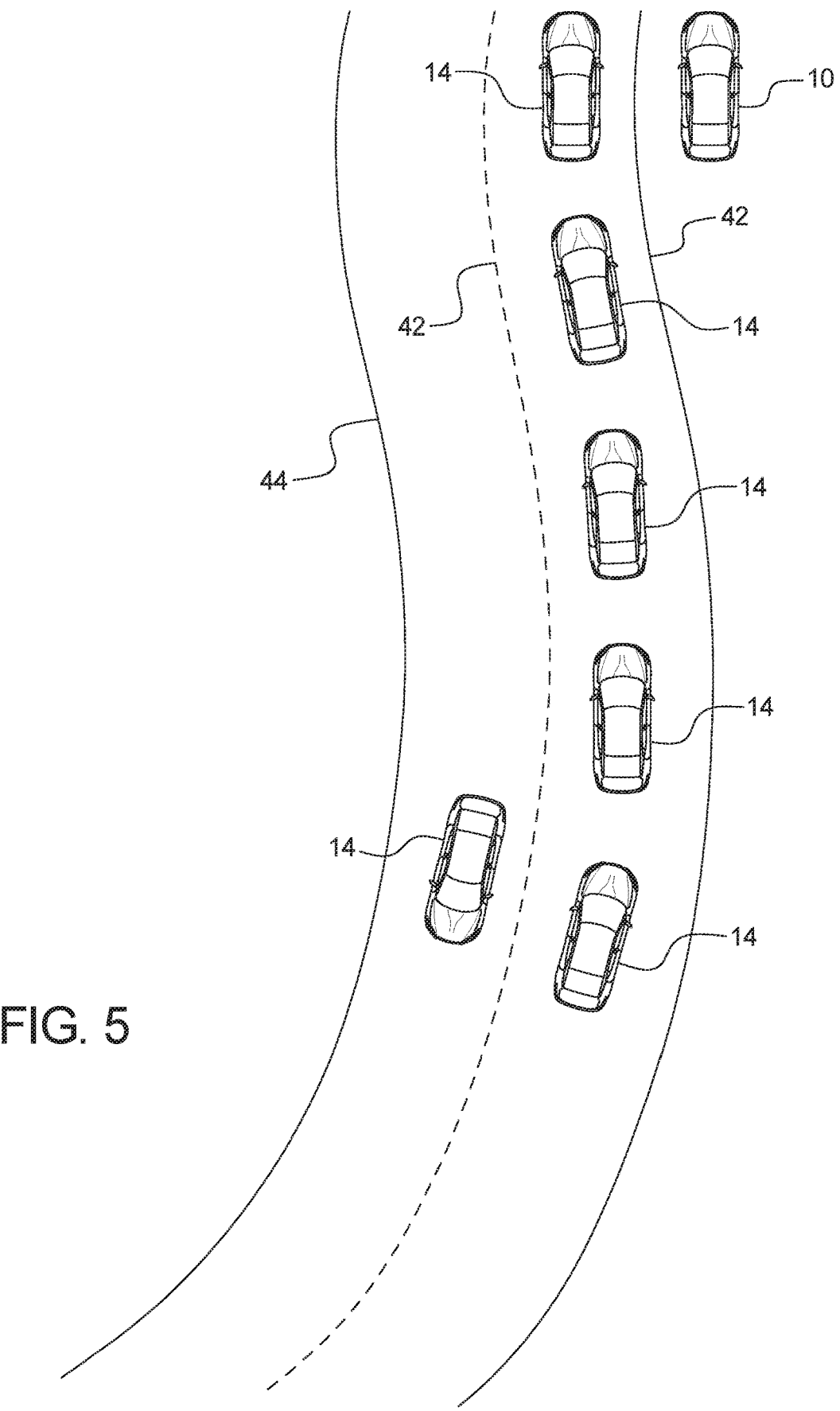
FIG. 5 illustrates the host vehicle including the system for determining the number of remote vehicles following the host vehicle of FIG. 4 with the host vehicle pulled over and the following vehicles passing.

As shown in FIGS. 3-5, the system 12 for determining the number of remote vehicles following a host vehicle enables the controller 34 to determine a location and a travel path of the host vehicle 10, and compare the location of the host vehicle 10 with the vehicle location of each of the plurality of remote vehicles 14, compare the travel path of the host vehicle 10 with the vehicle travel path of each of the remote vehicles 14, and cause the host vehicle 10 to perform a mitigation operation when the controller 24 determines that a predetermined number of the plurality of remote vehicles 14 are disposed behind the host vehicle 10, and the travel path of the host vehicle 10 and the vehicle travel path of each of the predetermined number of the plurality of remote vehicles 14 is the same.

The mitigation operation can be a warning from the warning indicator 30 (e.g., a light display, an audible warning, a textual display on the display 40, or any suitable display). The warning can be a tactile vibration from the tactile vibration system 32. As described herein, the tactile vibration can be in the seat, the steering wheel of the host vehicle 10 or in any other suitable device or location. The warning can be a slight movement of the steering wheel in the direction of the area in which the host vehicle 10 is to pull over, or any other suitable indication by the system 12.

In the case of an autonomous vehicles or vehicles with partial autonomy, the controller 24 may cause the host vehicle 10 to pull over to the shoulder and slow down and/or stop to enable the remote vehicles 14 to pass.

Figure 56:
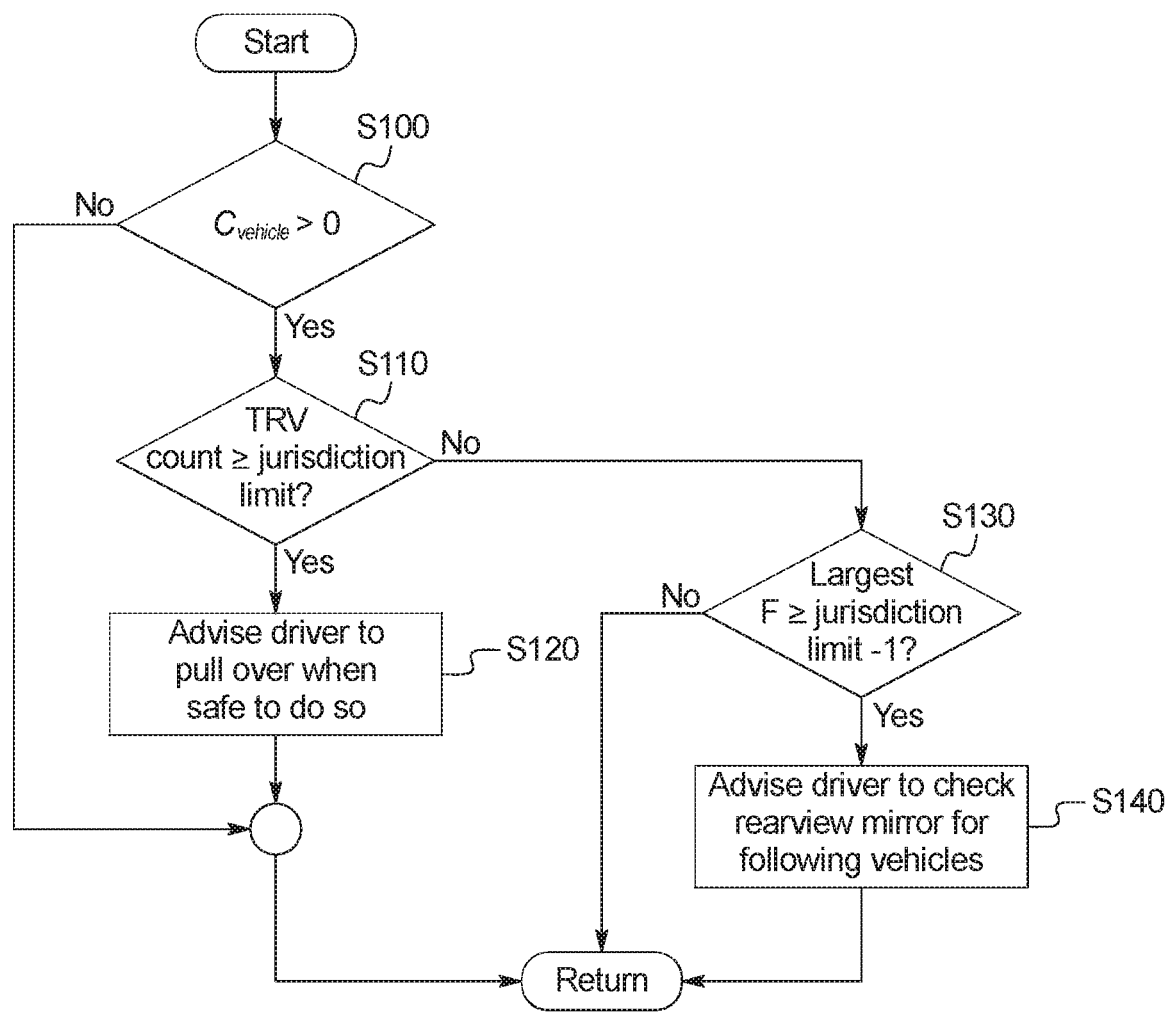
FIG. 56 is flow chart showing the process to determine whether a mitigation operation is necessary.

A logic flow for this function is illustrated in FIG. 56. Specifically, in step S100 the controller 24 determines whether the remote vehicle 14 count $C_{vehicle}$ is greater than zero. If the remote vehicle 14 count $C_{vehicle}$ is not greater than zero the controller 24 returns to start. If the remote vehicle 14 count $C_{vehicle}$ is greater than zero, the controller 24 determines whether the $T_{RV}$ count is greater than or equal to the jurisdiction limit in step S110. If the $T_{RV}$ count is greater than or equal to the jurisdiction limit, the controller 24 performs a mitigation operation (e.g., advises the operator of the vehicle to pull over when safe to do so) is step S120. If the $T_{RV}$ count is less than the jurisdiction limit, the controller 24 determines whether the largest factor F is greater than or equal to the jurisdiction limit minus 1 in step S130. If the largest factor F is not greater than or equal to the jurisdiction limit minus 1, the controller 24 returns the process to start. If the largest factor F is greater than or equal to the jurisdiction limit minus 1, the controller 24 performs a mitigation operation (e.g., advises he operator of the host vehicle 10 to check the mirrors for following remote vehicles 14) is step S140.

It is further noted that the warning can be given at any time in any jurisdiction. It is not required to have a jurisdictional requirement. In other words, if the jurisdiction has no requirement, or the requirement is deemed to be high be the system 12 or the operator of the host vehicle, the mitigation operation can be performed in order to maximize safety and travel along the road 44 or for any other reason.

The sensor system (sensors 26a-26d), a positioning system 28, a warning indicator 30 or system, a tactile vibration system 32, data storage 34 and receiver/transmitter system 36 are conventional components that are well known in the art. Since sensor system (sensors 26a-26d), a positioning system 28, a warning indicator 30 or system, a tactile vibration system 32, data storage 34 and receiver/transmitter system 36 are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," or "element" when used in the singular can have the dual meaning of a single part or a plurality of parts. Also, as used herein to describe the above embodiment(s), the following directional terms "forward". "rear", "above", "vertical", "horizontal", and "below" as well as any other similar directional terms refer to those directions of a vehicle equipped with the system for determining the number of remote vehicles following a host vehicle. Accordingly, these terms, as utilized to describe the present invention should be interpreted relative to a vehicle equipped with the system for determining the number of remote vehicles following a host vehicle.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A system for determining the number of remote vehicles following a host vehicle, the system comprising:
   a receiver configured to receive information related to a plurality of remote vehicles, the information for the plurality of remote vehicles including, for each remote vehicle, a vehicle location and a vehicle travel path; and
   an electronic controller configured to determine a location and a travel path of the host vehicle, compare the location of the host vehicle with the vehicle location of each of the plurality of remote vehicles, compare the travel path of the host vehicle with the vehicle travel path of each of the remote vehicles, and cause the host vehicle to perform a mitigation operation configured to enable at least one of the plurality of remote vehicles to pass the host vehicle when the electronic controller determines that jurisdictional requirements require the host vehicle to give way to the plurality of remote vehicles, the host vehicle is traveling along a road and a predetermined number of the plurality of remote vehicles are disposed behind the host vehicle within the same lane and in the same direction such that the travel path of the host vehicle and the vehicle travel path of each of the predetermined number of the plurality of remote vehicles is the same, such that the predetermined number of the plurality of remote vehicles are unable to pass until after performance of the mitigation operation.

2. The system according to claim 1, wherein
   the electronic controller is configured to determine a distance between the host vehicle and a first remote vehicle of the predetermined number of the plurality of remote vehicles, and configured to perform the mitigation operation only when the first vehicle is within a predetermined distance of the host vehicle.

3. The system according to claim 1, wherein
the electronic controller is configured to estimate a number of the plurality of remote vehicles based on the distance between a first remote vehicle of the plurality of remote vehicles and a second remote vehicle of the plurality of remote vehicles.

4. The system according to claim 1, wherein
the receiver is configured to receive the information related to the plurality of remote vehicles from at least one of the plurality of remote vehicles by vehicle to vehicle communications.

5. The system according to claim 1, further comprising
at least one sensor configured to detect the presence of at least one remote vehicle of the plurality of remote vehicles, and the receiver is configured to receive the information related to the plurality of remote vehicles from the at least one sensor.

6. The system according to claim 1, wherein
the mitigation operation is at least one of an alert in a passenger compartment of the host vehicle and a steering operation of the host vehicle.

7. The system according to claim 1, wherein
the electronic controller is configured to determine a number of lanes on the road based on the host vehicle location and the vehicle travel path of at least one remote vehicle of the plurality of remote vehicles, when the electronic controller determines that the number of lanes on the road is a predetermined number of lanes, the electronic controller determines the plurality of remote vehicles are unable to pass.

8. The system according to claim 1, wherein
the electronic controller is configured to determine the travel path of each of the remote vehicles based on a plurality of position coordinates received by the receiver within a predetermined amount of time.

9. The system according to claim 8, wherein
the electronic controller is configured to compare the plurality of position coordinates received by the receiver with host vehicle position coordinates to determine whether the travel path of the host vehicle and the vehicle travel path of each of the predetermined number of the plurality of remote vehicles is the same.

10. A method for determining the number of remote vehicles following a host vehicle, the method comprising:
receiving information, via a receiver, related to a plurality of remote vehicles, the information for the plurality of remote vehicles including, for each remote vehicle, a vehicle location and a vehicle travel path;
determining, via an electronic controller, a location and a travel path of the host vehicle;
via the electronic controller, the location of the host vehicle with the vehicle location of each of the plurality of remote vehicles;
comparing, via the electronic controller, the travel path of the host vehicle with the vehicle travel path of each of the remote vehicles; and
performing a mitigation operation configured to enable at least one of the plurality of remote vehicles to pass the host vehicle when the electronic controller determines that jurisdictional requirements require the host vehicle to give way to the plurality of remote vehicles, the host vehicle is traveling along a road and a predetermined number of the plurality of remote vehicles are disposed behind the host vehicle within the same lane and in the same direction such that the travel path of the host vehicle and the vehicle travel path of each of the predetermined number of the plurality of remote vehicles is the same, such that the predetermined number of the plurality of remote vehicles are unable to pass until after performance of the mitigation operation.

11. The method according to claim 10, further comprising
determining, with the electronic controller, a distance between the host vehicle and a first remote vehicle of the predetermined number of the plurality of remote vehicles and performing the mitigation operation only when the first vehicle is within a predetermined distance of the host vehicle.

12. The method according to claim 10, further comprising
estimating, via the electronic controller, a number of the plurality of remote vehicles based on the distance between a first remote vehicle of the plurality of remote vehicles and a second remote vehicle of the plurality of remote vehicles.

13. The method according to claim 10, wherein
the receiving the information related to the plurality of remote vehicles from at least one of the plurality of remote vehicles includes receiving the information by vehicle to vehicle communications.

14. The method according to claim 10, further comprising
detecting, via at least one sensor, the presence of at least one remote vehicle of the plurality of remote vehicles, and the receiving the information related to the plurality of remote vehicles from at least one of the plurality of remote vehicles includes receiving the information from the at least one sensor.

15. The method according to claim 10, wherein
the mitigation operation is at least one of an alert in a passenger compartment of the host vehicle, and a steering operation of the host vehicle.

16. The method according to claim 10, further comprising
determining, via the electronic controller, a number of lanes on the road based on the host vehicle location and the vehicle travel path of at least one remote vehicle of the plurality of remote vehicles, when the electronic controller determines that the number of lanes on the road is a predetermined number of lanes, the electronic controller determines the plurality of remote vehicles are unable to pass.

17. The method according to claim 10, wherein
the determining the travel path of each of the remote vehicles is based on a plurality of position coordinates received by the receiver within a predetermined amount of time.

18. The method according to claim 17, further comprising
comparing, via the electronic controller the plurality of position coordinates received by the receiver with host vehicle position coordinates to determine whether the travel path of the host vehicle and the vehicle travel path of each of the predetermined number of the plurality of remote vehicles is the same.

19. A system for determining the number of remote vehicles following a host vehicle, the system comprising:
a receiver configured to receive information related to a plurality of remote vehicles, the information for the plurality of remote vehicles including, for each remote vehicle, a vehicle location and a vehicle travel path; and
an electronic controller configured to determine a location and a travel path of the host vehicle, compare the location of the host vehicle with the vehicle location of each of the plurality of remote vehicles, compare the travel path of the host vehicle with the vehicle travel path of each of the remote vehicles, and cause the host vehicle to perform a mitigation operation configured to enable at least one of the plurality of remote vehicles to pass the host vehicle when the electronic controller determines that jurisdictional requirements require the host vehicle to give way to the plurality of remote vehicles, the host vehicle is traveling along a road and a predetermined number of the plurality of remote vehicles are disposed behind the host vehicle, and the travel path of the host vehicle and the vehicle travel path of each of the predetermined number of the plurality of remote vehicles is the same, the migration operation being performed without communicating the mitigation operation to the remote vehicles.

20. The method according to claim 10, wherein the performing the migration operation includes performing the migration without communicating the mitigation operation to the remote vehicles.

\* \* \* \* \*